United States Patent
Okamoto et al.

(10) Patent No.: US 10,501,654 B2
(45) Date of Patent: Dec. 10, 2019

(54) PRETREATMENT SOLUTION, INK SET AND METHOD FOR PRODUCING PRINTED MATTER

(71) Applicants: TOYO INK SC HOLDINGS CO., LTD., Tokyo (JP); TOYO INK CO., LTD., Tokyo (JP)

(72) Inventors: Mayuko Okamoto, Tokyo (JP); Atsushi Yoda, Tokyo (JP); Yoshihito Suzuki, Tokyo (JP); Kazuhiro Jonai, Tokyo (JP)

(73) Assignees: TOYO INK SC HOLDINGS CO., LTD., Tokyo (JP); TOYO INK CO., LTD., Tokyo (JP)

(*) Notice: Subject to any disclaimer, the term of this patent is extended or adjusted under 35 U.S.C. 154(b) by 0 days.

(21) Appl. No.: 16/069,882

(22) PCT Filed: Jan. 13, 2017

(86) PCT No.: PCT/JP2017/001126
§ 371 (c)(1),
(2) Date: Jul. 12, 2018

(87) PCT Pub. No.: WO2017/122818
PCT Pub. Date: Jul. 20, 2017

(65) Prior Publication Data
US 2019/0016911 A1    Jan. 17, 2019

(30) Foreign Application Priority Data
Jan. 15, 2016 (JP) .................. 2016-006000

(51) Int. Cl.
*B41J 2/015* (2006.01)
*C09D 11/54* (2014.01)
*C09D 11/322* (2014.01)
*B41M 5/00* (2006.01)

(52) U.S. Cl.
CPC .............. *C09D 11/54* (2013.01); *B41J 2/015* (2013.01); *B41M 5/0011* (2013.01); *B41M 5/0023* (2013.01); *C09D 11/322* (2013.01)

(58) Field of Classification Search
CPC .... B41J 2/015; B41M 5/0011; B41M 5/0023; C09D 11/322; C09D 11/54
See application file for complete search history.

(56) References Cited

U.S. PATENT DOCUMENTS

| 6,039,796 | A | 3/2000 | Kubota et al. |
|---|---|---|---|
| 6,605,337 | B1 | 8/2003 | Mori et al. |
| 8,328,323 | B2 | 12/2012 | Haijima |
| 8,883,274 | B2 | 11/2014 | Kawasaki |
| 2004/0104986 | A1 | 6/2004 | Nito et al. |
| 2004/0246320 | A1 | 12/2004 | Nakazawa et al. |
| 2012/0075380 | A1 | 3/2012 | Koase |
| 2017/0247556 | A1* | 8/2017 | Yokohama ............. B41J 11/002 |
| 2018/0030301 | A1* | 2/2018 | Yamazaki ............. C09D 11/40 |

FOREIGN PATENT DOCUMENTS

| CN | 1450126 | 10/2003 |
|---|---|---|
| CN | 101519006 | 9/2009 |
| CN | 103790040 | 5/2014 |
| EP | 0739743 | 10/1996 |
| EP | 0887391 | 12/1998 |
| EP | 1191077 | 3/2002 |
| EP | 1400365 | 3/2004 |
| EP | 1555137 | 7/2005 |
| JP | H1110856 | 1/1999 |
| JP | H1134478 | 2/1999 |
| JP | 2000238422 | 9/2000 |
| JP | 2000335084 | 12/2000 |
| JP | 2001039011 | 2/2001 |
| JP | 2001262022 | 9/2001 |
| JP | 2003103897 | 4/2003 |
| JP | 2004130791 | 4/2004 |
| JP | 2004276253 | 10/2004 |
| JP | 2005074655 | 3/2005 |
| JP | 2008265060 | 11/2008 |
| JP | 2009241304 | 10/2009 |
| JP | 2011189711 | 9/2011 |
| JP | 2012051974 | 3/2012 |
| JP | 2012131108 | 7/2012 |
| JP | 2013072044 | 4/2013 |
| WO | 2011019052 | 2/2011 |

OTHER PUBLICATIONS

"Office Action of China Counterpart Application", dated Jun. 24, 2019, with English translation thereof, p. 1-p. 18.
"Search Report of Europe Counterpart Application No. 17738570.5", dated Jun. 24, 2019, p. 1-p. 6.
"Search Report of Europe Counterpart Application No. 19161614.3", dated Jun. 24, 2019, p. 1-p. 6.
"International Search Report (Form PCT/ISA/210)" of PCT/JP2017/001126, dated Feb. 21, 2017, with English translation thereof, pp. 1-4.

* cited by examiner

*Primary Examiner* — Lamson D Nguyen
(74) *Attorney, Agent, or Firm* — JCIPRNET

(57) ABSTRACT

A pretreatment solution which is used together with an aqueous inkjet ink that contains at least a pigment, wherein the pretreatment solution contains an inorganic metal salt and/or an organic metal salt that exists in a dissolved state, and an organic solvent, the organic solvent contains a compound having one or more hydroxyl groups in each molecule, and the amount of the organic solvent is from 0.1 to 50% by weight based on the total weight of the pretreatment solution.

20 Claims, No Drawings

PRETREATMENT SOLUTION, INK SET AND METHOD FOR PRODUCING PRINTED MATTER

CROSS-REFERENCE TO RELATED APPLICATION

This application is a 371 application of the international PCT application serial no. PCT/JP2017/001126, filed on Jan. 13, 2017, which claims the priority benefit of Japan application no. 2016-006000, filed on Jan. 15, 2016. The entirety of each of the abovementioned patent applications is hereby incorporated by reference herein and made a part of this specification.

TECHNICAL FIELD

The present invention relates to a pretreatment solution which enables high-quality image formation by inkjet printing at high speed and at a high recording resolution on a large variety of recording media, and which also exhibits excellent drying properties. Further, the present invention also relates to an ink set containing the pretreatment solution and an aqueous inkjet ink. Moreover, the present invention also relates to a method for producing printed matter using the pretreatment solution or the ink set.

BACKGROUND ART

Inkjet printing is a recording method in which liquid droplets of an inkjet ink that have been discharged from an inkjet head are jetted directly onto a recording medium to form text or images. Unlike conventional plate printing techniques such as offset printing and gravure printing, inkjet printing does not require platemaking. Accordingly, inkjet printing has the characteristics of being readily adaptable to variable printing, providing simple operation and adjustment of the printing apparatus, and producing little noise during printing, and as a result, inkjet printing is no longer limited to uses in offices and households, but is also showing increased demand in industrial applications in recent years.

The inkjet inks used in inkjet printing are classified into solvent inks, aqueous inks and UV-curable inks and the like depending on the ink composition. In recent years, there has been a growing movement to restrict the use of organic solvents and photosensitive monomers that can be harmful to people and the environment. As a result, there is a growing demand for the replacement of solvent inks and UV-curable inks that use these types of restricted materials with aqueous inks.

A representative aqueous inkjet ink (hereafter also referred to as simply an "ink") contains water as the main component, and in order to control the wetting of the recording medium and the drying properties, typically also contains an added water-soluble organic solvent such as glycerol or a glycol. When an aqueous inkjet ink composed of these liquid components is used for printing (applying the ink to form) a pattern of text and/or images onto a recording medium, the ink dries as a result of the liquid components penetrating into the recording medium and/or evaporating from the recording medium, thereby fixing the ink to the recording medium and forming the pattern.

On the other hand, a large variety of recording media exist for use with inkjet printing, from media having high permeability such as high-quality papers and recycled papers, through to media that exhibit little or no absorption such as coated papers, art papers and plastic films. Generally, in the case of printing to recording media having high absorption properties such as high-quality papers and recycled papers, aqueous inkjet inks can be used for printing (image formation of) images having a practically usable image quality. In contrast, when printing to recording media that exhibit little or no absorption such as coated papers, art papers and plastic films, bleeding between colors tends to occur very readily. Accordingly, when printing to recording media that exhibit little or no absorption, the image quality tends to deteriorate, and obtaining image quality of a practically usable level is difficult.

Due to these issues, in order to enable further expansion in the demand for inkjet printing, the development of an aqueous inkjet ink that can be used favorably on all manner of recording media is a large challenge for those in this field.

One known technique for improving image quality when performing inkjet printing using aqueous inkjet inks is a method that involves treating the recording medium with a pretreatment solution.

There are generally two known types of pretreatment solutions for use with aqueous inkjet inks, those that form an ink-receiving layer and those that form an ink aggregation layer. In other words, there are pretreatment solutions that form a layer (ink-receiving layer) that absorbs the liquid components in the aforementioned aqueous inkjet ink and improves the drying properties (see Patent Documents 1 to 4), and pretreatment solutions that form a layer (ink aggregation layer) that causes intentional aggregation of the solid components such as colorants and resins contained in the aqueous inkjet ink, thereby preventing bleeding between liquid droplets and color irregularities and improving the image quality (see Patent Documents 5 and 6). However, there are still no pretreatment solutions for aqueous inkjet inks that are entirely satisfactory, and further improvements would be desirable.

For example, in the case of an ink-receiving layer, if the layer receives a large amount of ink at once, then swelling of the ink-receiving layer can cause waviness or curling (rolling) of the recording medium, or cracking of the image. Further, bleeding or color irregularities caused by exceeding the amount of ink able to be received by the ink-receiving layer, and a deterioration in print density as a result of absorption of ink components by the receiving layer can also occur.

In contrast, in the case of an ink aggregation layer, because basically no absorption of the liquid components occurs, these phenomena are unlikely to occur. However, because the ink aggregation layer exhibits poor absorption of liquid components, if a large amount of ink is applied at once, then considerable time is required for the liquid components to dry, meaning waviness of the printed matter and bleeding become more likely. Further, if the ink aggregation layer does not have a uniform thickness, then there is a possibility of a deterioration in image quality, and the occurrence of other problems associated with localized deterioration in the drying properties.

In other words, in those regions where the thickness of the ink aggregation layer is small, the ink aggregation effect is reduced, and bleeding and color irregularities tend to occur. In contrast, in those regions where the thickness is large, although bleeding and color irregularities can be suppressed, there is a possibility that the drying properties of the pretreatment solution and the ink applied thereon may deteriorate. When the drying properties are poor, problems such as adhesion of the pretreatment solution and the ink to the inside of the coating apparatus, and set-off that occurs when the recording media are stacked following printing become more likely. Image deterioration and other problems caused by a deterioration in drying properties are particularly likely to occur when printing at high speed and at high recording resolution, and can sometimes lead to a large deterioration in the quality of the printed matter. Accordingly, when employing a pretreatment solution for forming an ink aggregation layer, excellent drying properties and the ability to form a uniform coating are very important.

PRIOR ART DOCUMENTS

Patent Documents

Patent Document 1: JP 2000-238422 A
Patent Document 2: JP 2000-335084 A
Patent Document 3: JP 2012-131108 A
Patent Document 4: JP 2009-241304 A
Patent Document 5: JP H11-010856 A
Patent Document 6: JP 2004-276253 A
Patent Document 7: JP 2004-130791 A
Patent Document 8: JP 2011-189711 A
Patent Document 9: JP 2001-039011 A
Patent Document 10: WO 2011/019052

SUMMARY OF INVENTION

Problems Invention Aims to Solve

As described above, for pretreatment solutions that form an ink aggregation layer, in addition to achieving excellent drying properties, ensuring coating uniformity is very important. However, with conventional pretreatment solutions, achieving satisfactory coating uniformity is difficult.

For example, Patent Document 5 discloses a pretreatment solution containing a polyvalent metal ion and an organic solvent. However, because the disclosed pretreatment solution contains an organic solvent with a high surface tension such as glycerol, applying the pretreatment solution uniformly is difficult, particularly when printing is performed at high speed and at a high recording resolution, and the type of deterioration in image quality and drying problems described above tend to occur.

Further, Patent Document 7 discloses a pretreatment solution containing a polyvalent metal ion, an organic solvent and a buffer. However, when high-speed printing of this pretreatment solution is performed, achieving a uniform coating of the pretreatment solution is difficult, and fluctuations in the degree of aggregation tend to occur across the printed surface, making a deterioration in the image quality likely. Moreover, the pH of the pretreatment solution is from 4.5 to 5.0, and because this represents a large difference from the pH of the inkjet ink, the aggregation effect is not entirely satisfactory, and a deterioration in image quality tends to occur during high-speed printing.

Patent Document 8 discloses a pretreatment solution which contains an acidic compound and a nitrogen-containing heterocyclic compound, and has a pH at 25° C. of 0.5 to 2.0. However, pretreatment solutions having strong acidity tend to cause damage to the printing apparatus in which they are housed and to the recording medium, and can therefore not be considered ideal in terms of printing applicability. Further, during high-speed printing, achieving uniform coating of the above pretreatment solution is difficult, and obtaining a satisfactory aggregation effect on the inkjet ink is also problematic.

On the other hand, another technique that has been reported for improving the image quality for inkjet printing is a method in which a plurality of layers of different composition are formed on the recording medium (see Patent Documents 9 and 10). Because the drawbacks of the various layers can be compensated, this method is said to be ideal, for example, for the production of special-purpose inkjet ink papers. However, in order to be compatible with a variety of recording media, if the application units for the pretreatment solution and other layer materials are installed in an in-line arrangement relative to the inkjet printing apparatus, then the apparatus tends to become very large and complex. Accordingly, this cannot be claimed to be a desirable solution.

As outlined above, with conventional technology, obtaining high-quality images when performing inkjet printing using an aqueous inkjet ink on a variety of recording media has proven difficult, and further improvement would be desirable. In particular, there currently exist no pretreatment solution which enables high-quality image formation by inkjet printing at high speed and at a high recording resolution using an aqueous inkjet ink on a large variety of recording media, and which also exhibits excellent drying properties, thus enabling a satisfactory improvement in problems such as adhesion of the solution to the inside of the coating apparatus and set-off that occurs when the printed recording media are stacked.

Further, up until now, almost no consideration has been given to the storage stability of pretreatment solutions used for forming ink aggregation layers containing metal salts. For example, Patent Document 6 discloses a pretreatment solution of excellent storage stability containing a polyvalent metal ion and an organic solvent. However, Patent Document 6 includes no mention of the specific method used for improving the storage stability or the grounds for that improvement in storage stability. Accordingly, the development of a pretreatment solution that is capable of forming a high-quality image, exhibits excellent drying properties, and also has excellent storage stability is desirable.

The present invention has been developed in light of the above circumstances, provides a pretreatment solution which can be applied favorably to various recording media, and when used in inkjet printing at high speed and high resolution, exhibits excellent coating uniformity, improves cracking and other image defects such as bleeding and color irregularities, and is capable of forming a high-quality image of satisfactory density. Further, in order to suppress adhesion to the inside of the coating apparatus and improve set-off that occurs when the printed recording media are stacked, the present invention also provides a pretreatment solution that has excellent drying properties and excellent storage stability. Further, the present invention also provides an ink set containing the above pretreatment solution and an aqueous inkjet ink. Moreover, the present invention also provides a method for producing printed matter using the above pretreatment solution or the above ink set.

Means for Solution of the Problems

As a result of intensive research, the inventors of the present invention discovered that a pretreatment solution containing a specified amount of a specific material and an ink set composed of the pretreatment solution and an inkjet ink were able to achieve the above objects, thus enabling them to complete the present invention. In other words, the present invention relates to the following aspects.

One aspect of the present invention relates to a pretreatment solution which is used together with an aqueous inkjet ink that contains at least a pigment, wherein the pretreatment solution contains an inorganic metal salt and/or an organic metal salt, and an organic solvent, the inorganic metal salt and/or organic metal salt exists in a dissolved state in the pretreatment solution, and the organic solvent contains a compound having one or more hydroxyl groups in the molecule, and the amount of the organic solvent, based on the total weight of the pretreatment solution, is from 0.1 to 50% by weight.

In one embodiment, the above inorganic metal salt and/or organic metal salt is a polyvalent metal salt, and the amount of polyvalent metal ions derived from the polyvalent metal salt, based on the total weight of the pretreatment solution, is at least 2% by weight but not more than 8% by weight, and based on the total weight of the pretreatment solution, the amount of organic solvent having a boiling point of 180° C. or higher is not more than 15% by weight.

In the above embodiment, the polyvalent metal ions preferably include at least one ion selected from the group consisting of $Ca^{2+}$, $Mg^{2+}$, $Zn^{2+}$, $Al^{3+}$, $Fe^{2+}$ and $Fe^{3+}$.

Furthermore, the above pretreatment solution preferably also contains a water-soluble binder resin.

The water-soluble binder resin preferably contains a nonionic water-soluble resin.

Further, based on the total weight of the pretreatment solution, the weight ratio of the amount of the water-soluble binder resin relative to the amount of polyvalent metal ions derived from the above inorganic metal salt and/or organic metal salt is preferably less than 20-fold.

Furthermore, the pretreatment solution preferably has a viscosity at 25° C. that is higher than 9 mPa·s but not more than 30 mPa·s.

The pretreatment solution preferably also contains a surfactant, and preferably has a surface tension at 25° C. of 20 to 45 mN/m.

In another embodiment, the pretreatment solution preferably also contains an organic amine in a dissolved state, and the difference between the pH of the aforementioned aqueous inkjet ink and the pH of the pretreatment solution is not more than 2.

In the above embodiment, it is preferable that the above inorganic metal salt and/or organic metal salt contains a polyvalent metal salt, and that the amount of polyvalent metal ions derived from the polyvalent metal salt, based on the total weight of the pretreatment solution, is at least 1% by weight but not more than 15% by weight.

Further, the amount of the organic amine, based on the total weight of the pretreatment solution, is preferably at least 0.15% by weight but not more than 3% by weight. Furthermore, it is preferable that the weight average molecular weight (Mw) of the organic amine is not more than 500, and that the organic amine is a secondary amine and/or a tertiary amine.

Furthermore, based on the total weight of the above pretreatment solution, the amount of organic solvent having a boiling point of 200° C. or higher is preferably not more than 20% by weight.

Further, the above pretreatment solution preferably also contains a water-soluble binder resin, and based on the total weight of the pretreatment solution, the weight ratio of the amount of the water-soluble binder resin relative to the amount of polyvalent metal ions derived from the inorganic metal salt and/or organic metal salt is preferably less than 50-fold.

Furthermore, the above water-soluble binder resin preferably contains a nonionic water-soluble resin. The number average molecular weight (Mn) of the water-soluble binder resin is preferably at least 3,000 but not more than 90,000.

A second aspect of the present invention relates to an ink set containing the pretreatment solution of the first aspect described above and an aqueous inkjet ink, wherein the aqueous inkjet ink contains a pigment, a water-soluble organic solvent and water, and the water-soluble organic solvent contains two or more solvents selected from the group consisting of glycol ether-based solvents and alkyl polyol-based solvents having a boiling point at 1 atmosphere of at least 180° C. but not more than 280° C.

In one embodiment, based on the total weight of the above aqueous inkjet ink, the amount of water-soluble organic solvent having a boiling point at 1 atmosphere of at least 240° C. is preferably less than 10% by weight.

Further, the above aqueous inkjet ink preferably also contains a water-soluble resin as a binder resin.

Furthermore, the aqueous inkjet ink preferably has at least a magenta ink, and the magenta ink preferably contains C.I. Pigment Violet 19 as a magenta pigment.

A third aspect of the present invention relates to a method for producing aqueous inkjet ink printed matter using an aqueous inkjet ink, the method including:

a step of applying a pretreatment solution to a recording medium being transported at a speed of at least 30 m/minute, and a step of applying the aqueous inkjet ink by a one-pass printing method to a portion of the recording medium to which the pretreatment solution has been applied, wherein in at least the step of applying the pretreatment solution, the pretreatment solution of the first aspect, or the pretreatment solution in the ink set of the second aspect, is used.

In one embodiment, the above recording medium is preferably a paper substrate or a film substrate.

Further, in the step of applying the pretreatment solution, the coating amount of the pretreatment solution is preferably from 1 to 25 g/m².

Effects of the Invention

The present invention is able to provide a pretreatment solution which, regardless of the absorption properties of the recording medium being used, is capable of forming a high-quality image of satisfactory density by inkjet printing at high speed and high resolution without suffering cracking or other image defects such as bleeding and color irregularities. Further, the present invention can also provide a pretreatment solution having excellent drying properties and excellent storage stability, which can suppress adhesion to the inside of the coating apparatus and improve set-off that occurs when the recording media are stacked following printing. Furthermore, the present invention can also provide an ink set containing the above pretreatment solution having the characteristics described above and an aqueous inkjet ink. Moreover, the present invention can also provide a method for producing printed matter using the above ink set.

The disclosure of the present invention is related to the subject matter disclosed in prior Japanese Application 2016-006000 filed on Jan. 15, 2016, the entire contents of which are incorporated by reference herein.

EMBODIMENTS FOR CARRYING OUT THE INVENTION

The present invention is described below in further detail based on a series of preferred embodiments. However, the embodiments described below merely describe examples of the present invention. The present invention is in no way limited by the following embodiments, and also includes all manner of modifications that can be made within the scope of the invention.

<Pretreatment Solution>

The pretreatment solution that represents one aspect of the present invention is used together with an aqueous inkjet ink that contains at least a pigment. The pretreatment solution contains an inorganic metal salt and/or an organic metal salt, and an organic solvent, wherein the inorganic metal salt and/or organic metal salt exists in a dissolved state in the pretreatment solution, the organic solvent contains a compound having one or more hydroxyl groups in the molecule, and the amount of the organic solvent, based on the total weight of the pretreatment solution, is from 0.1 to 50% by weight.

The pretreatment solution is applied to a recording medium prior to printing of the inkjet ink, and forms an ink aggregation layer on the recording medium. The inorganic metal salt and/or organic metal salt contained in the pretreatment solution ionize in the presence of water or compounds having one or more hydroxyl groups in the molecular structure. Accordingly, metal cations (metal ions) derived from the inorganic metal salt and/or organic metal salt exist in the ink aggregation layer (the layer of the pretreatment solution) onto which the inkjet ink is subsequently printed.

This metal cation component causes anion-cation interactions and adsorption equilibrium movement with those solid components bearing an anionic charge, such as pigments and resins that exist in a dissolved and/or dispersed state in the inkjet ink, thereby lowering the dissolution and/or dispersion functionality and suppressing color mixing of the pigments.

Printing of the inkjet ink may be performed before drying of the pretreatment solution. In such cases, mixing of the inkjet ink and the pretreatment solution alters the dissolution equilibrium and/or adsorption equilibrium of the aforementioned solid components, and can lower the dissolution and/or dispersion functionality of the solid components.

Among metal ions, polyvalent metal ions have a greater reaction speed for anion-cation interactions and adsorption equilibrium movement when compared with monovalent metal ions, and also exhibit superior functionality in such reactions. Accordingly, in one embodiment, the metal ions derived from the inorganic metal salt and/or organic metal salt are preferably polyvalent metal ions that are divalent or higher.

However, inorganic metal salts and/or organic metal salts containing polyvalent metal ions exhibit poor solubility when it is compared to salts containing monovalent metal ions. Further, in order to improve the wettability of the recording medium, a method in which an organic solvent is used is well known, but organic solvents generally have a lower polarity than water, meaning salts tend to dissolve poorly. As a result, if an inorganic metal salt and/or organic metal salt containing polyvalent metal ions and an organic solvent are simply combined, the resulting pretreatment solution tends to have poor storage stability.

In contrast, in the present invention, by using a compound having one or more hydroxyl groups in the molecular structure as the organic solvent, the storage stability of the pretreatment solution can be improved. Although detailed reasons for this are unclear, it is thought that in addition to water molecules, molecules of compounds having one or more hydroxyl groups in the molecular structure also cause solvation of polyvalent metal ions, meaning the polyvalent metal ions can exhibit affinity for other organic solvents via the molecules of the compound having one or more hydroxyl groups in the molecular structure, thereby stabilizing the overall system and enabling the storage stability of the pretreatment solution to be improved.

Further, ink aggregation layers typically exhibit poor water absorption capabilities. Accordingly, if a large amount of inkjet ink is applied all at once, or within a short period of time, then problems such as bleeding between inks of different colors and the occurrence of color irregularities, as well as a deterioration in the drying properties, tend to increase the possibility of problems such as adhesion to the inside of the coating apparatus and set-off that occurs upon stacking of the recording media. As a result, in one embodiment, from the viewpoints of the storage stability of the pretreatment solution, the wettability of the recording medium (coating uniformity) and the drying properties, the amount of the organic solvent containing a compound having one or more hydroxyl groups in the molecular structure, based on the total weight of the pretreatment solution, is preferably at least 0.1% by weight, more preferably at least 1% by weight, and even more preferably 4% by weight or greater. Further, the amount of the organic solvent, based on the total weight of the pretreatment solution, is preferably not more than 50% by weight, more preferably not more than 30% by weight, and even more preferably 25% by weight or less.

In one embodiment, the amount of the organic solvent containing a compound having one or more hydroxyl groups in the molecular structure, based on the total weight of the pretreatment solution, is preferably from 0.1 to 50% by weight, more preferably from 0.15 to 30% by weight, and particularly preferably from 0.2 to 20% by weight.

Moreover, from the viewpoint of making it easier to obtain a pretreatment solution which, even when subjected to inkjet printing at high speed and at high recording resolution, is unaffected by the recording medium, yields high-quality images, is unlikely to suffer from adhesion of the solution to the inside of the coating apparatus or set-off that occurs when the recording media are stacked following printing, and exhibits excellent storage stability, it is preferable that the type of inorganic metal salt and/or organic metal salt, the type of organic solvent, and the amounts of these components are adjusted appropriately. Representative embodiments are described below.

First Embodiment

A first embodiment of the pretreatment solution contains an inorganic metal salt and/or an organic metal salt in a dissolved state, the metal ions derived from the inorganic metal salt and/or organic metal salt include polyvalent metal ions, the amount of those polyvalent metal ions is at least 2% by weight but not more than 8% by weight relative to the total weight of the pretreatment solution, and the amount of organic solvent having a boiling point of 180° C. or higher, based on the total weight of the pretreatment solution, is not more than 15% by weight. In one embodiment, the pretreatment solution preferably contains an organic solvent containing no organic solvents having a boiling point of 180° C. or higher.

The pretreatment solution of this embodiment is characterized by containing a specific amount of polyvalent metal ions, and by prescribing the structure of the organic solvent that is used and prescribing an upper limit for the amount of high-boiling point organic solvents.

In the above embodiment, the metal ions derived from the inorganic metal salt and/or organic metal salt contain polyvalent metal ions, and the amount of those polyvalent metal ions is at least 2% by weight but not more than 8% by weight relative to the total weight of the pretreatment solution. Among metal ions, polyvalent metal ions have a greater reaction speed for anion-cation interactions and adsorption equilibrium movement when compared with monovalent metal ions, and also exhibit superior functionality in such reactions.

Of course, in those cases where the amount of polyvalent metal ions is too small, the ability to initiate the above anion-cation interactions and adsorption equilibrium movement deteriorates, and therefore bleeding and color irregularities tend to occur. Bleeding and color irregularities can be suppressed by increasing the amount of polyvalent metal ions.

However, the inventors of the present invention discovered that when the amount of polyvalent metal ions is excessive, the image quality and drying properties of the printed matter may sometimes deteriorate, depending on the recording medium being used. The detailed reasons for this finding are not entirely clear, but it is thought that an excessive amount of polyvalent metal ions causes a deterioration in the wettability of the recording medium by the pretreatment solution, resulting in coating irregularities and fluctuations in the degree of aggregation across the printed surface, and also causes a phenomenon wherein the boiling point increases due to the inorganic metal salt and/or organic metal salt.

In contrast, the inventors discovered that by ensuring that the amount of the polyvalent metal ions is at least 2% by weight but not more than 8% by weight, the problems described above could be ameliorated. In other words, by adjusting the amount of the polyvalent metal ions to fall within the above range, bleeding and color irregularities could be suppressed, while ensuring satisfactory wettability of the recording medium by the pretreatment solution and suppression to a minimum of any increase in boiling point due to the inorganic metal salt and/or organic metal salt.

On the other hand, in order to enable the pretreatment solution to function favorably regardless of the variety of recording medium being used, it is desirable that the wetting properties of the pretreatment solution are able to be maintained on all manner of recording media, and excellent drying properties can be readily obtained regardless of the liquid absorption properties of the recording medium. In this regard, in the pretreatment solution of the embodiment described above, by including an organic solvent as an essential component, the surface tension of the pretreatment solution is lowered, enabling uniform coating on recording media having a small surface energy. Further, by restricting the amount of organic solvents having a boiling point of 180° C. or higher to not more than 15% by weight, retention of high-boiling point organic solvent in the printed matter can be prevented. As a result, adhesion to the inside of the coating apparatus as a result of inadequate drying and set-off that occurs upon stacking of the recording media are suppressed, and favorable high-speed printing can be performed regardless of the type of recording medium.

The constituent elements of the pretreatment solution of the first embodiment described above are described below in detail.

<Inorganic Metal Salt and/or Organic Metal Salt>

The pretreatment solution contains an inorganic metal salt and/or organic metal salt in a dissolved state. The metal salt lowers the dissolution and/or dispersion functionality of the solid components of the inkjet ink on the recording medium, causing aggregation of the solid components that improves bleeding and color irregularities caused by mixing of the ink droplets. Examples of other materials that also exhibit these effects include cationic resins and organic acids.

However, compared with these materials, metal salts are of low molecular weight, facilitating movement of the cationic component, and also dissolve instantly in water, generating cationic components that can cause aggregation of solid components. Accordingly, when an inkjet ink is discharged onto a recording medium to which the pretreatment solution has been applied, even in the case of a high print ratio, the cationic components can move almost instantly right through into the uppermost portions of the inkjet ink layer and cause pigment aggregation. As a result, even during high-speed printing, bleeding and color irregularities do not occur, and printed matter of higher image quality can be obtained.

In this description, the expression "dissolved state" describes a state in which the inorganic metal salt and/or organic metal salt has mixed uniformly with the water to form a transparent solution. Determination of whether or not a dissolved state has been achieved can be made, for example, by leaving the solution to stand at 25° C. for 24 hours, and then inspecting the solution with the naked eye to confirm whether or not the solution is transparent. In those cases where the pretreatment solution used in this determination contains the inorganic metal salt and/or organic metal salt and a material other than water, a solution can be prepared and evaluated by substituting the water with the other material.

In the pretreatment solution, the metal salt may be an inorganic metal salt, an organic metal salt, or a combination of the two. For the metal salt, either a single salt may be used alone, or a combination of two or more salts may be used. There are no particular limitations on the metal salt, provided the metal salt is composed of a metal ion and an anion that is bonded to the metal ion.

Among the various possibilities, in terms of undergoing an instant interaction with the pigment, suppressing bleeding, and enabling the formation of a sharp image with no color irregularities, the metal salt preferably contains a polyvalent metal salt. Further, including at least one type of ion selected from among $Ca^{2+}$, $Mg^{2+}$, $Zn^{2+}$, $Al^{3+}$, $Fe^{2+}$ and $Fe^{3+}$ as the polyvalent metal ions is preferred in terms of facilitating the interaction with solid components such as pigments and resins. Moreover, of the above ions, a polyvalent metal ion selected from among $Ca^{2+}$, $Mg^{2+}$, $Zn^{2+}$ and $Al^{3+}$ has a large ionization tendency and readily generates a cationic component, and therefore offers the advantage of a large aggregation effect, and can be used particularly favorably. A polyvalent metal ion selected from among $Ca^{2+}$ and $Mg^{2+}$ is particularly ideal, as the ionic radius is small, which facilitates movement through the inkjet ink layer.

Specific examples of the inorganic metal salt include, but are not limited to, calcium chloride, magnesium chloride, aluminum chloride, calcium bromide, magnesium bromide, calcium nitrate, magnesium nitrate, magnesium sulfate, aluminum sulfate, calcium carbonate, and magnesium carbonate. Among these inorganic metal salts, chlorides are particularly preferred as they generally exhibit a high degree of solubility in water. Moreover, among these inorganic metal salts, in terms of having a high degree of solubility in water, and ensuring that the interactions with the components in the aforementioned inkjet ink occur efficiently and rapidly, calcium chloride and calcium nitrate are particularly preferred.

Further, examples of the organic metal salt include, but are not limited to, the calcium salts, magnesium salts, nickel salts, and zinc salts and the like of organic acids such as pantothenic acid, propionic acid, ascorbic acid, acetic acid and lactic acid. Among these organic acid metal salts, in terms of the degree of solubility in water and the interaction with the components in the inkjet ink, the calcium salts of lactic acid and/or acetic acid are particularly preferred.

In one embodiment, the metal salt used in the pretreatment solution preferably contains at least one salt selected from the group consisting of $CaCl_2.2H_2O$, $MgCl_2.6H_2O$, $MgSO_4$, $Ca(NO_3)_2.4H_2O$, $Zn(CH_3COO)_2.2H_2O$, $[Al_2(OH)_nCl_{6-n}]_m$, $FeSO_4.7H_2O$, $YNO_3.6H_2O$, $(CH_3COO)_2Ca.H_2O$, and $(CH_3CH(OH)COO)_2Ca.5H_2O$.

In the pretreatment solution of the embodiment described above, the amount of the above metal salt, recorded as an amount of the polyvalent metal ions relative to the total weight of the pretreatment solution, is preferably from 2 to 8% by weight, more preferably from 2.2 to 6.5% by weight, and particularly preferably from 2.5 to 5% by weight. As mentioned above, by ensuring that the amount of metal ions falls within the above range, bleeding and color irregularities can be suppressed, while ensuring satisfactory wettability of the recording medium by the pretreatment solution and suppressing to a minimum any increase in boiling point due to the inorganic metal salt and/or organic metal salt.

If the amount of the polyvalent metal ions is less than 2% by weight, then the ability of the solution to cause instant ink aggregation does not manifest satisfactorily, and bleeding and color irregularities can sometimes occur. In contrast, if the amount exceeds 8% by weight, then the wettability of the recording medium by the pretreatment solution tends to deteriorate, which can either cause coating irregularities, or lead to a phenomenon wherein the boiling point increases due to the inorganic metal salt and/or organic metal salt, resulting in a deterioration in the drying properties.

The amount of polyvalent metal ions relative to the total weight of the pretreatment solution is determined using the following formula (1).

(Amount of polyvalent metal ions)(% by weight)=
$WC \times MM/MC$     Formula (1):

In formula (1), WC represents the amount of the inorganic metal salt and/or organic metal salt relative to the total weight of the pretreatment solution, MM represents the ion content of the polyvalent metal ions that constitute the inorganic metal salt and/or organic metal salt, and MC represents the molecular weight of the inorganic metal salt and/or organic metal salt.

<Organic Solvent>

The pretreatment solution of one aspect of the present invention also contains, in addition to the inorganic metal salt and/or organic metal salt, an organic solvent containing a compound having one or more hydroxyl groups in the molecular structure. By also including this organic solvent, the drying properties of the pretreatment solution can be better controlled, and the wettability of the recording medium during high-speed printing can be improved, enabling more uniform coating to be performed. Further, as mentioned above, by using a compound having one or more hydroxyl groups in the molecular structure, an improvement in the storage stability of the pretreatment solution can also be achieved.

The organic solvent used in the pretreatment solution of the embodiment described above contains a compound having one or more hydroxyl groups in the molecular structure.

Examples of compounds that may be used include:

monohydric alcohols such as methanol, ethanol, 1-propanol, 2-propanol, 1-butanol, 2-butanol, 3-methoxy-1-butanol, and 3-methoxy-3-methyl-1-butanol, dihydric alcohols (glycols) such as 1,2-ethanediol, 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentan-2,4-diol, 2-ethyl-1,3-hexanediol, 1,2-octanediol, ethylene glycol, diethylene glycol, triethylene glycol, dipropylene glycol, butylene glycol, and dibutylene glycol, trihydric alcohols such as glycerol, and glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, tripropylene glycol monomethyl ether, and tripropylene glycol monoethyl ether.

In one embodiment, in order to achieve superior affinity with the polyvalent metal ions, the water molecules, and other organic solvents, an alcohol is preferably selected from among the compounds listed above. The use of a monohydric alcohol such as ethanol, 1-propanol, 2-propanol, 3-methoxy-1-butanol or 3-methoxy-3-methyl-1-butanol is particularly preferred. A single compound having one or more hydroxyl groups in the molecular structure may be used alone, or a combination of two or more such compounds may be used.

The amount of the compound having one or more hydroxyl groups in the molecular structure contained within the pretreatment solution is preferably from 0.1 to 25% by weight, and more preferably from 0.1 to 20% by weight, relative to the total weight of the pretreatment solution. An amount of 0.5 to 10% by weight is even more preferable, and an amount of 1 to 5% by weight is particularly desirable. By adjusting the amount of the above compound to fall within the above range, a pretreatment solution that combines favorable drying properties, wettability and storage stability can be more easily obtained. Further, stable printing can be performed over long periods, regardless of the printing method used for the pretreatment solution.

The pretreatment solution may also contain other organic solvents. Examples of these other organic solvents include:

glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether, nitrogen-containing solvents such as 2-pyrrolidone, N-methylpyrrolidone, N-ethylpyrrolidone, ε-caprolactam, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, and N,N-diethyl-β-octoxypropionamide, and heterocyclic compounds such as γ-butyrolactone, γ-valerolactone, δ-valerolactone, and ε-caprolactone.

Any of these organic solvents may be used alone, or a combination of two or more solvents may be used. Among these solvents, the use of a water-soluble organic solvent is preferred.

The total amount of organic solvents contained in the pretreatment solution, relative to the total weight of the pretreatment solution, is preferably from 0.1 to 50% by weight, and the organic solvents are preferably composed of water-soluble organic solvents. Accordingly, the total amount of water-soluble organic solvents contained in the pretreatment solution is preferably from 0.1 to 50% by weight, more preferably from 0.15 to 30% by weight, and particularly preferably from 0.2 to 20% by weight. By ensuring that the amount of water-soluble organic solvents falls within the above range, a combination of favorable drying properties for the pretreatment solution, good coating uniformity arising from the wettability of the recording medium, and favorable storage stability can be more easily achieved.

Further, in the pretreatment solution of the above embodiment, the amount of organic solvents having a boiling point of 180° C. or higher, based on the total weight of the pretreatment solution, is not more than 15% by weight.

In this description, the expression that this amount is "not more than 15% by weight" means that the pretreatment solution either contains no organic solvents having a boiling point of 180° C. or higher, or if such a solvent is included, contains not more than 15% by weight of the solvent having a boiling point of 180° C. or higher. By ensuring that the amount of organic solvents having a boiling point of 180° C. or higher falls within the above range, the drying properties of the pretreatment solution can be made more favorable, and the possibility of the pretreatment solution adversely affecting the drying properties of the subsequently applied inkjet ink can be eliminated. Furthermore, by removing residual organic solvent from the printed matter, adhesion to the inside of the coating apparatus and set-off that occurs upon stacking of the recording media following printing can be suppressed. In other words, as a result of these factors, high-speed printing can be achieved.

Furthermore, although the detailed reasons are not entirely clear, when inkjet printing is performed on top of the ink aggregation layer formed using a pretreatment solution that satisfies the above conditions, the polyvalent metal ions dissolve instantly in the subsequently applied ink, meaning a satisfactory suppression effect on bleeding and color irregularities can be obtained with ease.

Of the organic solvents listed above, those having a boiling point of 180° C. or higher include:

dihydric alcohols such as 1,2-ethanediol, 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-ethyl-1,3-hexanediol, 1,2-octanediol, diethylene glycol, triethylene glycol, dipropylene glycol, butylene glycol, and dibutylene glycol, trihydric alcohols such as glycerol, and glycol monoalkyl ethers such as diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monopropyl ether, tripropylene glycol monomethyl ether, and tripropylene glycol monoethyl ether, glycol dialkyl ethers such as diethylene glycol butyl methyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether, and the nitrogen-containing solvents and heterocyclic compounds listed above.

Among the above organic solvents, the use of water-soluble organic solvents is preferred. These organic solvents may be used in a blend amount of not more than 15% by weight based on the total weight of the pretreatment solution.

Furthermore, from the viewpoint of achieving a more favorable pretreatment solution, in terms of ensuring high-speed printability to a variety of recording media and improving the image quality, the organic solvent contained in the pretreatment solution preferably includes an organic solvent having a low surface tension. As mentioned above, in the present invention, in order to obtain printed matter of high image quality in high-speed printing, it is important that the pretreatment solution can be applied uniformly regardless of the absorption properties or surface unevenness of the recording medium. In this regard, it is thought that by using an organic solvent having a small surface tension, the wetting properties of the pretreatment solution containing the polyvalent metal salt can be improved dramatically. In terms of achieving an improvement in the wetting properties of the pretreatment solution on the recording medium and an improvement in the image quality of the subsequently applied inkjet ink, it is particularly preferable to control the surface tension of the pretreatment solution by using a combination of an organic solvent having a small surface tension and a surfactant described below.

In the present embodiment, the organic solvent having a small surface tension has a surface tension at 25° C. that is preferably from 20 to 32 mN/m, more preferably from 20 to 30 mN/m, and particularly preferably from 20 to 28 mN/m. By using an organic solvent having such a surface tension, the surface tension of the pretreatment solution can be adjusted to a value within a preferred range.

The amount of the organic solvent having a small surface tension, relative to the total weight of organic solvent in the pretreatment solution, is preferably from 35 to 100% by weight, more preferably from 40 to 100% by weight, and particularly preferably from 50 to 100% by weight. By ensuring that the amount of the organic solvent having a small surface tension falls within the above range, the surface tension reduction effect achieved by adding the organic solvent having a small surface tension can manifest more favorably.

Among the water-soluble organic solvents listed above, examples of organic solvents having a surface tension at 25° C. that is from 20 to 32 mN/m include:

monohydric alcohols such as methanol, ethanol, 1-propanol, 2-propanol, 1-butanol, 2-butanol, 3-methoxy-1-butanol, and 3-methoxy-3-methyl-1-butanol, dihydric alcohols (glycols) such as 1,2-butanediol, 1,2-pentanediol, 1,2-hexanediol, 1,2-heptanediol, 2-methyl-2-propyl-1,3-propanediol, 2-methylpentan-2,4-diol, 2-ethyl-1,3-hexanediol, and 1,2-octanediol, glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, tripropylene glycol monomethyl ether, and tripropylene glycol monoethyl ether, and glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether.

Among these compounds, for the reasons described above, it is preferable to select a compound having one or more hydroxyl groups in the molecular structure, and the compound more preferably includes an alcohol, and most preferably includes a monohydric alcohol. One of the above water-soluble organic solvents may be used alone, or a combination of two or more solvents may be used.

In one embodiment, the organic solvent in the pretreatment solution is preferably composed of a monohydric alcohol and/or a glycol. For the monohydric alcohol, the use of one or more compounds selected from the group consisting of ethanol, 1-propanol, 2-propanol, 3-methoxy-1-butanol (3-methoxybutanol) and 3-methoxy-3-methyl-1-butanol is preferred. In one embodiment, it is preferable to use a combination of 2-propanol and 3-methoxybutanol. Further, for the glycol, the use of one or more compounds selected from the group consisting of 1,2-propanediol, 1,2-butanediol, 1,3-butanediol, 1,2-pentanediol, 1,2-hexanediol, diethylene glycol, triethylene glycol and dipropylene glycol is preferred. In one embodiment, it is preferable to use 1,2-propanediol.

<Binder Resin>

The pretreatment solution of the embodiment described above may also contain a binder resin. A binder resin is a polymer compound that does not participate in the reaction between the inkjet ink and the pretreatment solution. By also including a binder resin, the water resistance of the printed matter can be improved, meaning the printed matter can be used in a variety of different applications.

Generally, water-soluble resins and resin microparticles are known as binder resins. Either of these may be used in the present invention, but in terms of remaining stable over a long period without causing thickening or precipitation when mixed with the metal salt, in terms of mixing instantly with the inkjet ink, thereby enabling the aggregation function of the pretreatment solution to manifest more effectively during high-speed printing, and in terms of exhibiting excellent drying properties up until coating film formation, selection of a water-soluble binder resin is particularly preferred.

The amount of the above binder resin is specified relative to the total amount of metal ions contained in the pretreatment solution. The weight ratio of the amount of the above binder resin relative to the amount of metal ions derived from the inorganic metal salt and/or organic metal salt exceeds 0, but is preferably less than 20-fold, more preferably less than 10-fold, and particularly preferably less than 4-fold. If the amount of the binder resin is within this range, then compared with the case where no binder resin is added, the water resistance improves and no cracking of the coating film occurs, but dissolution of the polyvalent metal salt is not inhibited, meaning printed matter of high image quality and superior quality can be obtained with ease. The metal ions mentioned above are preferably polyvalent metal ions.

In the pretreatment solution of the embodiment described above, any binder resin can be used, but as mentioned above, selecting a water-soluble binder resin is preferred. Among the various possible resins, using a nonionic water-soluble resin is effective in improving the water resistance and suppressing cracking, and also yields favorable pretreatment solution stability with no thickening or precipitation, and is consequently preferred. Further, provided the basic performance of the reaction solution can be maintained, a resin that also includes an added anionic unit or cationic unit in the nonionic polymer may be used, but the use of a resin that contains substantially none of these units is preferred. A "resin that contains substantially no anionic units or cationic units" means a resin having an acid value of 0 to 10 mgKOH/g and an amine value of 0 to 10 mgKOH/g. The above acid value and amine value can be measured, for example, using an automatic potentiometric titrator described below.

Specific examples of binder resins that may be used include, but of course are not limited to, polyethyleneimines, polyamides, various quaternary ammonium salt group-containing water-soluble resins, polyacrylamides, polyvinylpyrrolidones, polyalkylene oxides, starches, water-soluble celluloses such as methyl cellulose, hydroxy cellulose, carboxymethyl cellulose, hydroxymethyl cellulose, hydroxypropyl cellulose and hydroxypropyl methylcellulose, polyvinyl methyl ethers, polyvinyl acetals, polyvinyl alcohols, and modified products of the above resins.

Among the above binder resins, in terms of being able to absorb the liquid components in the subsequently printed inkjet ink, thereby improving the drying properties, particularly during high-speed printing, at least one resin is preferably selected from among polyvinyl alcohols, polyvinylpyrrolidones, polyvinyl acetals, polyalkylene oxides, water-soluble celluloses, and modified products of these resins.

Polyvinyl alcohols are particularly preferred, as they have the types of physical properties required of a pretreatment agent for an inkjet ink, such as good transparency, coating film strength and binder strength to pigments, and are also readily available and available in many forms including modified products. Moreover, in terms of suppressing changes in the pH over time, it is most desirable to use a polyvinyl alcohol having a degree of saponification of at least 95%.

In other words, in one embodiment, when a polyvinyl alcohol having a degree of saponification of at least 95% is used as the above binder resin, in addition to the effects of improving the water resistance and suppressing cracking of the coating film, an ink aggregation layer of excellent gloss and transparency can be obtained, and a pretreatment solution that exhibits excellent pH stability over time can be obtained with ease. Further, polyvinyl alcohol modified products, and particularly polyvinyl alcohols that have been modified with a hydrophobic group, provide improved liquid storage stability and facilitate further improvement in the water resistance, and are therefore extremely desirable.

When the pretreatment solution contains a binder resin, the number average molecular weight (Mn) of the binder resin is preferably from 3,000 to 90,000, and particularly preferably from 4,000 to 86,000. Binder resins having a molecular weight within the above range generally exhibit the desired water resistance, do not cause ink coating film cracking as a result of swelling of the ink aggregation layer, and also enable satisfactory movement of the polyvalent metal ions, meaning the aggregation effect is not impaired, and are consequently preferred. Moreover, by using a binder resin having a number average molecular weight within the above range, the viscosity of the pretreatment solution can be adjusted to a value within a preferred range.

The number average molecular weight mentioned in this description can be measured by typical methods. In one example, the number average molecular weight can be measured as a polystyrene-equivalent number average molecular weight, using a TSKgel column (manufactured by Tosoh Corporation) and a GPC (HLC-8120GPC, manufactured by Tosoh Corporation) fitted with an RI detector, and using THF as the eluent.

<Surfactant>

The pretreatment solution of the embodiment described above preferably also contains a surfactant in order to adjust the surface tension and improve the wettability of the recording medium. Many types of surfactants are known, including acetylene-based, siloxane-based, acrylic-based and fluorine-based surfactants, which may be selected in accordance with the application. Among these surfactants, from the viewpoint of achieving a combination of favorable wettability of the recording medium, good wet spreadability of the subsequently applied inkjet ink, and favorable printing stability for the pretreatment solution, the use of a siloxane-based and/or acetylene-based surfactant is preferred. Moreover, in terms of making it easier to prevent irregularities during application of the pretreatment solution, the use of an acetylene-based surfactant is the most desirable.

The surfactant may be synthesized using conventional methods, or a commercially available product may be used.

When the surfactant is selected from commercially available products, examples of siloxane-based surfactants that can be used include:

BY16-201, FZ-77, FZ-2104, FZ-2110, FZ-2162, F-2123, L-7001, L-7002, SF8427, SF8428, SH3749, SH8400, 8032 Additive and SH3773M (all manufactured by Dow Corning Toray Co., Ltd.), TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270 and TEGO Wet 280 (all manufactured by Evonik Degussa GmbH), SAG-002 and SAG-503A (manufactured by Nissin Chemical Co., Ltd.), BYK-331, BYK-333, BYK-345, BYK-346, BYK-347, BYK-348, BYK-349, BYK-UV3500, and BYK-UV3510 (all manufactured by BYK-Chemie GmbH), and KF-351A, KF-352A, KF-353, KF-354L, KF355A, KF-615A, KF-640, KF-642, and KF-643 (all manufactured by Shin-Etsu Chemical Co., Ltd.).

Further, examples of acetylene-based surfactants that can be used include:

Surfynol 61, 104E, 104H, 104A, 104BC, 104DPM, 104PA, 104PG-50, 420, 440, 465, 485, SE and SE-F, and Dynol 604 and 607 (all manufactured by Air Products and Chemicals, Inc.), and OLFINE E1004, E1010, E1020, PD-001, PD-002W, PD-004, PD-005, EXP. 4001, EXP. 4200, EXP. 4123 and EXP. 4300 (all manufactured by Nissin Chemical Co., Ltd.).

One of the above surfactants may be used alone, or a combination of two or more surfactants may be used.

In one embodiment, the amount of the surfactant added to the pretreatment solution, relative to the total weight of the pretreatment solution, is preferably at least 0.01% by weight but not more than 5.0% by weight, and is particularly preferably at least 0.05% by weight but not more than 3.0% by weight. However, the amount of the surfactant is preferably determined with due consideration of the surface tension of the inkjet ink described below.

In one embodiment, from the viewpoint of preventing bleeding on the printed matter, the surface tension of the pretreatment solution is preferably the same as, or larger than, the surface tension of the inkjet ink. By ensuring that the surface tension of the pretreatment solution is larger than the surface tension of the inkjet ink, the surfactant orients suitably with the coating film surface when the pretreatment solution is applied to the recording medium, meaning the wet spreading of the subsequently printed inkjet ink is not impaired, which is desirable.

From the viewpoint of ensuring that the pretreatment solution of the embodiment described above is suitable for high-speed printing to all manner of recording media, a surfactant for which the HLB (Hydrophile-Lipophile Balance) value, which is the parameter that indicates the hydrophilicity or hydrophobicity of a material, is within a range from 1 to 8 is preferably used as the surfactant contained in the pretreatment solution.

Surfactants having an HLB value of 8 or less exhibit excellent orientation speed at the surface of the pretreatment solution, and therefore immediately following application to a recording medium, the surfactant moves to the interface between the recording medium and the pretreatment solution, thereby improving the wetting properties of the pretreatment solution. Further, by adjusting the HLB value to a value within a range from 1 to 8, wettability of the subsequently applied inkjet ink can be ensured, thus enabling a further improvement in the image quality. The use of a surfactant having an HLB value of 1.5 to 6.5 is even more preferable, and an HLB value of 2 to 5 is particularly desirable.

The HLB value of a surfactant can be calculated using the Griffin method if the structure of the surfactant is clearly understood. On the other hand, in those cases where the surfactant contains a compound having an unknown structure, the HLB value of the surfactant can be determined experimentally, for example using the method disclosed on page 324 of "The Surfactant Handbook" (edited by Ichiro Nishi et al., Sangyo-Tosho Publishing Co. Ltd., 1960). Specifically, 0.5 g of the surfactant is dissolved in 5 ml of ethanol, and with the solution undergoing stirring at 25° C., a titration is performed with a 2% by weight aqueous solution of phenol, with the point where the solution becomes cloudy being deemed the end point. If the amount of the aqueous solution of phenol required to reach the end point is deemed A (mL), then the HLB value can be calculated using the following formula (2).

HLB value=0.89×*A*+1.11      Formula (2):

<Water>

The amount of water contained in the pretreatment solution of the embodiment described above, relative to the total weight of the pretreatment solution, is preferably within a range from 10 to 90% by weight, more preferably from 20 to 85% by weight, and even more preferably from 30 to 80% by weight.

<Other Materials>

In one embodiment, a pH modifier may also be added to the pretreatment solution of the embodiment described above for purposes such as suppressing damage to the members used in the coating apparatus, maximizing the suppression effect of the ink aggregation layer on bleeding, and suppressing pH fluctuations over time in order to maintain the performance of the pretreatment solution over a long period of time.

In the present invention, any material having a pH-modifying function may be selected as required. For example, in those cases where basification is required, alkanolamines such as dimethylethanolamine, diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate may be used.

Further, in those cases where acidification is required, compounds such as hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid and glutamic acid may be used.

Any of the above pH modifiers may be used alone, or a combination of two or more modifiers may be used. In order to strictly control the pH and maximize the desired physical properties, the use of a combination of two or more pH modifiers is preferred.

The amount added of the pH modifier, relative to the total weight of the pretreatment solution, is preferably from 0.01 to 5% by weight, and more preferably from 0.1 to 4.5% by weight. If the amount added of the pH modifier is too small, then there is a possibility that external stimuli such as the dissolution of carbon dioxide may cause an immediate change in the pH. On the other hand, if the pH modifier is added in excess, then there is possibility that the functionality of the metal salt in the pretreatment solution may be impaired. Accordingly, the amount added of the pH modifier is preferably adjusted so as to satisfy the above range.

(Other Additives)

In one embodiment, the pretreatment solution may, if required, also contain other additives such as antifoaming agents and preservatives in order to achieve certain desired physical property values. In those cases where these types of additives are used, the amount added, relative to the total weight of the pretreatment solution, is preferably at least 0.01% by weight but not more than 10% by weight, and is more preferably at least 0.01% by weight but not more than 5% by weight. If these additives are added in excess, then there is a possibility that the functionality of the metal salt in the pretreatment solution may be impaired, and therefore the amount added is preferably adjusted so as to satisfy the above range.

<Method for Producing Pretreatment Solution>

In one embodiment, the pretreatment solution described above can be produced, for example, by combining the components including the metal salt, the water and the organic solvent, adding the binder resin, the surfactant, the pH modifier and the types of additives described above as necessary, stirring and mixing the resulting mixture, and then performing a filtration if required. The binder resin may be dissolved or dispersed in advance in the water or organic solvent, and added in the form of a binder resin solution or dispersion. The method for producing the pretreatment solution of the present invention is not limited to this method.

During dissolution of the binder resin and/or stirring and mixing of the pretreatment solution, the mixture may be heated at a temperature within a range from 40 to 100° C. if necessary. However, in those cases where resin microparticles are used as the binder resin, heating is preferably performed at a temperature lower than the minimum film-forming temperature (MFT) of the resin microparticles.

Further, when a filtration is performed, there are no particular limitations on the filter pore size, provided that coarse particles and dust can be removed. In one embodiment, the filter pore size is preferably from 0.3 to 10 and more preferably from 0.5 to 5 μm. When filtration is performed, a single type of filter may be used, or a combination of a plurality of filters may be used.

<Physical Properties of the Pretreatment Solution>

Although there are no particular limitations on the pH of the pretreatment solution of the embodiment described above, a pH that satisfies 4≤pH≤9 enhances the aggregation effect of the inorganic metal salt and/or organic metal salt, and is consequently preferred. A particularly preferred pH range is from 5 to 8.

The above pH can be measured by conventional methods, for example by using a desktop pH meter F-72 manufactured by Horiba, Ltd., and either a standard ToupH electrode or a sleeve ToupH electrode.

The viscosity at 25° C. of the pretreatment solution of the above embodiment is preferably adjusted to a value greater than 9 mPa·s but not more than 30 mPa·s. By adjusting the viscosity to a value within this range, uniform coating can be achieved without the pretreatment solution flowing during drying and causing localized variations in the film thickness. Provided the pretreatment solution satisfies the above viscosity range, the pretreatment solution can be adapted to the various printing methods described below. Further, from the viewpoint of achieving excellent coating uniformity at high speed and ensuring excellent functionality regardless of the printing method used for the pretreatment solution, the viscosity of the pretreatment solution at 25° C. is more preferably from 9.5 to 29 mPa·s, and most preferably from 10 to 28 mPa·s.

The viscosity of the pretreatment solution of the embodiment described above can be measured, for example, using an E-type viscometer (TVE25L viscometer, manufactured by Toki Sangyo Co., Ltd.).

The surface tension at 25° C. of the pretreatment solution of the embodiment described above is preferably from 20 to 45 mN/m. By ensuring that the surface tension of the pretreatment solution falls within the above range, the instantaneous wetting properties are favorable, and coating irregularities can be suppressed, particularly during high-speed printing, enabling uniform coating to be achieved.

Further, the wetting properties of the ink subsequently applied to the recording medium are also favorable.

In other words, even during high-speed printing, the filling and coating uniformity of the printed matter is favorable, and printed matter of superior image quality can be obtained. From the viewpoint of obtaining a pretreatment solution that can also be used in ultra-high-speed printing at close to 100 m/min, the above surface tension of the pretreatment solution at 25° C. is more preferably from 21 to 43 mN/m, particularly preferably from 22 to 42 mN/m, and most preferably from 23 to 40 mN/m. Furthermore, as mentioned above, ensuring that the surface tension value for the pretreatment solution is the same as, or larger than, the surface tension of the inkjet ink is preferred, as this improves the wetting properties of the ink applied to the ink aggregation layer (the layer of the pretreatment solution), and can also reduce bleeding and color irregularities.

The surface tension of the pretreatment solution of the embodiment described above can be measured, for example, using a surface tensiometer (CBVPZ manufactured by Kyowa Interface Science Co., Ltd.) and the platinum plate method in an atmosphere at 25° C.

<Coating Amount of Pretreatment Solution>

The coating amount of the pretreatment solution of the present invention applied to the recording medium is preferably from 1 to 25 g/m². By adjusting the coating amount to a value within the above range, bleeding and cracking can be suppressed, the drying properties of the pretreatment solution layer following coating are favorable, adhesion to the inside of the coating apparatus and set-off that occurs when the substrates are stacked following printing can be prevented, and printed matter having no tack (stickiness) can be obtained.

The coating amount of the pretreatment solution on the recording medium can be determined, for example, using the following formula (3), based on the weight increase when full-surface coating is performed to a prescribed area of the recording medium.

(Coating amount of pretreatment solution)(g/m²)= $(A-B)/C$  Formula (3):

In formula (3), A represents the weight (g) of the recording medium following full-surface coating using the pretreatment solution, B represents the weight of only the recording medium prior to performing coating, and C represents the area (m²) of the recording medium across which coating is performed.

Second Embodiment

A second embodiment of the pretreatment solution relates to a pretreatment solution which is used together with an aqueous inkjet ink that contains at least a pigment, wherein the pretreatment solution contains an organic solvent, an inorganic metal salt and/or an organic metal salt, and an organic amine. The pretreatment solution of this embodiment contains the inorganic metal salt and/or an organic metal salt and the organic amine in a dissolved state, and the pH difference between the aqueous inkjet ink and the pretreatment solution is not more than 2.0. In one embodiment, the pH difference between the aqueous inkjet ink and the pretreatment solution may be 0. The pretreatment solution of this embodiment is characterized by containing an organic amine, and by having a difference in pH from the pH of the inkjet ink used in combination with the pretreatment solution that falls within a specified range. The effects of these requirements are described below in detail.

In the pretreatment solution of this embodiment, the difference between the pH of the pretreatment solution and the pH of the inkjet ink is prescribed. The inventors of the present invention discovered that by bringing the pH of the pretreatment solution and the pH of the inkjet ink closer together, and more specifically by ensuring that the pH difference was not more than 2, image formation of high image quality was easier. In other words, although the reasons are not entirely clear, it was very evident that the aggregation effect of the inorganic metal salt and/or organic metal salt was fully realized, with a satisfactory aggregation effect being obtained even during high-speed and high-print ratio printing.

Although there are no particular limitations on the pH of the pretreatment solution, in one embodiment, the pH preferably satisfies ph≥7. In this case, the aggregation effect of the inorganic metal salt and/or organic metal salt is enhanced, and damage such as corrosion to the members, and particularly the metal members, used in the printing apparatus for housing the pretreatment solution can be easily suppressed.

On the other hand, although there are no particular limitations on the pH of the inkjet ink, the ink is preferably weakly basic. In this case, the range of solid components that can be selected for use in the inkjet ink can be expanded, and damage to the inkjet head can be more easily suppressed.

In this description, the aforementioned pH difference means the absolute value of the difference (A–B) between the pH value (A) of the inkjet ink and the pH value (B) of the pretreatment solution.

In order to improve the image quality in high-speed printing, the coating uniformity of the pretreatment solution on the recording medium is very important. Conventionally, this coating uniformity has been improved by a method in which the surface tension of the pretreatment solution is lowered by adding an organic solvent or a surfactant. However, using this type of method to adapt to even higher speed printing has proven difficult.

In contrast, the inventors of the present invention ascertained that including an organic amine in the pretreatment solution was an effective method for improving the image quality in high-speed printing. By altering the amount added, the organic amine can also be used for controlling the pH of the pretreatment solution. Accordingly, the organic amine can also be used favorably as a pH modifier for adjusting the pH difference between the pretreatment solution and the inkjet ink, and the inventors of the present invention also found that, surprisingly, the use of an organic amine yielded the maximum aggregation effect from the inorganic metal salt and/or organic metal salt used as the aggregation agent.

The constituent elements of the pretreatment solution of the second embodiment are described below in detail.

<Inorganic Metal Salt and/or Organic Metal Salt>

The pretreatment solution of this embodiment contains an inorganic metal salt and/or organic metal salt in a dissolved state. The metal salt lowers the dissolution and/or dispersion functionality of the inkjet ink on the recording medium, causing aggregation of the pigment that improves bleeding and color irregularities caused by mixing of the ink droplets.

Examples of other materials that also exhibit these effects include cationic resins and organic acids. However, compared with these materials, metal salts are of low molecular weight, facilitating movement of the cationic component, and are also stable in solution. Accordingly, when an inkjet ink is discharged onto a recording medium to which the pretreatment solution has been applied, even in the case of a high print ratio, the cationic components can move almost instantly right through into the uppermost portions of the inkjet ink layer and cause pigment aggregation. As a result, even during high-speed printing, bleeding and color irregularities do not occur, and high-image quality printing can be achieved.

In this description, the expression "dissolved state" describes a state in which the inorganic metal salt and/or organic metal salt has mixed uniformly with the liquid components including water to form a transparent solution. Determination of whether or not a dissolved state has been achieved can be made, for example, by leaving the solution to stand at 25° C. for 24 hours, and then inspecting the solution with the naked eye to confirm whether or not the solution is transparent. In those cases where the pretreatment solution used in this determination contains the inorganic metal salt and/or organic metal salt and a material other than water, a solution can be prepared and evaluated by substituting the water with the other material. The description that the organic amine is included in a dissolved state has a similar meaning to that described above.

The metal salt may be an inorganic metal salt, an organic metal salt, or a combination of the two. For the metal salt, either a single salt may be used alone, or a combination of two or more salts may be used. Further, there are no particular limitations on the metal salt, provided the metal salt is composed of a metal ion and an anion that is bonded to the metal ion.

Among the various possibilities, in terms of undergoing an instant interaction with the pigment, thereby suppressing bleeding and enabling the formation of a sharp image with no color irregularities, the metal salt preferably contains a polyvalent metal salt.

Specific examples of the inorganic metal salt include sodium chloride, potassium chloride, calcium chloride, magnesium chloride, aluminum chloride, calcium bromide, magnesium bromide, sodium nitrate, calcium nitrate, magnesium nitrate, sodium sulfate, magnesium sulfate, aluminum sulfate, calcium carbonate, and magnesium carbonate. However, the inorganic metal salt is not limited to these salts. Among these inorganic metal salts, chlorides are particularly preferred as they generally exhibit a high degree of solubility in water. Moreover, among these inorganic metal salts, in terms of having a high degree of solubility in water, and ensuring that the interactions with the components in the inkjet ink occur efficiently and rapidly, calcium chloride is particularly preferred.

Further, examples of the organic metal salt include the calcium salts, magnesium salts, nickel salts, and zinc salts and the like of organic acids such as pantothenic acid, propionic acid, ascorbic acid, acetic acid and lactic acid. However, the organic metal salt is not limited to these salts. Among these organic acid metal salts, in terms of the degree of solubility in water and the interaction with the components in the inkjet ink, the calcium salts of lactic acid and/or acetic acid are particularly preferred.

In one embodiment, the metal salt used in the pretreatment solution preferably contains at least one salt selected from the group consisting of $CaCl_2 \cdot 2H_2O$, $MgCl_2 \cdot 6H_2O$, $MgSO_4$, $Ca(NO_3)_2$, NaCl, $(CH_3COO)_2Ca \cdot H_2O$, $CH_3COONa \cdot 3H_2O$, and $(CH_3CH(OH)COO)_2Ca \cdot 5H_2O$.

In the pretreatment solution of the embodiment described above, the amount of the above metal salt, recorded as an amount of metal ions relative to the total weight of the pretreatment solution, is preferably at least 0.7% by weight. The amount of the metal salt is, in order of preference, more preferably at least 1% by weight, at least 2% by weight, at least 2.3% by weight, or 2.5% by weight or greater. On the other hand, the amount of the metal salt is preferably not more than 17% by weight. The amount of the metal salt is, in order of preference, more preferably not more than 15% by weight, or 14% by weight or less.

In one embodiment, the amount of the metal salt is preferably from 1 to 15% by weight, and particularly preferably from 1.5 to 10% by weight. By ensuring that the amount of metal ions falls within the above range, the viscosity of the pretreatment solution can be adjusted to a value within the preferred range, and a satisfactory interaction with the inkjet ink can be achieved without impairing the texture of the recording medium.

The amount of metal ions relative to the total weight of the pretreatment solution is determined using the following formula (1).

(Amount of metal ions)(% by weight)=$WC \times MM/MC$  Formula (1):

In formula (1), WC represents the amount of the inorganic metal salt and/or organic metal salt relative to the total weight of the pretreatment solution, MM represents the ion content of the metal ions that constitute the inorganic metal salt and/or organic metal salt, and MC represents the molecular weight of the inorganic metal salt and/or organic metal salt.

<Organic Amine>

The pretreatment solution of the embodiment described above contains an organic amine in a dissolved state. As mentioned above, in the pretreatment solution of this embodiment, the organic amine enables uniform coating of the pretreatment solution onto the recording medium during high-speed printing. As a result, the aggregation effect of the inorganic metal salt and/or organic metal salt that acts as the aggregation agent can manifest uniformly across the entire surface of the printed matter, enabling printed matter of high image quality to be printed in a short period of time. At the same time, the organic amine also functions as a pH modifier that can adjust the pH difference relative to the pH of the inkjet ink to a value of not more than 2 without impairing the aggregation effect of the inorganic metal salt and/or organic metal salt that acts as the aggregation agent, meaning the aggregation effect can be maximized, and printed matter of superior image quality can be produced.

In one embodiment, a single organic amine may be used alone, or a combination of two or more organic amines may be used. Although there are no particular limitations on the organic amine, secondary amines and/or tertiary amines not only improve coating irregularities of the pretreatment solution during high-speed printing, but are also preferable in terms of safety, odor, and pH modifying capability. Examples of preferred organic amines include, but are not limited to, alkanolamines such as dimethylethanolamine, diethanolamine, triethanolamine and N-methyldiethanolamine.

The blend amount of the organic amine in the pretreatment solution of the embodiment described above is preferably at least 0.1% by weight relative to the total weight of the pretreatment solution. The blend amount of the organic amine is, in order of preference, more preferably at least 0.15% by weight, at least 0.3% by weight, or 0.4% by weight or greater. On the other hand, the blend amount of the organic amine, is preferably not more than 10% by weight. The blend amount of the organic amine is, in order of preference, more preferably not more than 7% by weight, not more than 5% by weight, or 4% by weight or less.

In one embodiment, the blend amount of the organic amine is preferably from 0.15 to 3% by weight, and particularly preferably from 0.2 to 2% by weight. By adjusting the blend amount of the organic amine to a value within this range, coating irregularities of the pretreatment solution during high-speed printing can be eliminated, color irregularities within the inkjet ink can be eliminated, and impairment of the aggregation effect of the metal salt and changes to the texture of the recording medium caused by excessive addition of the organic amine can be more easily suppressed.

In one embodiment, from the viewpoints of preventing drying and adhesion of the organic amine to the apparatus during application of the pretreatment solution, the boiling point of the above organic amine is preferably at least 100° C., and from the viewpoint of preventing any deterioration in the drying properties during high-speed printing, the boiling point is preferably not more than 400° C.

In one embodiment, the molecular weight of the organic amine is preferably a weight average molecular weight (Mw) of not more than 500. By using an organic amine with such a molecular weight, not only can coating irregularities of the pretreatment solution during high-speed printing be ameliorated, but the viscosity of the pretreatment solution can also be adjusted to a value within the preferred range. When the organic amine is a single substance, the above weight average molecular weight can be taken to mean the molecular weight of the single substance.

<Surfactant>

The pretreatment solution of the embodiment described above preferably also contains a surfactant in order to adjust the surface tension and improve the wettability of the recording medium. Many types of surfactants are known, including acetylene-based, siloxane-based, acrylic-based and fluorine-based surfactants, which may be selected in accordance with the application. In order to achieve a combination of favorable wettability of the recording medium, good wet spreadability of the subsequently applied inkjet ink, and favorable printing stability for the pretreatment solution, the use of a siloxane-based and/or acetylene-based surfactant is preferred. In addition, in terms of enabling the prevention of irregularities during application of the pretreatment solution, the use of an acetylene-based surfactant is the most desirable.

The surfactant may be synthesized using conventional methods, or a commercially available product may be used.

When the surfactant is selected from commercially available products, examples of siloxane-based surfactants that can be used include:

BY16-201, FZ-77, FZ-2104, FZ-2110, FZ-2162, F-2123, L-7001, L-7002, SF8427, SF8428, SH3749, SH8400, 8032 Additive and SH3773M (all manufactured by Dow Corning Toray Co., Ltd.), TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270 and TEGO Wet 280 (all manufactured by Evonik Degussa GmbH), SAG-002 and SAG-503A (manufactured by Nissin Chemical Co., Ltd.), BYK-331, BYK-333, BYK-345, BYK-346, BYK-347, BYK-348, BYK-349, BYK-UV3500, and BYK-UV3510 (all manufactured by BYK-Chemie GmbH), and KF-351A, KF-352A, KF-353, KF-354L, KF355A, KF-615A, KF-640, KF-642, and KF-643 (all manufactured by Shin-Etsu Chemical Co., Ltd.).

Further, examples of acetylene-based surfactants that can be used include:

Surfynol 61, 104E, 104H, 104A, 104BC, 104DPM, 104PA, 104PG-50, 420, 440, 465, 485, SE and SE-F, and Dynol 604 and 607 (all manufactured by Air Products and Chemicals, Inc.), and OLFINE E1004, E1010, E1020, PD-001, PD-002W, PD-004, PD-005, EXP. 4001, EXP. 4200, EXP. 4123 and EXP. 4300 (all manufactured by Nissin Chemical Co., Ltd.).

One of the above surfactants may be used alone, or a combination of two or more surfactants may be used.

The amount of the surfactant added to the pretreatment solution of the embodiment described above, relative to the total weight of the pretreatment solution, is preferably at least 0.01% by weight but not more than 5.0% by weight, and is particularly preferably at least 0.05% by weight but not more than 3.0% by weight. However, the amount of the surfactant is preferably determined with due consideration of the surface tension of the inkjet ink described below.

In one embodiment, from the viewpoint of preventing bleeding on the printed matter, the surface tension of the pretreatment solution is preferably the same as, or larger than, the surface tension of the inkjet ink. When the surface tension of the pretreatment solution is smaller than the surface tension of the inkjet ink, a large amount of the surfactant is oriented at the coating film surface when the pretreatment solution is applied to the recording medium, causing a decrease in the surface energy, and as a result, the wet spreadability of the subsequently printed inkjet ink tends to be unsatisfactory, increasing the likelihood of bleeding.

Further, in one embodiment, in order to ensure that the pretreatment solution is suitable for high-speed printing to all manner of recording media, a surfactant for which the HLB (Hydrophile-Lipophile Balance) value is within a range from 1 to 8 is preferably used. The HLB value is the parameter that indicates the hydrophilicity or hydrophobicity of a material.

Surfactants having an HLB value of 8 or less exhibit excellent orientation speed at the surface of the pretreatment solution. Accordingly, immediately following application of the pretreatment solution to the recording medium, the surfactant moves to the interface between the recording medium and the pretreatment solution, thereby improving the wetting properties of the pretreatment solution. Further, by adjusting the HLB value to a value within a range from 1 to 8, wettability of the subsequently applied inkjet ink can be ensured, thus enabling a further improvement in the image quality. The use of a surfactant having an HLB value of 1.5 to 6.5 is even more preferable, and an HLB value of 2 to 5 is particularly desirable.

The HLB value of a surfactant can be calculated using the Griffin method if the structure of the surfactant is clearly understood. On the other hand, in those cases where the surfactant contains a compound having an unknown structure, the HLB value of the surfactant can be determined experimentally, for example using the method disclosed on page 324 of "The Surfactant Handbook" (edited by Ichiro Nishi et al., Sangyo-Tosho Publishing Co. Ltd., 1960). Specifically, the method is as follows. First, 0.5 g of the surfactant is dissolved in 5 ml of ethanol, and with the solution undergoing stirring at 25° C., a titration is performed with a 2% by weight aqueous solution of phenol, with the point where the solution becomes cloudy being deemed the end point. Then, if the amount of the aqueous solution of phenol required to reach the end point is deemed A (mL), then the HLB value can be calculated in accordance with the following formula (2).

$$\text{HLB value} = 0.89 \times A + 1.11 \qquad \text{Formula (2):}$$

<Organic Solvent>

The pretreatment solution of the embodiment described above contains an organic solvent. By appropriate selection of the organic solvent, the moisture retention properties, drying properties and wetting properties of the pretreatment solution can be further enhanced. In this description, the organic amine described above is not included within the definition of the organic solvent.

Although there are no particular limitations on the organic solvents that can be used in the pretreatment solution, from the viewpoints of affinity with the water and the inorganic metal salt and/or organic metal salt, and the solubility of the inorganic metal salt and/or organic metal salt, a water-soluble organic solvent is preferred. In the pretreatment solution of the above embodiment, at least a compound having one or more hydroxyl groups in the molecular structure is used as the organic solvent. Among such compounds, the use of an alcohol is preferred.

Examples of water-soluble organic solvents that can be used favorably in the pretreatment solution include:

monohydric alcohols such as methanol, ethanol, 1-propanol, 2-propanol, 1-butanol, 2-butanol, 3-methoxy-1-butanol, and 3-methoxy-3-methyl-1-butanol, dihydric alcohols (glycols) such as 1,2-ethanediol, 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentan-2,4-diol, 2-ethyl-1,3-hexanediol, 1,2-octanediol, ethylene glycol, diethylene glycol, triethylene glycol, dipropylene glycol, butylene glycol, and dibutylene glycol, and trihydric alcohols such as glycerol.

Among the alcohols listed above, the use of a monohydric alcohol such as ethanol, 1-propanol, 2-propanol, 3-methoxy-1-butanol or 3-methoxy-3-methyl-1-butanol is particularly preferred. Further, a single compound having one or more hydroxyl groups in the molecular structure may be used alone, or a combination of two or more such compounds may be used.

The amount of the alcohol having one or more hydroxyl groups in the molecular structure contained in the pretreatment solution is preferably at least 0.1% by weight relative to the total weight of the pretreatment solution. This amount is, in order of preference, more preferably at least 1% by weight, at least 3% by weight, at least 5% by weight, or 7% by weight or greater. On the other hand, the above amount is preferably not more than 30% by weight relative to the total weight of the pretreatment solution. The amount is, in order of preference, more preferably not more than 25% by weight, not more than 20% by weight, not more than 17% by weight, or 12% by weight or less.

In one embodiment, the blend amount of the alcohol having one or more hydroxyl groups in the molecular structure, relative to the total weight of the pretreatment solution, is preferably from 0.1 to 20% by weight, more preferably from 0.5 to 10% by weight, and particularly preferably from 1 to 5% by weight. In another embodiment, the blend amount is preferably from 3 to 30% by weight, more preferably from 5 to 25% by weight, and particularly preferably from 7 to 20% by weight.

By ensuring that the blend amount of the alcohol used as the water-soluble organic solvent falls within one of the above ranges, a pretreatment solution that combines favorable moisture retention properties, drying properties and wetting properties can be obtained. Further, stable printing can be performed over long periods, regardless of the printing method used for the pretreatment solution.

In addition to the alcohol described above, the pretreatment solution may also contain other organic solvents. Examples of these other solvents include:

glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, tripropylene glycol monomethyl ether, and tripropylene glycol monoethyl ether, glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether, nitrogen-containing solvents such as 2-pyrrolidone, N-methylpyrrolidone, N-ethylpyrrolidone, ε-caprolactam, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, and N,N-diethyl-β-octoxypropionamide, and heterocyclic compounds such as γ-butyrolactone, γ-valerolactone, δ-valerolactone, and ε-caprolactone.

Among the above organic solvents, the use of a water-soluble organic solvent is preferred. Any of the above organic solvents may be used alone, or a combination of two or more solvents may be used.

The total amount of water-soluble organic solvents contained in the pretreatment solution, relative to the total weight of the pretreatment solution, is preferably from 0.1 to 50% by weight, more preferably from 0.15 to 30% by weight, and particularly preferably from 0.2 to 20% by weight. By ensuring that the amount of water-soluble organic solvents falls within the above range, a combination of favorable moisture retention properties, drying properties and wetting properties can be achieved for the pretreatment solution.

In one embodiment, the organic solvent contained in the pretreatment solution of the present invention preferably contains no organic solvents having a boiling point of 200° C. or higher. Further, in one embodiment, the amount of organic solvents having a boiling point of 200° C. or higher, based on the total weight of the pretreatment solution, is preferably not more than 25% by weight, more preferably not more than 20% by weight, and even more preferably 15% by weight or less.

By ensuring that the pretreatment solution either contains no organic solvents having a boiling point of 200° C. or higher, or if present, has an amount of such solvents that falls within the above range, favorable drying properties can be achieved for the pretreatment solution during high-speed printing. In those cases where the pretreatment solution contains an organic solvent having a boiling point of 200° C. or higher, the amount of that solvent, relative to the total weight of the pretreatment solution, is more preferably from 0.1 to 15% by weight, and even more preferably from 0.1 to 10% by weight.

Of the organic solvents listed above, those having a boiling point of 200° C. or higher include:

dihydric alcohols such as 1,3-propanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-ethyl-1,3-hexanediol, 1,2-octanediol, diethylene glycol, triethylene glycol, dipropylene glycol, butylene glycol, and dibutylene glycol, trihydric alcohols such as glycerol, and glycol monoalkyl ethers such as diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monopropyl ether, tripropylene glycol monomethyl ether, and tripropylene glycol monoethyl ether, glycol dialkyl ethers such as diethylene glycol butyl methyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether, and the nitrogen-containing solvents and heterocyclic compounds listed above.

In those cases where these organic solvents are used, they may be used in a blend amount of not more than 20% by weight based on the total weight of the pretreatment solution. Among the above organic solvents, the use of water-soluble organic solvents is preferred.

In one embodiment, from the viewpoint of achieving a more favorable pretreatment solution in terms of ensuring high-speed printability to a variety of recording media and improving the image quality, the water-soluble organic solvent contained in the pretreatment solution preferably includes an organic solvent having a low surface tension.

In the pretreatment solution of the embodiment described above, an organic amine is used to adapt the solution to high-speed printing, but the inventors of the present invention discovered that in order to ensure good high-speed printability and superior image quality on any form of recording media, it was even more effective to use an organic solvent having a small surface tension together with the organic amine. Although the reason for this is not entirely clear, it is thought that the organic solvent having a small surface tension has a function that assists the coating uniformity achieved by the organic amine.

Furthermore, in one embodiment, in terms of facilitating improvements in the wetting properties of the pretreatment solution on the recording medium and the image quality of the subsequently applied inkjet ink, the use of a combination of an organic solvent having a small surface tension and a surfactant having an aforementioned HLB value of 1 to 8 is particularly preferred.

In the present embodiment, the organic solvent having a small surface tension has a surface tension at 25° C. that is preferably from 20 to 32 mN/m, more preferably from 20 to 30 mN/m, and particularly preferably from 20 to 28 mN/m. By using an organic solvent having such a surface tension, the surface tension of the pretreatment solution can be adjusted to a value within a preferred range.

Further, the amount of the organic solvent having a small surface tension, relative to the total weight of water-soluble organic solvent in the pretreatment solution, is preferably from 35 to 100% by weight, more preferably from 40 to 100% by weight, and particularly preferably from 50 to 100% by weight. By ensuring that the amount of the organic solvent having a small surface tension falls within the above range, the surface tension reduction effect achieved by adding the organic solvent can manifest more favorably.

Among the water-soluble organic solvents listed above, examples of organic solvents having a surface tension at 25° C. that is from 20 to 32 mN/m include:

monohydric alcohols such as methanol, ethanol, 1-propanol, 2-propanol, 1-butanol, 2-butanol, 3-methoxy-1-butanol, and 3-methoxy-3-methyl-1-butanol, dihydric alcohols (glycols) such as 1,2-butanediol, 1,2-pentanediol, 1,2-hexanediol, 1,2-heptanediol, 2-methyl-2-propyl-1,3-propanediol, 2-methylpentan-2,4-diol, 2-ethyl-1,3-hexanediol, and 1,2-octanediol, glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, tripropylene glycol monomethyl ether, and tripropylene glycol monoethyl ether, and glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether.

Among these compounds, for the reasons described above, it is particularly preferable to select an alcohol having one or more hydroxyl groups in the molecular structure, and most preferable to include at least a monohydric alcohol. One of the above water-soluble organic solvents may be used alone, or a combination of two or more solvents may be used.

In one embodiment, the organic solvent in the pretreatment solution is preferably composed of a monohydric alcohol and a glycol having a boiling point of less than 200° C. For the monohydric alcohol, the use of one or more compounds selected from the group consisting of ethanol, 1-propanol, 2-propanol, 3-methoxy-1-butanol (3-methoxybutanol) and 3-methoxy-3-methyl-1-butanol is preferred. In one embodiment, it is preferable to use a combination of 2-propanol and 3-methoxybutanol. Further, for the glycol, the use of one or more compounds selected from the group consisting of 1,2-propanediol, 1,2-butanediol, 1,3-butanediol, 1,2-pentanediol, 1,2-hexanediol, diethylene glycol, triethylene glycol and dipropylene glycol is preferred. Among these, it is preferable to use 1,2-propanediol and/or diethylene glycol.

<Binder Resin>

In one embodiment, the pretreatment solution may also contain a binder resin. A binder resin is a water-soluble polymer compound that does not participate in the reaction between the inkjet ink and the pretreatment solution. By also including a binder resin, the water resistance of the printed matter can be improved, meaning the printed matter can be used in a variety of different applications. Generally, water-soluble resins and resin microparticles are known as binder resins, and either of these may be used in the present invention, but in terms of mixing instantly with the inkjet ink, thereby enabling the aggregation function of the pretreatment solution to manifest more effectively during high-speed printing, selection of a water-soluble binder resin is particularly preferred.

The amount of the above binder resin is specified relative to the total amount of metal ions contained in the pretreatment solution. The weight ratio of the amount of the above binder resin relative to the amount of metal ions derived from the inorganic metal salt and/or organic metal salt exceeds 0, but is preferably less than 50-fold, and particularly preferably less than 30-fold. If the amount of the binder resin is within this range, then compared with the case where no binder resin is added, the water resistance improves, and no waviness or curling occurs, meaning printed matter of high image quality and superior quality can be obtained with ease.

Any resin may be used as the binder resin, but as mentioned above, selecting a water-soluble binder resin is preferred. Among the various possible resins, using a nonionic water-soluble resin is preferred, and using a nonionic water-soluble resin is effective in improving the water resistance and suppressing waviness and curling. Further, provided the basic performance of the reaction solution can be maintained, a resin that also includes an added anionic unit or cationic unit in the nonionic polymer may be used, but the use of a resin that contains substantially none of these units is preferred. A "resin that contains substantially no anionic units or cationic units" means a resin having an acid value of 0 to 10 mgKOH/g and an amine value of 0 to 10 mgKOH/g. The above acid value and amine value can be measured, for example, using an automatic potentiometric titrator described below.

Specific examples of the binder resin include, but of course are not limited to, polyethyleneimines, polyamides, various quaternary ammonium salt group-containing water-soluble resins, polyacrylamides, polyvinylpyrrolidones, polyalkylene oxides, starches, water-soluble celluloses such as methyl cellulose, hydroxy cellulose, carboxymethyl cellulose, hydroxymethyl cellulose, hydroxypropyl cellulose and hydroxypropyl methylcellulose, polyvinyl methyl ethers, polyvinyl acetals, polyvinyl alcohols, and modified products of the above resins.

Among these binder resins, in terms of being able to absorb the liquid components in the subsequently printed inkjet ink, thereby improving the drying properties, particularly during high-speed printing, at least one resin is preferably selected from among polyvinyl alcohols, polyvinylpyrrolidones, polyvinyl acetals, polyalkylene oxides, and cellulose derivatives.

Polyvinyl alcohols are particularly preferred, as they have the types of physical properties required of a pretreatment agent for an inkjet ink, such as good transparency, coating film strength and binder strength to pigments, and are also readily available and available in many forms including modified products. Moreover, in terms of suppressing reduction in the pH over time, it is most desirable to use a polyvinyl alcohol having a degree of saponification of at least 95%.

In other words, in one embodiment, when a polyvinyl alcohol having a degree of saponification of at least 95% is used as the above binder resin, in addition to the effects of improving the water resistance and suppressing waviness and curling, an inkjet-receiving layer of excellent gloss and transparency can be obtained, and a pretreatment solution that exhibits excellent pH stability over time can be obtained with ease.

When the pretreatment solution contains a binder resin, the number average molecular weight (Mn) of the binder resin is preferably from 3,000 to 90,000, and particularly preferably from 4,000 to 86,000. Binder resins having a molecular weight within the above range generally exhibit the desired water resistance, do not suffer from waviness or curling of the recording medium caused by swelling of the ink-receiving layer, and also enable satisfactory movement of the cation component of the metal ions, meaning the aggregation effect is not impaired. Moreover, by using a binder resin having a number average molecular weight within the above range, the viscosity of the pretreatment solution can be adjusted to a value within a preferred range.

The number average molecular weight mentioned in the present invention can be measured by typical methods. In one example, the number average molecular weight can be measured as a polystyrene-equivalent number average molecular weight, using a TSKgel column (manufactured by Tosoh Corporation) and a GPC (HLC-8120GPC, manufactured by Tosoh Corporation) fitted with an RI detector, and using THF as the eluent.

<Water>

The amount of water contained in the pretreatment solution of the present invention, relative to the total weight of the pretreatment solution, is preferably within a range from 10 to 90% by weight, more preferably within a range from 20 to 85% by weight, and even more preferably within a range from 30 to 80% by weight.

<Other Materials>

As mentioned above, the pretreatment solution of the embodiment described above has a difference in pH from the pH of the inkjet ink that is either 0 or not more than 2. In order to ensure that the pH difference falls within this range, a pH modifier other than the organic amine may be added to the pretreatment solution.

Any material having a pH-modifying function may be selected as required. In those cases where basification is required, ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate may be used.

Further, in those cases where acidification is required, compounds such as hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid and glutamic acid may be used.

The amount added of the pH modifier other than the organic amine, relative to the total weight of the pretreatment solution, is preferably from 0.01 to 5% by weight, and more preferably from 0.05 to 3% by weight. However, if the pH modifier is added in excess, then there is possibility that the functionality of the metal salt in the pretreatment solution may be impaired, and therefore the amount added of the pH modifier is preferably adjusted so that the difference between the pH of the pretreatment solution and the pH of the inkjet ink is at least 0 but not more than 2.

(Other Additives)

In one embodiment, the pretreatment solution may, if required, also contain other additives such as antifoaming agents and preservatives in order to achieve certain desired physical property values. In those cases where these types of additives are used, the amount added, relative to the total weight of the pretreatment solution, is preferably at least 0.01% by weight but not more than 10% by weight.

<Method for Producing Pretreatment Solution>

The pretreatment solution composed of the components described above can be produced, for example, by combining the metal salt, the organic amine, the water and the water-soluble organic solvent, adding the binder resin, the surfactant, the pH modifier other than the organic amine and the types of additives described above as necessary, stirring and mixing the resulting mixture, and then performing a filtration if required. However, the method for producing the pretreatment solution of the present invention is not limited to this method.

During the stirring and mixing of the pretreatment solution, the mixture may be heated at a temperature within a range from 40 to 100° C. if necessary. However, in those cases where resin microparticles are used as the binder resin, heating is preferably performed at a temperature lower than the MFT of the resin microparticles.

Further, when a filtration is performed, there are no particular limitations on the filter pore size, provided that coarse particles and dust can be removed. In one embodiment, the filter pore size is preferably from 0.3 to 10 μm, and more preferably from 0.5 to 5 μm. When filtration is performed, a single type of filter may be used, or a combination of a plurality of filters may be used.

<Physical Properties of the Pretreatment Solution>

As mentioned above, although there are no particular limitations on the pH of the pretreatment solution of the present embodiment, it is preferable that pH≥7. This enhances the aggregation effect of the inorganic metal salt and/or organic metal salt. Moreover, damage such as corrosion to the members, and particularly the metal members, used in the printing apparatus for housing the pretreatment solution can be easily suppressed. A particularly preferred pH range is from 7 to 10.

The above pH can be measured by conventional methods, for example by using a desktop pH meter F-72 manufactured by Horiba, Ltd., and either a standard ToupH electrode or a sleeve ToupH electrode.

In one embodiment, the viscosity at 25° C. of the pretreatment solution is preferably adjusted to a value within a range from 2 to 100 mPa·s. Provided the pretreatment solution satisfies the above viscosity range, the pretreatment solution can be adapted to the various printing methods described below. Further, from the viewpoint of achieving excellent functionality regardless of the printing method used for the pretreatment solution, the viscosity of the pretreatment solution at 25° C. is more preferably from 3 to 80 mPa·s. The viscosity of the pretreatment solution at 25° C. is even more preferably from 4 to 60 mPa·s, and is most preferably from 5 to 30 mPa·s.

The viscosity of the pretreatment solution can be measured, for example, using an E-type viscometer (TVE25L viscometer, manufactured by Toki Sangyo Co., Ltd.) or a B-type viscometer (TVB10 viscometer, manufactured by Toki Sangyo Co., Ltd.), depending on the viscosity of the pretreatment solution.

In one embodiment, the surface tension at 25° C. of the pretreatment solution of the embodiment described above is preferably from 20 to 75 mN/m, more preferably from 21 to 65 mN/m, particularly preferably from 22 to 55 mN/m, and most preferably from 23 to 45 mN/m. Furthermore, as mentioned above, it is preferable that the surface tension value for the pretreatment solution is the same as, or larger than, the surface tension of the inkjet ink.

In the present invention, the surface tension of the pretreatment solution can be measured, for example, using a surface tensiometer (CBVPZ manufactured by Kyowa Interface Science Co., Ltd.) and the platinum plate method in an atmosphere at 25° C.

<Inkjet Ink>

The pretreatment solution of the first aspect of the present invention can be used favorably with any arbitrary inkjet ink, but a preferred embodiment of the inkjet ink is described below. In one embodiment, the constituent elements of the inkjet ink include the elements described below.

<Pigment>

From the viewpoint of having favorable water resistance, light resistance, weather resistance and gas resistance and the like, and from the viewpoint of achieving a faster aggregation speed than dyes and producing an image of higher image quality when the pretreatment solution of the present invention is used in high-speed printing, the inkjet ink preferably contains at least a pigment as a colorant.

Conventional organic pigments and inorganic pigments may be used as the pigment. In one embodiment, the amount of these pigments, relative to the total weight of the inkjet ink, is preferably at least 2% by weight but not more than 15% by weight, more preferably at least 2.5% by weight but not more than 15% by weight, and particularly preferably at least 3% by weight but not more than 10% by weight.

By ensuring that the pigment content is at least 2% by weight, satisfactory color development can be achieved even with one-pass printing. Further, by ensuring that the pigment content is not more than 15% by weight, the viscosity of the inkjet ink can be adjusted to a value within a range that is appropriate for inkjet printing, and the long-term stability of the inkjet ink can be favorably maintained, resulting in favorable printing stability over a long period.

Although not a particular limitation, the inkjet ink of the embodiment described above can be used particularly favorably in combination with the pretreatment solution described above as the first embodiment.

In another embodiment, the amount of the above pigment, relative to the total weight of the inkjet ink, is preferably at least 0.1% by weight but not more than 20% by weight, more preferably at least 0.5% by weight but not more than 15% by weight, and particularly preferably at least 1% by weight but not more than 10% by weight.

By ensuring that the pigment content is at least 0.1% by weight, satisfactory color development can be achieved even with one-pass printing. Further, by ensuring that the pigment content is not more than 20% by weight, the viscosity of the inkjet ink can be adjusted to a value within a range that is appropriate for inkjet printing, resulting in favorable printing stability over a long period.

Although not a particular limitation, the inkjet ink of the embodiment described above can be used particularly favorably in combination with the pretreatment solution described above as the second embodiment.

In one embodiment of the inkjet ink, examples of cyan organic pigments that can be used include C.I. Pigment Blue 1, 2, 3, 15:3, 15:4, 15:6, 16, 22, 60, 64 and 66. Of these, in terms of offering superior color development and light resistance, the selection one or more of C.I. Pigment Blue 15:3 and/or 15:4 is preferred.

In one embodiment of the inkjet ink, examples of magenta organic pigments that can be used include C.I. Pigment Red 5, 7, 12, 22, 23, 31, 48 (Ca), 48 (Mn), 49, 52, 53, 57 (Ca), 57:1, 112, 122, 146, 147, 150, 185, 238, 242, 254, 255, 266 and 269, and C.I. Pigment Violet 19, 23, 29, 30, 37, 40, 43 and 50.

Of these, in terms of offering superior color development and light resistance, one or more pigments selected from the group consisting of C.I. Pigment Red 122, 150, 185, 266, 269 and C.I. Pigment Violet 19 is preferred. Of these, C.I. Pigment Violet 19 exhibits color reproducibility close to Japan Color 2011 and the European Color Standard FOGRA39, and yields particularly superior color development properties when used in combination with the pretreatment solution of the present invention, and is consequently preferred.

In one embodiment of the inkjet ink, examples of yellow organic pigments that can be used include C.I. Pigment Yellow 10, 11, 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185 and 213. Of these, in terms of offering superior color development, one or more pigments selected from the group consisting of C.I. Pigment Yellow 13, 14, 74, 120, 180, 185 and 213 is preferred.

In one embodiment of the inkjet ink, examples of black organic pigments that can be used include aniline black, Lumogen black, and azomethine azo black. Further, a plurality of color pigments selected from among the cyan pigments, magenta pigments and yellow pigments described above, and the orange pigments, green pigments and brown pigments described below may also be used to form a black pigment.

In one embodiment of the present invention, special colors such as orange pigments, green pigments and brown pigments may also be used. Specific examples include C.I. Pigment Orange 16, 36, 43, 51, 55, 59, 61, 64 and 71, C.I. Pigment Green 7, 36, 43 and 58, and C.I. Pigment Brown 23, 25 and 26.

In one embodiment, there are no particular limitations on inorganic pigments that can be used, and examples include black pigments such as carbon blacks and iron oxide, and white pigments such as titanium oxide.

In one embodiment, examples of carbon black pigments that can be used include carbon blacks produced using the furnace method or the channel method. Of the various possibilities, one of these carbon blacks having properties including a primary particle size of 11 to 50 nm, a specific surface area measured by the BET method of 50 to 400 m$^2$/g, a volatile fraction of 0.5 to 10% by weight, and a pH of 2 to 10 is preferred.

Examples of commercially available products having these types of properties include:

No. 25, 30, 33, 40, 44, 45, 52, 850, 900, 950, 960, 970, 980, 1000, 2200B, 2300, 2350 and 2600, and MA7, MA8, MA77, MA100 and MA230 (manufactured by Mitsubishi Chemical Corporation), RAVEN 760UP, 780UP, 860UP, 900P, 1000P, 1060UP, 1080UP and 1255 (manufactured by Columbian Carbon Company), REGAL 330R, 400R, 660R and MOGUL L (manufactured by Cabot Corporation), and Nipex 160IQ, 170IQ, 35 and 75, PrinteX 30, 35, 40, 45, 55, 75, 80, 85, 90, 95 and 300, Special Black 350 and 550, and Nerox 305, 500, 505, 600 and 605 (manufactured by Orion Engineered Carbons S.A.), and any of these carbon blacks can be used favorably.

Further, titanium oxide can be used favorably as a white inorganic pigment. Either an anatase form or rutile form may be used as the titanium oxide, but use of the rutile form is preferred in terms of increasing the opacity of the printed matter. Further, titanium oxide produced by either the chlorine method or the sulfuric acid method may be used, but using titanium oxide produced by the chlorine method yields a high degree of whiteness, and is consequently preferred.

In one embodiment, titanium oxide pigments that can be used are preferably pigments in which the pigment surface has been treated with an inorganic compound and/or an organic compound. Examples of the inorganic compound include compounds of silicon, aluminum, zirconium, tin, antimony and titanium, as well as hydrates of these compounds. Further, examples of the organic compound include polyhydric alcohols and alkanolamines and derivatives thereof, higher fatty acids and metal salts thereof, and organometallic compounds. Among these, polyhydric alcohols and derivatives thereof yield a high degree of hydrophobization of the titanium oxide surface, enabling an improvement in the dispersion stability, and can therefore be used particularly favorably.

In one embodiment, in order to adjust the hue or color development of the printed matter to a desired range, a mixture of a plurality of the above pigments may be used. For example, in order to improve the color tone at low print ratios, a small amount of one or more pigments selected from among cyan organic pigments, magenta organic pigments, orange organic pigments and brown organic pigments may be added to a black ink that uses a carbon black pigment.

<Pigment Dispersion Resin>

Examples of methods for stably dispersing the above pigment in the inkjet ink and maintaining that dispersion include methods of achieving dispersion by adsorbing a pigment dispersion resin to the pigment surface, methods of achieving dispersion by adsorbing a water-soluble and/or water-dispersible surfactant to the pigment surface, methods of chemically or physically introducing a hydrophilic functional group at the pigment surface and achieving dispersion in the ink without requiring a dispersant or a surfactant, and microencapsulation methods of coating the pigment with a resin having self-dispersing properties.

In one embodiment, the inkjet ink is preferably prepared by selecting a method of using a pigment dispersion resin from among the above methods. The reason for this preference is that by appropriate investigation and selection of the monomer composition and the molecular weight of the pigment dispersion resin, the resin adsorption capability to the pigment and the electric charge of the pigment dispersion resin can be easily adjusted, and as a result, good dispersion stability can be imparted to fine pigments, and the ability of the pretreatment solution to reduce the dispersibility of the pigment can be controlled.

There are no particular limitations on the types of pigment dispersion resins that can be used, and examples of resins that may be used include acrylic resins, styrene/acrylic resins, maleic acid resins, styrene/maleic acid resins, urethane resins, and ester resins. In one embodiment, in terms of having a greater range of selectable materials and in terms of ease of synthesis, the use of an acrylic resin or a styrene/acrylic resin is particularly preferred. The pigment dispersion resin may be synthesized using a conventional method, or a commercially available resin may be used.

In one embodiment, it is preferable to introduce an alkyl group of 10 to 36 carbon atoms into the pigment dispersion resin. This is because by ensuring that the alkyl group has 10 to 36 carbon atoms, the viscosity of the pigment dispersion can be lowered, superior dispersion stability can be achieved, and better viscosity stability can be achieved.

The number of carbon atoms in the alkyl group is preferably from 12 to 30, and more preferably from 18 to 24. Provided the number of carbon atoms in the alkyl group is within the range from 10 to 36, the group may be linear or branched, but a linear alkyl group is preferred.

Examples of linear alkyl groups include a lauryl group (C12), myristyl group (C14), cetyl group (C16), stearyl group (C18), arachyl group (C20), behenyl group (C22), lignoceryl group (C24), cerotoyl group (C26), montanyl group (C28), melissyl group (C30), dotriacontanyl group (C32), tetratriacontanyl group (C34), and hexatriacontanyl group (C36).

From the viewpoint of achieving a combination of reduced viscosity for the pigment dispersion and superior abrasion resistance and gloss for the printed matter, the amount of the monomer having an alkyl group of 10 to 36 carbon atoms contained within the copolymer contained in the pigment dispersion resin is preferably from 5% by weight to 60% by weight, more preferably from 10% by weight to 55% by weight, and particularly preferably from 20% by weight to 50% by weight.

In one embodiment, in order to improve the adsorption capability to the pigment, and enable a rapid reduction in the pigment dispersibility upon mixing with the pretreatment solution, it is particularly preferable to introduce an aromatic group into the pigment dispersion resin. This is because when the pretreatment solution and the inkjet ink are mixed, powerful intermolecular forces called cation-π interactions occur between the cation component of the metal salt contained in the pretreatment solution and the pigment dispersion resin having the aromatic group, causing the two to undergo preferential adsorption. Examples of the aromatic group include a phenyl group, naphthyl group, anthryl group, tolyl group, xylyl group, mesityl group and anisyl group. Of these, a phenyl group or tolyl group is preferred in terms of ensuring satisfactory dispersion stability.

From the viewpoint of achieving a combination of good pigment dispersion stability and favorable adsorption performance with the pretreatment solution, the amount of the monomer containing an aromatic group, relative to the total weight of the pigment dispersion resin, is preferably from 5 to 65% by weight, and more preferably from 10 to 50% by weight.

In order to improve the degree of solubility in the ink, it is preferable that acid groups within the pigment dispersion resin of the present invention have been neutralized with a base. However, if the base is added in excess, then the cation component within the pretreatment solution is also neutralized, making it difficult to achieve a satisfactory effect, and therefore particular care must be taken over the amount added of the base.

Whether the amount added of the base is excessive or not can be confirmed, for example, by preparing a 10% by weight aqueous solution of the pigment dispersion resin, and then measuring the pH of the aqueous solution. In one embodiment, in order to ensure satisfactory functionality for the pretreatment of the present invention, the pH of the above aqueous solution is preferably from 7 to 11, and more preferably from 7.5 to 10.5.

Examples of the base used for neutralizing the pigment dispersion resin include alkanolamines such as diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate.

In one embodiment, the acid value of the pigment dispersion resin is preferably from 30 to 400 mgKOH/g. Adjusting the acid value to a value within the above range enables the solubility of the pigment dispersion resin to be ensured and also suppresses the viscosity of the pigment dispersion, and is consequently preferred.

If the acid value of the pigment dispersion resin is less than 30 mgKOH/g, then the solubility of the resin in water is too low, wetting of the pigment is inadequate, and the pigment dispersion tends to become unstable. In addition, when combined with the pretreatment solution described above, anion-cation interactions and adsorption equilibrium movement are more difficult to achieve, and the suppression effect on color mixing between pigments tends to deteriorate.

On the other hand, if the acid value of the pigment dispersion resin is greater than 400 mgKOH/g, then interactions between molecules of the pigment dispersion resin tend to strengthen, resulting in a higher viscosity and an unsatisfactory effect for the pretreatment solution. The acid value of the pigment dispersion resin is more preferably from 50 to 350 mgKOH/g, and even more preferably from 100 to 300 mgKOH/g.

The acid value can be measured by a potentiometric titration method, using a conventional device (such as the automatic potentiometric titrator AT-610 manufactured by Kyoto Electronics Manufacturing Co., Ltd.).

In terms of the molecular weight of the pigment dispersion resin, the weight average molecular weight is preferably at least 1,000 but not more than 100,000, and is more preferably at least 5,000 but not more than 50,000.

By ensuring that the molecular weight falls within the above range, the pigment can be stably dispersed in water, and the viscosity can be more easily adjusted when preparing an aqueous ink composition. If the weight average molecular weight is less than 1,000, then the dispersion resin is more likely to dissolve readily in solvents added to the ink composition, meaning the resin adsorbed to the pigment may detach, causing a marked deterioration in the dispersion stability. If the weight average molecular weight is greater than 100,000, then the viscosity upon dispersion increases, and the discharge stability from the inkjet head worsens markedly, causing a deterioration in the printing stability.

The weight ratio of the pigment to the pigment dispersion resin in the present invention is preferably from 2/1 to 100/1. By ensuring that the ratio of the pigment to the pigment dispersion resin is from 2/1 to 100/1, the viscosity of the pigment dispersion can be suppressed, the viscosity stability and dispersion stability of the pigment dispersion and the inkjet ink can be improved, and a rapid deterioration in the dispersibility can be caused upon mixing with the pretreatment solution, all of which are desirable. The ratio of the pigment to the pigment dispersion resin is more preferably from 20/9 to 50/1, even more preferably from 5/2 to 25/1, and most preferably from 20/7 to 20/1.

<Water-Soluble Organic Solvent>

Conventional solvents may be used as the water-soluble organic solvent used in the inkjet ink, but the use of two or more glycol ether-based solvents and/or alkyl polyol-based solvents having a boiling point at 1 atmosphere of at least 180° C. but not more than 280° C. is preferred. The boiling point at 1 atmosphere for the water-soluble organic solvent is preferably at least 183° C. but not more than 270° C., and more preferably at least 185° C. but not more than 250° C.

By using water-soluble organic solvents that satisfy the above boiling point range, the wetting properties and drying properties of the inkjet ink can be controlled within favorable ranges, the discharge stability is more favorable, and image defects such as bleeding can be prevented when combined with the pretreatment solution.

In the present invention, the boiling point at 1 atmosphere can be measured using a thermal analyzer such as a DSC (differential scanning calorimeter).

In one embodiment, examples of glycol ethers having a boiling point at 1 atmosphere of at least 180° C. but not more than 280° C. that can be used favorably include:

glycol monoalkyl ethers such as diethylene glycol monomethyl ether, diethylene glycol monoethyl ether, diethylene glycol monopropyl ether, diethylene glycol monobutyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, and tripropylene glycol monobutyl ether; and glycol dialkyl ethers such as diethylene glycol diethyl ether, diethylene glycol isopropyl methyl ether, diethylene glycol butyl methyl ether, triethylene glycol dimethyl ether, triethylene glycol methyl ethyl ether, triethylene glycol diethyl ether, triethylene glycol butyl methyl ether, tetraethylene glycol dimethyl ether, and tetraethylene glycol methyl ethyl ether.

In one embodiment, in terms of achieving a combination of superior moisture retention and drying properties, it is preferable to select, from among the glycol ether-based solvents described above, diethylene glycol monoethyl ether, diethylene glycol monopropyl ether, diethylene glycol monobutyl ether, triethylene glycol monoethyl ether, triethylene glycol monopropyl ether, triethylene glycol monobutyl ether, dipropylene glycol monomethyl ether, dipropylene glycol monoethyl ether, dipropylene glycol monopropyl ether, dipropylene glycol monobutyl ether, diethylene glycol butyl methyl ether, triethylene glycol methyl ethyl ether, triethylene glycol diethyl ether, triethylene glycol butyl methyl ether, or tetraethylene glycol methyl ethyl ether.

Further, examples of alkyl polyol-based solvents having a boiling point at 1 atmosphere of at least 180° C. but not more than 280° C. include 1,2-ethanediol, 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentan-2,4-diol, 2-ethyl-1,3-hexanediol, ethylene glycol, diethylene glycol, dipropylene glycol, and dibutylene glycol.

In one embodiment, in terms of achieving a combination of superior moisture retention and drying properties, it is preferable to select, from among the alkyl polyol-based solvents described above, 1,2-propanediol, 1,2-butanediol, 1,3-butanediol, 1,2-pentanediol, 1,5-pentanediol, 1,2-hexanediol, 1,6-hexanediol, or 1,2-heptanediol.

In one embodiment, the total weight of glycol ether-based solvents and/or alkyl polyol-based solvents having a boiling point at 1 atmosphere of at least 180° C. but not more than 280° C., relative to the total weight of the inkjet ink, is preferably at least 5% by weight but not more than 50% by weight.

Further, from the viewpoints of ensuring favorable discharge stability from the inkjet nozzles and ensuring satisfactory wet spreadability and drying properties when combined with the pretreatment solution, the total weight of the above water-soluble organic solvents is more preferably at least 10% by weight but not more than 45% by weight, and particularly preferably at least 15% by weight but not more than 40% by weight. If the total weight of the water-soluble organic solvents is less than 5% by weight, then the moisture retention of the ink tends to be unsatisfactory, and there is a possibility of a deterioration in the discharge stability. On the other hand, if the total water-soluble organic solvent content exceeds 65% by weight, then there is a possibility that the viscosity of the ink may become too high, causing a deterioration in the discharge stability.

In one embodiment, in order to adjust the moisture retention and wetting properties of the inkjet ink, an organic solvent other than the aforementioned glycol ether-based solvents and/or alkyl polyol-based solvents having a boiling point at 1 atmosphere of at least 180° C. but not more than 280° C. may also be used in combination with the glycol ether-based solvents and/or alkyl polyol-based solvents. Specific examples include the monohydric alcohols, trihydric alcohols, nitrogen-containing solvents and heterocyclic compounds listed above for use as the water-soluble organic solvent in the pretreatment solution. One of these solvents may be used alone, or a mixture of a plurality of solvents may be used.

In one embodiment, from the viewpoint of achieving a combination of favorable moisture retention, drying properties and wetting properties for the inkjet ink, the total weight of water-soluble organic solvents in the inkjet ink, relative to the total weight of the inkjet ink, is preferably at least 5% by weight but not more than 70% by weight, more preferably at least 10% by weight but not more than 60% by weight, and particularly preferably at least 15% by weight but not more than 50% by weight.

Moreover, in one embodiment, in relation to the water-soluble organic solvents contained in the inkjet ink, the amount of water-soluble organic solvents having a boiling point at 1 atmosphere of 240° C. or higher, relative to the total weight of the aqueous inkjet ink, is preferably less than 10% by weight, more preferably less than 7% by weight, and even more preferably less than 5% by weight.

In one embodiment, the pretreatment solution preferably contains no water-soluble organic solvents having a boiling point at 1 atmosphere of 240° C. or higher. Further, in one embodiment, the amount of water-soluble organic solvents having a boiling point at 1 atmosphere of 210° C. or higher relative to the total weight of the aqueous inkjet ink, is preferably less than 20% by weight, more preferably less than 18% by weight, and even more preferably less than 16% by weight. In one embodiment, the pretreatment solution preferably contains no water-soluble organic solvents having a boiling point at 1 atmosphere of 210° C. or higher.

By controlling the amount of organic solvents to satisfy the above ranges, the drying properties can be enhanced sufficiently to satisfactorily prevent set-off even during high-speed printing. Further, when combined with the pretreatment solution, images of excellent image quality can be achieved with ease, even at high printing speeds.

<Binder Resin>

In one embodiment, the inkjet ink preferably contains a binder resin. As already mentioned above, water-soluble resins and resin microparticles are generally known as binder resins. Of these, resin microparticles tend to have a higher molecular weight than water-soluble resins, and resin microparticles can also lower the viscosity of the inkjet ink, meaning a larger amount of the resin can be added to the inkjet ink, which is ideal for enhancing the durability of the printed matter.

Examples of resins that may be used for the resin microparticles include acrylic-based resins, styrene/acrylic-based resins, urethane-based resins, styrene/butadiene-based resins, vinyl chloride-based resins, and polyolefin-based resins. Among these, if consideration is given to the stability of the ink composition and the durability of the printed matter, then acrylic-based or styrene/acrylic-based resin microparticles can be used particularly favorably.

However, when the binder resin in the inkjet ink is composed of resin microparticles, consideration must be given to the minimum film-forming temperature (MFT) of the resin microparticles. This is because when resin microparticles having a low MFT are used, the water-soluble organic solvent added to the inkjet ink causes a further reduction in the MFT of the resin microparticles, meaning fusion and aggregation of the resin microparticles can occur even at room temperature, and as a result, blockages of the inkjet head nozzles can sometimes occur. In order to avoid these problems, it is preferable that the MFT of the resin microparticles is set to 60° C. or higher by appropriate adjustment of the monomers that constitute the resin microparticles.

The above MFT can be measured using an MFT Tester manufactured by Tester Sangyo Co., Ltd. Specifically, a 25% by weight aqueous solution of the resin microparticles is applied to a film to form a wet film thickness of 300 μm, the film is mounted on the above tester with a temperature gradient applied, and the temperature at the boundary between the region where a white precipitate forms upon drying and the region where a transparent resin film is formed upon drying is deemed to be the MFT.

However, if maintenance of the inkjet printer is also taken into consideration, then the use of a water-soluble resin as the binder resin is preferred. The water-soluble resin has a weight average molecular weight that is preferably at least 8,000 but not more than 50,000, and more preferably at least 10,000 but not more than 40,000. By ensuring that the weight average molecular weight is at least 10,000, the durability of the coating film on the printed matter can be improved, whereas by ensuring that the weight average molecular weight is not more than 50,000, an inkjet ink having superior discharge stability from the inkjet head can be obtained.

Further, when a water-soluble resin is selected as the binder resin, the acid value of the resin is also important. In one embodiment, the acid value is preferably from 10 to 80 mgKOH/g, and an acid value of 20 to 50 mgKOH/g is more desirable.

If the acid value is less than 10 mgKOH/g, then the redissolvability of solidified inkjet ink tends to worsen, and resin microparticles tend to cause blockages of the inkjet head nozzles, meaning there tends to be a marked deterioration in the printing stability. Further, when combined with the pretreatment solution, thickening and aggregation of the ink caused by anion-cation interactions tend to occur less readily, resulting in a deterioration in the suppression effect on bleeding and color irregularities. Further, if the acid value is greater than 80 mgKOH/g, then although redissolution can occur even if the inkjet ink solidifies, there is a possibility that the water resistance of the printed matter coating film may deteriorate markedly.

The amount of the binder resin in the inkjet ink, recorded as a solid fraction relative to the total weight of the inkjet ink, is preferably at least 1% by weight but not more than 20% by weight, more preferably at least 2% by weight but not more than 15% by weight, and particularly preferably at least 3% by weight but not more than 10% by weight.

<Surfactant>

In one embodiment, the inkjet ink preferably also contains a surfactant for the purposes of adjusting the surface tension and improving the image quality. On the other hand, if the surface tension is too low, then the nozzle surface of the inkjet head tends to become wet by the inkjet ink, leading to a deterioration in discharge stability, and therefore selection of the type of surfactant and the amount added of the surfactant are extremely important.

From the viewpoints of ensuring optimal wetting properties and achieving stable discharge from the inkjet nozzles, the use of a siloxane-based, acetylene-based or fluorine-based surfactant is preferred, and the use of a siloxane-based or acetylene-based surfactant is particularly preferred. The amount added of the surfactant, relative to the total weight of the inkjet ink, is preferably at least 0.01% by weight but not more than 5.0% by weight, and is more preferably at least 0.05% by weight but not more than 3.0% by weight.

Further, the molecular weight of the surfactant is also very important in terms of controlling the wettability during evaporation of the inkjet ink, and improving the quality of the printed matter such as the abrasion resistance and solvent resistance. The weight average molecular weight of the surfactant is preferably at least 1,000 but not more than 7,000, and more preferably at least 1,500 but not more than 5,000. Provided the weight average molecular weight is at least 1,000, the control effect on the wettability of the recording medium is more easily enhanced. Further, provided the weight average molecular weight is not more than 7,000, an inkjet ink having excellent storage stability can be more easily obtained.

The surfactant may be synthesized using conventional methods, or a commercially available product may be used. When the surfactant is selected from commercially available products, examples of siloxane-based surfactants and acetylene-based surfactants that can be used include the same surfactants as those described above for use as the surfactant in the pretreatment solution. Further, examples of fluorine-based surfactants that can be used include Zonyl TBS, FSP, FSA, FSN-100, FSN, FSO-100, FSO, FS-300, Capstone FS-30 and FS-31 (manufactured by E. I. du Pont de Nemours and Company), and PF-151N and PF-154N (manufactured by Omnova Solutions Inc.).

One of the above surfactants may be used alone, or a combination of two or more surfactants may be used.

However, when the ink is applied to the pretreatment solution layer, mixing of the high concentration of polyvalent metal ions with the ink layer can cause a large fluctuation in the ink surface tension, and there is a possibility of color mixing and bleeding occurring, and therefore in order to better control fluctuations in the ink surface tension, using a combination of two or more surfactants is preferred.

The surfactant used in the inkjet ink and the surfactant used in the pretreatment solution may be the same or different. If mutually different surfactants are used, then as described above, the blend amounts are preferably determined with due consideration of the surface tension of the surfactants.

<Water>

In one embodiment, the water included in the inkjet ink is preferably not a typical water containing various ions, and the use of an ion-exchanged water (deionized water) is preferred.

The amount of water in the inkjet ink, based on the total weight of the ink, is preferably within a range from 20 to 90% by weight, more preferably within a range from 25 to 85% by weight, and even more preferably from 30 to 80% by weight.

<Other Components>

In one embodiment, in addition to the components described above, a pH modifier may be added to the inkjet ink if required in order to achieve certain desired physical property values. Any material having a pH-modifying function may be selected.

In those cases where basification is required, alkanolamines such as dimethylethanolamine, diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate may be used.

Further, in those cases where acidification is required, compounds such as hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid and glutamic acid may be used. Any of the above pH modifiers may be used alone, or a combination of two or more modifiers may be used.

The blend amount of the pH modifier, relative to the total weight of the inkjet ink, is preferably from 0.01 to 5% by weight, more preferably from 0.1 to 3% by weight, and most preferably from 0.2 to 1.5% by weight. By ensuring the blend amount falls within the above range, pH changes caused by dissolution of carbon dioxide from the air or the like can be suppressed, and the solid component aggregation effect caused by the polyvalent metal ions when the pretreatment solution and the ink make contact is not impaired, enabling the effects of the present invention to manifest satisfactorily.

In one embodiment, in addition to the components described above, appropriate amounts of other additives such as antifoaming agents, preservatives, infrared absorbers and ultraviolet absorbers may be added to the inkjet ink in order to achieve certain desired physical property values. The amount added of these additives, relative to the total weight of the inkjet ink, is preferably at least 0.01% by weight but not more than 10% by weight.

In one embodiment, it is preferable that the inkjet ink contains substantially no polymerizable monomers. Here, the expression "contains substantially no polymerizable monomers" means that no such monomers are added intentionally, but does not exclude the incorporation or generation of trace amounts of such monomers during production or storage of the inkjet ink.

<Ink Set>

The second aspect of the present invention relates to an ink set containing the pretreatment solution of the first aspect of the present invention and an inkjet ink. The inkjet ink may be the same as the inkjet ink described above. In the ink set, the inkjet ink may be a single color. Further, depending on the application, the inkjet ink set may contain a combination of a plurality of inkjet inks of different colors.

There are no particular limitations on the combination in the inkjet ink set, but full-color images can be obtained by using the three colors of cyan, yellow and magenta. Further, by also adding a black ink, the level of blackness can be improved, and the legibility of text and the like can be improved. Moreover, by also adding other colors such as orange and green, the color reproducibility can be improved. When printing is performed to recording media that is not white, including a white ink enables more distinct images to be obtained.

In those cases where the aqueous inkjet inks include a magenta ink, it is particularly preferable that the magenta ink contains C.I. Pigment Violet 19 as the magenta pigment.

<Method for Producing Inkjet Ink>

The inkjet ink of the present invention composed of the types of components described above is produced, for example, using the processes described below. However, the method for producing the inkjet ink of the present invention is not limited to the processes described below.

(1) Production of Pigment Dispersion

First, the pigment is added to an aqueous medium prepared by mixing the pigment dispersion resin and water, and following mixing and stirring, a dispersion treatment is performed using a dispersion device. Subsequently, a centrifugal separation and filtration may be performed as required to obtain a pigment dispersion.

Performing premixing prior to the dispersion treatment is effective. The premixing may be performed by adding the pigment to an aqueous medium prepared by mixing at least the pigment dispersion resin and water. This type of premixing operation improves the wettability of the pigment surface and can accelerate the adsorption of the dispersant to the pigment surface, and is consequently preferred.

The dispersion device used for the pigment dispersion treatment may be any typically used dispersion device, and examples include a ball mill, roll mill, sand mill, beads mill and nanomizer. Among these, a beads mill can be used particularly favorably. Specific examples include devices available commercially with product names such as Supermill, Sand Grinder, Agitator Mill, Glen Mill, Dyno-Mill, Pearl Mill and CoBall Mill.

During the premixing and the dispersion treatment for the pigment, the pigment dispersant may be dispersed only in water, or may be dispersed in a mixed solvent containing an organic solvent and water.

Examples of methods for controlling the particle size distribution of the pigment dispersion include reducing the size of the grinding media in the aforementioned dispersion device, altering the material used for the grinding media, increasing the grinding media filling ratio, altering the shape of the stirring member (agitator), lengthening the dispersion treatment time, performing classification with a filter or a centrifugal separator or the like after the dispersion treatment, or a combination of these methods. In the present invention, in order to ensure that the pigment size falls within the preferred particle size range, the diameter of the grinding media in the above dispersion device is preferably from 0.1 to 3 mm. Further, examples of materials that can be used favorably as the grinding media include glass, zircon, zirconia and titania.

(2) Preparation of Inkjet Ink

Subsequently, the water-soluble organic solvent, water, and where necessary the binder resin, surfactant and other additives described above are added and mixed into the above pigment dispersion.

If necessary, the above mixture may be heated at a temperature within a range from 40 to 100° C. while undergoing stirring and mixing. However, when resin microparticles are used as the binder resin, the heating temperature is preferably not higher than the MFT of the resin microparticles described above.

(3) Removal of Coarse Particles

Coarse particles contained in the mixture can be removed using a technique such as filtration separation or centrifugal separation, thus forming the inkjet ink. Conventional methods may be used as appropriate for the filtration separation method. Further, there are no particular limitations on the filter pore size, provided coarse particles and dust can be removed, but the pore size is preferably from 0.3 to 5 µm, and more preferably from 0.5 to 3 µm. When filtration is performed, a single type of filter may be used, or a combination of a plurality of filters may be used.

<Properties of Inkjet Ink>

In one embodiment, the viscosity of the inkjet ink at 25° C. is preferably adjusted to value within a range from 3 to 20 mPa·s. Provided the viscosity is within this range, stable discharge characteristics can be obtained from heads having a typical frequency of 4 to 10 kHz through to heads having a high frequency of 10 to 70 kHz. In particular, by ensuring that the viscosity at 25° C. is within a range from 4 to 10 mPa·s, stable discharge can be achieved even when using an inkjet head having a design resolution of 600 dpi or higher.

The viscosity of the inkjet ink at 25° C. mentioned in the present description can be measured using normal methods. Specifically, the viscosity can be measured with an E-type viscometer (TVE25L viscometer, manufactured by Toki Sangyo Co., Ltd.), using 1 mL of the ink.

In one embodiment, in order to obtain printed matter having excellent color development, the inkjet ink preferably contains a pigment having an average secondary particle size (D50) of 40 nm to 500 nm, more preferably 50 nm to 400 nm, and particularly preferably 60 nm to 300 nm. In order to ensure that the average secondary particle size falls within the above preferred range, the pigment dispersion treatment process is preferably controlled in the manner described above.

<Method for Producing Printed Matter>

In terms of the method used for producing printed matter using an ink set composed of the pretreatment solution and the inkjet ink of the present invention, a method in which the pretreatment solution is applied to a recording medium being transported at a speed of at least 30 m/minute, and the inkjet ink is then applied by one-pass printing to the portion to which the pretreatment solution has been applied can be used favorably.

One-pass printing is a printing method in which either the inkjet head is scanned only once across a stationary recording medium, or the recording medium is passed only once beneath a stationary inkjet head, meaning no ink is overprinted on top of previously printed ink. One-pass printing requires fewer scanning repetitions and enables increased printing speed compared with conventional inkjet printing methods that require multiple scanning passes (multi-pass printing methods), and is therefore ideal for industrial applications that require fast printing speeds. Use of this method is essential for the type of inkjet printing that has recently been actively investigated as an alternative to offset printing and gravure printing.

On the other hand, in order to use inkjet printing as a replacement for offset printing or gravure printing, a number of issues must be resolved. In terms of printing speed, in order to enable the replacement of conventional printing methods, compatibility with high-speed printing of a minimum of 30 m/minute or greater is required. Further, image defects such as bleeding and color irregularities on the printed matter must, of course, be eliminated, and it is also essential that high-quality images can be obtained at a high recording resolution of 600 dpi or higher.

Recording resolution is reported in units of dpi (dots per inch), which represents the number of inkjet ink droplets applied per one inch. In this description, the "recording resolution" is deemed to mean both the recording resolution in the transport direction of the recording medium, and the recording resolution in the direction, within the plane of the recording medium, that is orthogonal to the transport direction (hereafter referred to as the "recording width direction").

As mentioned above, in order to achieve high-speed printing using inkjet printing, employing the one-pass printing method is essential. On the other hand, in order to complete the printing in a single scanning pass, the volume of the ink droplets discharged from the inkjet head in a single discharge (the drop volume) must be increased compared with the case where the same image is printed using a multi-pass printing method. As described above in relation to the conventional technology, in the case of an inkjet ink containing water as a constituent component, wherein the image is fixed to the recording medium as a result of penetration into the recording medium and/or evaporation of the liquid components, increasing the drop volume tends to cause show-through of the inkjet ink or drying faults, and because the penetration properties of the inkjet ink differ depending on the recording medium, obtaining a high-quality image regardless of the recording medium has proven to be extremely difficult.

In the present invention, the issues described above are addressed by using the previously described pretreatment solution, containing an inorganic metal salt and/or an organic metal salt in a dissolved state, and an organic solvent that contains a compound having one or more hydroxyl groups in the molecule, wherein the amount of the organic solvent, based on the total weight of the pretreatment solution, is from 0.1 to 50% by weight.

In other words, by applying the pretreatment solution to the recording medium prior to printing of the inkjet ink, thereby forming an ink aggregation layer on the recording medium, effects caused by differences in the type of recording medium are eliminated. Further, by using the inkjet ink after formation of the pretreatment solution layer, rapid aggregation of the solid components and drying of the liquid components can be achieved. As a result, high-quality images can be easily obtained by high-speed and high-resolution inkjet printing, regardless of the recording medium.

<Method for Producing Printed Matter>

The third aspect of the present invention relates to a method for producing printed matter using the pretreatment solution of the first aspect of the present invention, or the ink set of the second aspect of the present invention.

The method for producing printed matter according to the present invention includes a step of applying a pretreatment solution to a recording medium being transported at a speed of at least 30 m/minute, and a step of applying an aqueous inkjet ink by a one-pass printing method to the portion of the recording medium to which the pretreatment solution has been applied, wherein in at least the step of applying the pretreatment solution, the pretreatment solution of the present invention, or the pretreatment solution in the ink set of the present invention, is used. A method for producing printed matter using the ink set of the second aspect of the present invention is described below in more detail as a representative example.

<Method for Applying Pretreatment Solution>

In the method for producing printed matter according to the present invention, prior to printing of the inkjet ink, the pretreatment solution is applied to a recording medium being transported at a speed of at least 30 m/minute. Provided the pretreatment solution of the present invention is used, the solution can be applied uniformly, image defects such as bleeding or color irregularities and cracking do not occur, and image formation of high-quality images with satisfactory density can be achieved with ease, even during high-speed printing in which the transport speed of the recording medium is 30 m/minute or higher.

Methods for applying the pretreatment solution to the recording medium include methods for printing without contacting the recording medium such as inkjet printing, and methods for printing by bringing the pretreatment solution into contact with the recording medium, and either type of method may be employed.

The coating amount of the pretreatment solution is preferably from 1 to 25 $g/m^2$, more preferably from 2 to 20 $g/m^2$, and even more preferably from 3 to 15 $g/m^2$. By adjusting the coating amount of the pretreatment solution to a value within the above range, bleeding and cracking can be suppressed, and the drying properties of the pretreatment solution layer following coating can be more easily improved. As a result, adhesion to the inside of the coating apparatus and set-off that occurs when the printed media are stacked can be prevented, and printed matter having no tack (stickiness) can be obtained.

In recent years, by employing a heater inside the head, and by optimizing the flow channels in the head and the nozzle structures, inkjet heads have been developed that are capable of discharging even liquid compositions having a viscosity at 25° C. of about 100 mPa·s. The preferred range for the viscosity at 25° C. of the pretreatment solution of the present invention is from 2 to 100 mPa·s, meaning the pretreatment solution can be printed by inkjet printing without any problems. In those cases where inkjet printing is employed as the method for applying the pretreatment solution, from the viewpoint of maintaining the inherent texture of the recording medium in the unprinted portions, the pretreatment solution is preferably only applied to those portions to which the inkjet ink is to be applied.

On the other hand, from the viewpoints of preventing damage to the members that constitute the inkjet head, and ensuring favorable inkjet printability, in one embodiment, a printing method in which the pretreatment solution is brought into contact with the recording medium is preferably used. Any conventional method may be selected as the printing method for bringing the pretreatment solution into contact with the recording medium. For example, from the viewpoints of apparatus simplicity, coating uniformity, operational efficiency, and economic viability and the like, a roller-type method is preferred employed. Here, a "roller-type method" means a printing method in which the pretreatment solution is first applied to a rotating roll, and the pretreatment solution is then transferred to the recording medium.

Examples of roller-type coating devices that can be used favorably in this embodiment include offset gravure coaters, gravure coaters, doctor coaters, bar coaters, blade coaters, flexo coaters and roll coaters.

<Thermal Energy Application Following Pretreatment Solution Application>

In one embodiment, following application of the pretreatment solution to the recording medium, but prior to application of the inkjet ink, thermal energy is preferably applied to the recording medium to dry the pretreatment solution on the recording medium. Further, it is particularly preferable that the pretreatment solution is dried completely, namely that the liquid components of the pretreatment solution are completely removed, before application of the inkjet ink.

If the inkjet ink is applied before the pretreatment solution has completely dried, then although a reduction in the dissolution and/or dispersion functionality of the solid components in the inkjet ink can be better promoted, the amount of liquid components on the recording medium can easily become excessive. In such cases, if the amount of thermal energy applied following inkjet printing is insufficient, then there is a possibility that waviness of the recording medium or image defects such as bleeding may occur.

There are no particular limitations on the method used for applying the thermal energy, and examples include heating drying methods, hot air drying methods, infrared drying methods, microwave drying methods and drum drying methods. The above drying methods may be used individually, or a plurality of methods may be combined. For example, by using a combination of a heating drying method and a hot air drying method, the pretreatment solution can be dried more rapidly than when either of the methods is used alone.

In one embodiment, from the viewpoints of preventing damage to the recording medium and preventing sudden boiling of the liquid components in the pretreatment solution, in those cases where a heating drying method is employed from among the above methods, the drying temperature is preferably from 35 to 100° C. Further, in those cases where a hot air drying method is employed, the temperature of the hot air is preferably from 50 to 250° C. Further, for similar reasons, in those cases where an infrared drying method is employed, at least 50% of the integrated value of the total output of infrared rays used in the infrared irradiation preferably exists in the wavelength region from at least 700 nm to not more than 1,500 nm.

<Pretreatment Solution Application and Drying Device>

In one embodiment, a pretreatment solution application and drying device is installed in either an in-line arrangement or an off-line arrangement relative to the inkjet printing apparatus described below. In terms of convenience during printing, installation in an in-line arrangement is preferred.

<Method for Applying Inkjet Ink>

As described above, the inkjet ink is applied to the recording medium by one-pass printing. As already mentioned above, there are two types of one-pass printing, namely a method in which the inkjet head is scanned only once across a stationary recording medium, and a method in which the recording medium is passed only once beneath a stationary inkjet head.

In the case of the method in which the inkjet head is scanned, the discharge timing must be adjusted in accordance with the movement of the inkjet head, and there is an increased likelihood of variation in the impact position. As a result, in one embodiment, a method in which the inkjet head is kept stationary and the recording medium is scanned can be used favorably. In this case, the transport speed of the recording medium is preferably at least 30 m/min. Particularly in those cases where the pretreatment solution application device is installed in an in-line arrangement relative to the inkjet printing apparatus, it is preferable that the pretreatment solution application device and the inkjet printing apparatus are disposed in a continuous arrangement, so that the recording medium to which the pretreatment has been applied can be simply transported to the inkjet printing section.

Further, as mentioned above, by using the ink set of the present invention, high-quality images can be produced even at high speed and even with a recording resolution of 600 dpi or higher, but from the viewpoint of providing printed matter of similar image quality to offset printing or gravure printing, it is particularly preferable that the recording resolution of the printed matter is 1,200 dpi or higher.

<Inkjet Head>

In those cases where a method in which the recording medium is passed only once beneath a stationary inkjet head is employed as the one-pass printing method, the recording resolution in the recording width direction is determined by the design resolution of the inkjet head.

As mentioned above, in the present invention, it is preferable that the recording resolution in the recording width direction is 600 dpi or higher, meaning the design resolution of the inkjet head is preferably 600 dpi or higher. Provided the design resolution of the inkjet head is 600 dpi or higher, printing of one color can be performed with a single inkjet head, which is preferable from an economic viewpoint and in terms of reducing the size of the apparatus. If an inkjet head having a design resolution lower than 600 dpi is used, then by aligning a plurality of inkjet heads along the transport direction for the recording medium for one color, a recording resolution of 600 dpi or higher in the recording width direction can still be achieved by one-pass printing.

Furthermore, the print resolution in the transport direction of the recording medium is dependent not only on the design resolution of the inkjet head, but also on the drive frequency of the inkjet head and the printing speed, and for example, the recording resolution in the transport direction can be doubled by either reducing the printing speed by ½, or by doubling the drive frequency. In those cases where, as a result of the design of the inkjet head, a print resolution of 600 dpi or higher cannot be achieved in the transport direction when the printing speed is 30 in/minute or higher, by aligning a plurality of inkjet heads along the transport direction for the recording medium for one color, a combination of the desired printing speed and print resolution can be achieved.

The drop volume for the inkjet ink in the inkjet one-pass printing of the present invention is largely dependent on the performance of the inkjet head, but in order to achieve high-quality images, the drop volume is preferably within a range from 1 to 30 µL. Further, in order to obtain high-quality images, the use of an inkjet head with a graduated specification that enables the drop volume to be varied is particularly preferred.

<Thermal Energy Application following Inkjet Ink Application>

Following application of the inkjet ink to the recording medium to which the pretreatment solution has already been applied, thermal energy is preferably applied to the recording medium to dry the inkjet ink and any undried pretreatment solution. Examples of thermal energy application methods and conditions that can be used favorably in the present invention include the same methods and conditions as those used for the drying of the pretreatment solution.

<Inkjet Ink Drying Device>

The inkjet ink drying device may be installed in an in-line or off-line arrangement relative to the inkjet printing apparatus, but in terms of convenience and the like during printing, is preferably installed in an in-line arrangement. Further, in the present invention, in order to prevent bleeding, color irregularities, and curling and the like of the recording medium, the thermal energy is preferably applied within 30 seconds of printing, more preferably within 20 seconds of printing, and particularly preferably within 10 seconds of printing.

<Coating Amounts of Pretreatment Solution and Inkjet Ink>

In one embodiment, the ratio of the coating amount of the inkjet ink relative to the coating amount of the pretreatment solution is preferably at least 0.1 but not more than 10. This coating amount ratio is more preferably at least 0.5 but not more than 9, and particularly preferably at least 1 but not more than 8. By ensuring that the coating amount ratio falls within the above range, changes in the texture of the recording medium caused by excessive pretreatment solution, and bleeding and color irregularities that can occur as a result of excessive inkjet ink and a deterioration in the effect of the pretreatment solution are avoided, and high-quality printed matter can be obtained with ease.

<Printing Speed>

As mentioned above, when producing printed matter using the ink set of the present invention, the printing speed is preferably at least 30 m/minute, more preferably at least 50 m/minute, even more preferably at least 75 m/minute, and particularly preferably 100 m/minute or higher.

<Recording Medium>

When performing printing using the ink set of the present invention, any conventional recording medium can be used. Examples of recording media that may be used include paper substrates such as high-quality papers, recycled papers, coated papers, art papers, cast papers, finely coated papers, and synthetic papers. Other examples include plastic substrates such as polyvinyl chloride sheets, PET films, polypropylene films, and polyethylene films. The above substrate may have a recording medium surface that is either smooth or uneven, and may be transparent, semi-transparent or opaque. Further, a substrate obtained by bonding together two or more print media may also be used. Further, a releasable adhesive layer may be provided on the opposite side from the print surface, or an adhesive layer or the like may be provided on the printed surface following printing. Further the recording medium used in the present invention may exist in a roll-type form or sheet-like form.

In one embodiment, in order to ensure satisfactory manifestation of the functions of the pretreatment solution, the recording medium is preferably either a paper substrate, or a film substrate such as a PET film, polypropylene film or polyethylene film, and is most preferably a paper substrate. Further, among the various different paper substrates, the use of the pretreatment solution of the present invention on low-absorption substrates such as coated papers, art papers, cast papers, finely coated papers and synthetic papers is particularly ideal. These substrates exhibit little liquid permeability (namely, have low absorption properties), and are consequently prone to image defects such as bleeding and color irregularities, as well as waviness and curling, but by using the pretreatment solution of the present invention, these problems can be favorably resolved.

In the present invention, a "low-absorption substrate" describes a substrate which has a water absorption coefficient, measured by Bristow's method described below (J. TAPPI paper pulp test method No. 51-87), of 0 to 0.6 ml/m$^2$ msec$^{1/2}$. Further, the above water absorption coefficient can also be measured, for example, using an Auto Scan absorption meter manufactured by Kumagai Riki Kogyo Co., Ltd. Specifically, by using the above apparatus and water, a relationship plot is generated between the amount of water absorption (ml/m$^2$) in a contact time of 100 to 1,000 milliseconds and the square root of the contact time (msec$^{1/2}$), and the gradient of the straight line obtained by the least squares method is deemed to represent the absorption coefficient.

EXAMPLES

The present invention is described below in further detail using a series of examples and comparative examples. In the following description, unless particularly stated otherwise, "parts" and "%" represent "parts by weight" and "% by weight" respectively.

I-1. Pretreatment Solutions A
(1) Binder Resin (Resin Varnish) Production Examples
Resin varnishes used in the pretreatment solutions were prepared in the manner described below.

<Resin Varnish A>
The materials described below were mixed for one hour by stirring, and the mixture was then heated to 90° C. and mixed for a further one hour. Subsequently, the mixture was cooled to room temperature to obtain a resin varnish A.
PVA103 25 parts
(a polyvinyl alcohol manufactured by Kuraray Co., Ltd., degree of saponification: 98 to 99% (fully saponified), degree of polymerization: 300)
Ion-exchanged water 75 parts <Resin Varnish B>
The materials described below were mixed for one hour by stirring, and the mixture was then heated to 90° C. and mixed for a further one hour. Subsequently, the mixture was cooled to room temperature to obtain a resin varnish B.
PVA103 25 parts
PVA217 10 parts
(a polyvinyl alcohol manufactured by Kuraray Co., Ltd., degree of saponification: 87 to 89% (partially saponified), degree of polymerization: 1,700)
Ion-exchanged water 75 parts <Resin Varnish C>
The materials described below were mixed for one hour by stirring, and the mixture was then heated to 90° C. and mixed for a further one hour. Subsequently, the mixture was cooled to room temperature to obtain a resin varnish C.
RS1113 25 parts
(a modified polyvinyl alcohol manufactured by Kuraray Co., Ltd., degree of saponification: 97 to 98% (fully saponified))
Ion-exchanged water 75 parts <Resin Varnish D>
The materials described below were mixed for one hour by stirring, and the mixture was then heated to 90° C. and mixed for a further one hour. Subsequently, the mixture was cooled to room temperature to obtain a resin varnish D.
PVA103 55.4 parts
Ion-exchanged water 44.6 parts (2) Pretreatment Solution A Production Examples
Pretreatment solutions were prepared in the manner described below.

<Pretreatment Solution 1A>
The materials described below were added sequentially while stirring was performed, and after mixing for one hour at room temperature, the mixture was heated to 60° C. and mixed for a further one hour. Subsequently, the mixture was cooled to room temperature and filtered through a membrane filter having a pore size of 1 μm to obtain a pretreatment solution 1A.
Resin varnish A 20 parts
Calcium chloride dihydrate 7.5 parts
(manufactured by Tokuyama Corporation)
2-propanol 4 parts
Surfynol 465 0.5 parts
(an acetylene-based surfactant, manufactured by Air Products and Chemicals, Inc.)
PROXEL GXL 0.05 parts
(a preservative, a 1,2-benzisothiazol-3-one solution, manufactured by Arch Chemicals, Inc.)
Ion-exchanged water 67.95 parts <Pretreatment Solutions 2A to 25A>
Using the materials shown below in Table A1, the same method as that described for the pretreatment solution 1A was used to obtain pretreatment solutions 2A to 25A.

TABLE A1

|  |  |  | Pretreatment solution | | | | | | | | | | | | |
|---|---|---|---|---|---|---|---|---|---|---|---|---|---|---|---|
|  |  |  | 1A | 2A | 3A | 4A | 5A | 6A | 7A | 8A | 9A | 10A | 11A | 12A | 13A |
| <1> | Inorganic metal salt | CaCl2•2H2O | 7.5 | 15 | 29 | | | | | | | | | | |
|  |  | MgCl2•6H2O | | | | 20 | | | | | | | | | |
|  |  | MgSO4 | | | | | 20 | | | | | | | | |
|  |  | Ca(NO3)2•4H2O | | | | | | 20 | 30 | | | | | | |
|  |  | Zn(CH3COO)2•2H2O | | | | | | | | 20 | | | | | |
|  |  | [Al2(OH)nCl6-n]m | | | | | | | | | 40 | | | | |
|  |  | FeSO4•7H2O | | | | | | | | | | 20 | | | |
|  |  | YNO3•6H2O | | | | | | | | | | | 10 | | |
|  | Organic metal salt | Ca(CH3COO)2•H2O | | | | | | | | | | | | 20 | |
|  |  | Ca(CH3CH(OH)COO)2•5H2O | | | | | | | | | | | | | 20 |
|  | <2> | NH4(C2H4(OH)COO) | | | | | | | | | | | | | |
| <3> | Resin varnish | Resin varnish A | 20 | 20 | 20 | 20 | 20 | 20 | 20 | 20 | 20 | 20 | 20 | 20 | |
|  |  | Resin varnish B | | | | | | | | | | | | | 22 |
|  |  | Resin varnish C | | | | | | | | | | | | | |
|  |  | Resin varnish D | | | | | | | | | | | | | |

TABLE A1-continued

|  |  |  | | | | | | | | | | | | | | |
|---|---|---|---|---|---|---|---|---|---|---|---|---|---|---|---|---|
|  | Other | Joncryl 1674 | | | | | | | | | | | | | | |
|  |  | HYDRAN CP-7020 | | | | | | | | | | | | | | |
| <4> | Monohydric alcohol | iPrOH (boiling point 82° C.) | 4 | 4 | | 4 | 4 | 4 | 4 | 4 | 4 | 4 | 4 | 4 | 4 | 4 |
|  |  | MB (boiling point 161° C.) |  | 10 | 15 | 10 | 10 | 20 | 10 | 10 | 10 | 10 | 10 | 10 | 10 | 10 |
|  | Glycol | 1,2-PD (boiling point 188° C.) | | | | | | | | | | | | | | |
|  |  | 1,2-HexD (boiling point 224° C.) | | | | | | | | | | | | | | |
|  | Other | EDG (boiling point 196° C.) | | | | | | | | | | | | | | |
| <5> | Acetylene-based | Surfynol 465 | 0.5 | 1.2 | 0.5 | 0.5 | 0.5 | 0.5 | 0.5 | 0.5 | 0.5 | 0.5 | 0.5 | 0.5 | 0.5 |
|  |  | Dynol 607 | | | | | | | | | | | | | | |
|  | Siloxane-based | TEGO Wet 280 | | | | | | | | | | | | | | |
|  | Other | Zonyl FS-300 | | | | | | | | | | | | | | |
|  | <6> | PROXEL GXL | 0.05 | 0.05 | 0.05 | 0.05 | 0.05 | 0.05 | 0.05 | 0.05 | 0.05 | 0.05 | 0.05 | 0.05 | 0.05 |
|  |  | Water | 67.95 | 49.75 | 35.45 | 45.45 | 45.45 | 35.45 | 35.45 | 45.45 | 25.45 | 45.45 | 55.45 | 45.45 | 43.45 |
|  |  | Viscosity | 14.5 | 19.8 | 27.5 | 19.5 | 19.8 | 19.4 | 22.5 | 20.4 | 18.4 | 20.0 | 16.7 | 18.9 | 24.2 |
|  |  | Surface tension | 27.1 | 26.5 | 26.6 | 26.8 | 26.6 | 26.5 | 26.5 | 26.9 | 26.2 | 26.3 | 26.8 | 26.5 | 26.4 |
|  |  | Metal ion content (%) | 2.0 | 4.1 | 7.9 | 2.4 | 4.0 | 3.4 | 5.1 | 6.0 | 2.1 | 4.0 | 2.3 | 4.5 | 2.6 |

| | | | Pretreatment solution | | | | | | | | | | |
|---|---|---|---|---|---|---|---|---|---|---|---|---|---|
| | | | 14A | 15A | 16A | 17A | 18A | 19A | 20A | 21A | 22A | 23A | 24A | 25A |
| <1> | Inorganic metal salt | CaCl2•2H2O | 15 | 15 | 15 | 15 | 15 | 15 | 15 | 15 | 7.5 | 7.5 | | 15 |
|  |  | MgCl2•6H2O | | | | | | | | | | | | |
|  |  | MgSO4 | | | | | | | | | | | | |
|  |  | Ca(NO3)2•4H2O | | | | | | | | | | | | |
|  |  | Zn(CH3COO)2•2H2O | | | | | | | | | | | | |
|  |  | [Al2(OH)nCl6-n]m | | | | | | | | | | | | |
|  |  | FeSO4•7H2O | | | | | | | | | | | | |
|  |  | YNO3•6H2O | | | | | | | | | | | | |
|  | Organic metal salt | Ca(CH3COO)2•H2O | | | | | | | | | | | | |
|  |  | Ca(CH3CH(OH)COO)2•5H2O | | | | | | | | | | | | 40 |
|  | <2> | NH4(C2H4(OH)COO) | | | | | | | | | | | | |
| <3> | Resin varnish | Resin varnish A | | | | | | | | 20 | | 20 | | |
|  |  | Resin varnish B | | | | | | | | | 22 | | | 22 |
|  |  | Resin varnish C | | | | 12 | 40 | 20 | 12 | | | | | |
|  |  | Resin varnish D | | | | | | | | | 27 | 74 | | |
|  | Other | Joncryl 1674 | | | 30 | | | | | | | | | |
|  |  | HYDRAN CP-7020 | | | | 5 | | | | | | | | |
| <4> | Monohydric alcohol | iPrOH (boiling point 82° C.) | 4 | 4 | 4 | 4 | 4 | 4 | 4 | 4 | 4 | 4 | | 4 |
|  |  | MB (boiling point 161° C.) | 20 | 10 | 10 | 10 | 10 | 10 | | | | | 10 | |
|  | Glycol | 1,2-PD (boiling point 188° C.) | | | | | | | 14 | 14 | 14 | 14 | | |
|  |  | 1,2-HexD (boiling point 224° C.) | | | | | | | | | | | | |
|  | Other | EDG (boiling point 196° C.) | | | | | | | | | | | | |
| <5> | Acetylene-based | Surfynol 465 | 0.5 | 0.5 | 0.5 | 0.5 | | | | | 0.4 | 0.4 | 0.5 | 0.4 |
|  |  | Dynol 607 | | | | | 0.2 | | 1.0 | | | | | |
|  | Siloxane-based | TEGO Wet 280 | | | | | | 1.4 | 1.1 | | | | | 1.1 |
|  | Other | Zonyl FS-300 | | | | | | | 0.05 | | | | | |
|  | <6> | PROXEL GXL | 0.05 | 0.05 | 0.05 | 0.05 | 0.05 | 0.05 | 0.05 | 0.05 | 0.05 | 0.05 | 0.05 | 0.05 |
|  |  | Water | 60.45 | 70.45 | 40.45 | 65.45 | 58.75 | 29.55 | 44.8 | 34.95 | 25.05 | 0.05 | 25.45 | 61.45 |
|  |  | Viscosity | 10.3 | 8.9 | 17.2 | 31.9 | 15.3 | 34.5 | 22.0 | 19.3 | 38.1 | 55.0 | 35.0 | 26.4 |
|  |  | Surface tension | 25.8 | 26.5 | 26.6 | 26.7 | 25.7 | 20.4 | 19.0 | 50.0 | 24.6 | 24.5 | 26.7 | 24.5 |
|  |  | Metal ion content (%) | 4.1 | 4.1 | 4.1 | 4.1 | 4.1 | 4.1 | 4.1 | 4.1 | 2.0 | 2.0 | 0.0 | 4.1 |

The materials shown in Table A1 are as follows.
<1> Metal Salts
  $CaCl_2.2H_2O$: calcium chloride dihydrate
  $MgCl_2.6H_2O$: magnesium chloride hexahydrate
  $MgSO_4$: magnesium sulfate
  $Ca(NO_3)_2.4H_2O$: calcium nitrate tetrahydrate
  $Zn(CH_3COO)_2.2H_2O$: zinc acetate dihydrate
  $[Al_2(OH)_nCl_{6-n}]_m$: polyaluminum chloride (manufactured by Taki Chemical Co., Ltd.)
  $FeSO_4.7H_2O$: iron sulfate nonahydrate
  $YNO_3.6H_2O$: yttrium nitrate hexahydrate
  $(CH_3COO)_2Ca.H_2O$: calcium acetate monohydrate
  $(CH_3CH(OH)COO)_2Ca.5H_2O$: DL-calcium lactate pentahydrate
<2> Organic Salt
  $NH_4(C_2H_4(OH)COO)$: ammonium lactate
<3> Binder Resins
Joncryl 1674: an acrylic emulsion (solid fraction: 45%), manufactured by BASF Corporation HYDRAN CP-7020: a cationic polyurethane (solid fraction: 40%), manufactured by DIC Corporation
<4> Organic Solvents
  iPrOH: 2-propanol
  MB: 3-methoxybutanol
  1,2-PD: 1,2-propanediol
  1,2-HexD: 1,2-hexanediol
  EDG: diethylene glycol monoethyl ether
<5> Surfactants
  Surfynol 465: an acetylene-based surfactant, manufactured by Air Products and Chemicals, Inc.
  Dynol 607: an acetylene-based surfactant, manufactured by Air Products and Chemicals, Inc.
  TEGO Wet 280: a siloxane-based surfactant, manufactured by Evonik Degussa GmbH
  Zonyl FS-300: a fluorine-based surfactant, manufactured by E. I. du Pont de Nemours and Company
<6> Additive (Preservative)
  PROXEL GXL: a preservative, a 1,2-benzisothiazol-3-one solution, manufactured by Arch Chemicals, Inc.

I-2: Inkjet Inks A
(1) Pigment Dispersion Production Examples

First, pigment dispersion resins were prepared in the manner described below.

<Pigment Dispersion Resin 1>

A reaction container fitted with a gas inlet tube, a thermometer, a condenser and a stirrer was charged with 93.4 parts of butanol, and the container was flushed with nitrogen gas. The contents of the reaction container were heated to 110° C., and a mixture containing 40 parts of styrene, 30 parts of acrylic acid and 30 parts of behenyl acrylate as polymerizable monomers and 6 parts of a polymerization initiator V-601 (manufactured by Wako Pure Chemical Industries, Ltd.) was added dropwise to the container over a period of two hours to achieve a polymerization reaction.

Following completion of the dropwise addition of the above mixture, reaction was continued at 110° C. for a further three hours, an additional 0.6 parts of V-601 (manufactured by Wako Pure Chemical Industries, Ltd.) was then added, and the reaction was continued at 110° C. for a further one hour, thus obtaining a solution of a dispersion resin 1. Following cooling of the solution of the dispersion resin 1 to room temperature, 37.1 parts of dimethylaminoethanol was added to neutralize the solution, and 100 parts of water was added to generate an aqueous solution. Subsequently, the aqueous solution was heated to at least 100° C., and the butanol was removed by azeotropic distillation with the water to adjust the solid fraction to 30%. This yielded an aqueous solution of a pigment dispersion resin 1 with a solid fraction of 30%.

Measurement of the pH of the aqueous solution (solid fraction: 30%) of the pigment dispersion resin 1 using a desktop pH meter F-72 manufactured by Horiba, Ltd. revealed a pH of 9.7. Further, measurement of the weight average molecular weight of the pigment dispersion resin obtained above using an HLC-8120GPC manufactured by Tosoh Corporation yielded a result of 22,500.

<Pigment Dispersion Resin 2>

With the exception of using 50 parts of acrylic acid and 50 parts of lauryl methacrylate as the polymerizable monomers, the same method as that described for the pigment dispersion resin 1 was used to obtain an aqueous solution of a pigment dispersion resin 2 with a solid fraction of 30%. The pH of the aqueous solution (solid fraction: 30%) of the pigment dispersion resin 2 was 8.1, and the weight average molecular weight of the pigment dispersion resin 2 was 15,000.

Next, using the prepared pigment dispersion resins, pigment dispersions were produced in the manner described below.

<Pigment Dispersions 1>

Twenty parts of a pigment, 20 parts of the previously prepared aqueous solution (solid fraction: 30%) of the pigment dispersion resin 1 and 60 parts of water were subjected to preliminary dispersion using a Disper. Subsequently, a Dyno-Mill with a capacity of 0.6 L filled with 1,800 g of zirconia beads of diameter 0.5 mm was used to perform the main dispersion over a period of two hours, thus obtaining a pigment dispersion 1.

The pigments used in preparing the various pigment dispersions (the CMYK inkjet inks described below) were as follows.

Cyan: LIONOL BLUE 7358G, manufactured by Toyo Color Co., Ltd. (C.I. Pigment Blue 15:3)

Magenta: Inkjet Magenta E5B02, manufactured by Clariant AG (C.I. Pigment Violet 19)

Yellow: LIONOL YELLOW TT-1405G, manufactured by Toyo Color Co., Ltd. (C.I. Pigment Yellow 14)

Black: PrinteX 85, manufactured by Orion Engineered Carbons S.A. (Carbon black)

<Pigment Dispersions 2>

With the exceptions of using the aqueous solution (solid fraction: 30%) of the pigment dispersion resin 2 as the pigment dispersion resin, and using FASTOGEN SUPER MAGENTA RG (C.I. Pigment Red 122) manufactured by DIC Corporation as the magenta pigment, the same method as that described for the pigment dispersion 1 was used to obtain pigment dispersions 2.

(2) Water-Soluble Resin Varnish Production Example

A reaction container fitted with a gas inlet tube, a thermometer, a condenser and a stiffer was charged with 20 parts of Joncryl 819 (an acrylic resin manufactured by BASF Corporation, weight average molecular weight: 14,500, acid value: 75 mgKOH/g), 2.38 parts of dimethylaminoethanol and 77.62 parts of water, thus forming an aqueous solution. One gram of this mixed solution was sampled, and dried by heating at 180° C. over a period of 20 minutes to measure the solid fraction concentration of the water-soluble resin varnish. Based on the obtained solid fraction concentration, sufficient water was added to the solution to prepare a water-soluble resin varnish having a non-volatile fraction of 20%, thus obtaining a water-soluble resin varnish having a solid fraction concentration of 20%.

(3) Inkjet Ink Production Examples

Using the prepared pigment dispersions and the water-soluble resin varnish, CMYK inkjet ink sets were produced in the manner described below.

<CMYK Inkjet Inks 1A>

The materials listed below were added sequentially to a mixing container while stirring was performed using a Disper, and the mixture was stirred thoroughly until a uniform mixture was obtained. Subsequently, the mixture was filtered through a membrane filter with a pore size of 1 μm. By using each of the four CMYK colors as the pigment dispersion 1, a set of CMYK inkjet inks 1A was obtained.

| | |
|---|---|
| Pigment dispersion 1 | 30 parts |
| Water-soluble resin varnish | 13 parts |
| 1,2-butanediol | 30 parts |
| Surfynol 465 | 0.2 parts |
| TEGO Wet 280 | 0.5 parts |
| Triethanolamine | 0.5 parts |
| PROXEL GXL | 0.05 parts |
| Ion-exchanged water | 25.75 parts |

<CMYK Inkjet Inks 2A to 12A>

Using the materials shown in Table A2, the same method as that described for the CMYK inkjet inks 1A was used to obtain CMYK inkjet inks 2A to 12A.

TABLE A2

| | | | CMYK inkjet inks | | | | | | | | | | | |
|---|---|---|---|---|---|---|---|---|---|---|---|---|---|---|
| | | | 1A | 2A | 3A | 4A | 5A | 6A | 7A | 8A | 9A | 10A | 11A | 12A |
| <a> | | Pigment dispersion 1 | 30 | 50 | 15 | 30 | 8 | 77 | 15 | | 20 | 30 | | 40 |
| | | Pigment dispersion 2 | | | | | | | | 30 | 5 | | 30 | |
| <b> | | Water-soluble resin varnish | 13 | 13 | 13 | 13 | 13 | | | 30 | 13 | 25 | 30 | |
| | | Joncryl 538 | | | | | | | 20 | | | | | 15 |
| <c> | Alkyl polyol-based | 1,2-PG (boiling point 188° C.) | | | | | | 10 | | 15 | | | | 15 |
| | | 1,2-BuD (boiling point 194° C.) | 30 | | | 10 | | | | 25 | | 20 | | |
| | | 1,2-PenD (boiling point 210° C.) | | | 10 | | | | | | | | | |
| | | 1,5-PenD (boiling point 214° C.) | | | | | 15 | | | | | | | |
| | | 1,2-HexD (boiling point 223° C.) | | | | 18 | | | | 18 | | 5 | 25 | |
| | | DEG (boiling point 244° C.) | | 5 | | | | | | | | | | |
| | | TEG (boiling point 288° C.) | | | 8 | | | | | | | | | |
| | | Glycerol (boiling point 290° C.) | | 10 | | | | 5 | | | | | | |
| | Glycol ether-based | MFG (boiling point 121° C.) | | | | | | | 10 | | | | | |
| | | EDG (boiling point 196° C.) | | | | | | 5 | | 5 | | | | |
| | | iPDG (boiling point 207° C.) | | | | | 5 | | | | | 5 | | 15 |
| | | BDG (boiling point 230° C.) | | | 5 | | | | | 5 | | | | |
| <d> | Acetylene-based | Surfynol 465 | 0.2 | 0.2 | 1 | 0.4 | 0.4 | 0.2 | 0.6 | 0.5 | 1 | 1 | | 0.5 |
| | Siloxane-based | TEGO Wet 280 | 0.5 | 0.8 | 0.4 | 0.1 | 1 | 0.5 | 2 | 0.1 | | 1 | 1 | 0.5 |
| <e> | | TEA | 0.5 | 0.5 | 0.5 | 0.5 | 0.5 | 0.5 | 0.5 | 0.5 | 0.5 | 0.5 | 0.5 | 0.5 |
| | | NaOH aq | | | | | 0.01 | | | 0.01 | | | | |
| <f> | | PROXEL GXL | 0.05 | 0.05 | 0.05 | 0.05 | 0.05 | 0.05 | 0.05 | 0.05 | 0.05 | 0.05 | 0.05 | 0.05 |
| | | Water | 25.75 | 20.45 | 47.05 | 27.95 | 57.04 | 1.75 | 33.85 | 3.84 | 40.45 | 17.45 | 13.45 | 13.45 |
| | | Surface tension | 24.0 | 23.7 | 24.2 | 25.6 | 22.3 | 25.3 | 21.5 | 24.8 | 26.6 | 22.2 | 23.7 | 25.2 |

<a> pigment dispersions,
<b> binder resins,
<c> organic solvents,
<d> surfactants,
<e> pH modifiers,
<f> preservative Those materials shown in Table A2 that were not shown in Table A1 are as follows.

Joncryl 538: an acrylic resin emulsion manufactured by BASF Corporation, solid fraction: 46%

1,2-PG: 1,2-propanediol
1,2-BuD: 1,2-butanediol
1,2-PenD: 1,2-pentanediol
1,5-PenD: 1,5-pentanediol
DEG: diethylene glycol
TEG: triethylene glycol
MFG: propylene glycol monomethyl ether
iPDG: diethylene glycol monoisopropyl ether
BDG: diethylene glycol monobutyl ether
NaOH aq: a 4% by weight aqueous solution of sodium hydroxide I-3. Evaluation of Pretreatment Solutions Examples 1A to 27A and Comparative Examples 1A and 2A The pretreatment solution was applied to a recording medium, and various evaluations were performed, using the methods described below. In the evaluations, in order to enhance the visibility, a recording medium was used to which a pretreatment solution containing an added dye had been applied.

<Production Examples for Recording Media to which a Pretreatment Solution Containing an Added Dye had been Applied>

In order to enhance the visibility, 0.1 g of Kayafect Red P Liquid (manufactured by Nippon Kayaku Co., Ltd.) was added to 10 g samples of each of the prepared pretreatment solutions 1 A to 25A, and thorough mixing was performed to dissolve the dye.

For each of these pretreatment solutions containing the added dye, a print tester K Lox Proofer (manufactured by Matsuo Sangyo Co., Ltd.) was used to apply the solution uniformly to a recording medium "OK Top Coat+paper" (manufactured by Oji Holdings Corporation). At this time, ceramic rollers having different numbers of ridges were used, and if necessary a plurality of application repetitions were performed, so as to achieve a wet coating amount that was within ±0.1 g/m² of the pretreatment solution coating amount shown below in Table A3.

After application of the pretreatment solution containing the added dye to the recording medium in the manner described above, the recording medium was immediately secured on a conveyor capable of transporting the recording medium. Subsequently, the conveyor was operated at a predetermined speed shown in Table A3, and the recording medium was passed through a box, positioned within the transport path, containing a mechanism for generating 100° C. hot air inside the box, thereby drying the pretreatment solution and obtaining a recording medium having an applied pretreatment solution. The time for which the recording medium on the conveyor was exposed to the hot air inside the box was as follows.

In the case of a transport speed of 75 m/minute: 0.8 seconds

In the case of a transport speed of 50 m/minute: 1.2 seconds

Actual production of the recording medium having the applied pretreatment solution was performed in accordance with the various evaluations described below. For example, in the production of the recording media used in evaluations of the drying properties and tack properties, the pretreatment solution was applied in the manner described above, and the coated medium was then dried at the transport speed shown in Table A3.

On the other hand, in the production of the recording media used in evaluations of coating irregularities and edge coating irregularities, coating was performed at three different coating speeds of 30 m/minute, 50 m/minute and 75 m/minute for each pretreatment solution. Subsequently, each of the coated products was dried in an oven (50° C., 3 minutes).

<Various Evaluations>

Various evaluations were performed for the obtained recording media. The results are shown in Table A3. In Table A3, Examples 1A to 27A, and Comparative Examples 1 A and 2A are abbreviated as Examples 1 to 27, and Comparative Examples 1 and 2 respectively. Similarly, the pretreatment solutions 1A to 25A are abbreviated as pretreatment solutions 1 to 25.

D: coating irregularities were observed in all of the coated products produced at the various speeds.

<Evaluation of Pretreatment Solution Drying Properties>

A recording medium to which the pretreatment solution containing the added dye had been applied was produced at the coating speed shown in Table A3, a separate recording medium (OK Top Coat+paper) was overlaid on top of the coated recording medium, a weight of 200 g was applied from above, and the resulting structure was left to stand at 25° C. for 24 hours.

Subsequently, the overlaid recording medium (OK Top Coat+paper) was removed, and the degree of set-off of the

TABLE A3

| Example/ Comparative Example | Sample Pretreatment solution | Transport speed m/min (coating/drying) | Pretreatment solution coating amount g/m2 | Coating irregularities | Pretreatment solution drying properties | Tack properties | Edge coating irregularities |
|---|---|---|---|---|---|---|---|
| Example 1 | 1 | 50 | 4 | A | A | A | A |
| Example 2 | 2 | 50 | 4 | A | A | A | A |
| Example 3 | 3 | 50 | 4 | A | A | A | A |
| Example 4 | 4 | 50 | 4 | A | A | A | A |
| Example 5 | 5 | 50 | 4 | A | A | A | A |
| Example 6 | 6 | 50 | 4 | A | A | A | A |
| Example 7 | 7 | 50 | 4 | A | A | A | A |
| Example 8 | 8 | 50 | 4 | A | A | A | A |
| Example 9 | 9 | 50 | 4 | A | A | A | A |
| Example 10 | 10 | 50 | 4 | A | A | A | A |
| Example 11 | 11 | 50 | 4 | A | A | A | A |
| Example 12 | 12 | 50 | 4 | A | A | A | A |
| Example 13 | 13 | 50 | 4 | A | A | A | A |
| Example 14 | 14 | 50 | 4 | A | A | A | A |
| Example 15 | 15 | 50 | 4 | B | A | A | A |
| Example 16 | 16 | 50 | 4 | A | A | A | A |
| Example 17 | 17 | 50 | 4 | A | A | C | C |
| Example 18 | 18 | 50 | 4 | A | A | A | A |
| Example 19 | 19 | 50 | 4 | B | A | A | C |
| Example 20 | 20 | 50 | 4 | B | A | A | A |
| Example 21 | 21 | 50 | 4 | B | A | A | C |
| Example 22 | 22 | 50 | 4 | A | A | A | C |
| Example 23 | 23 | 50 | 4 | A | A | A | C |
| Example 24 | 18 | 50 | 0.5 | A | A | A | A |
| Example 25 | 18 | 50 | 35 | A | B | C | A |
| Example 26 | 4 | 75 | 4 | A | A | B | A |
| Example 27 | 18 | 75 | 4 | A | A | A | A |
| Comparative Example 1 | 24 | 50 | 4 | D | A | A | A |
| Comparative Example 2 | 25 | 50 | 4 | D | A | A | A |

Details relating to the various evaluations shown in Table A3 are described below.

<Evaluation of Pretreatment Solution Coating Irregularities>

Recording media to which the pretreatment solution containing the added dye had been applied were produced at various different coating speeds, and the degree of color irregularities on the recording medium surface was inspected visually to evaluate the coatability of the pretreatment solution.

The evaluation criteria were as follows, with a grade of C or higher indicating a favorable level for practical application.

A: coating irregularities were not observed in any of the coated products produced at the various speeds.

B: coating irregularities were not observed at 50 m/min or slower, but coating irregularities were observed at 75 m/min.

C: coating irregularities were not observed at 30 m/min, but coating irregularities were observed at 50 in/min or greater.

pretreatment solution was confirmed. Further, the surface of a freshly produced recording medium to which the pretreatment solution containing the added dye had been applied was rubbed 10 times back and forth with a cotton swab, and the result of this rubbing, together with the set-off result, were used to evaluate the drying properties of the recording medium.

The evaluation criteria were as follows, with a grade of C or higher indicating a favorable level for practical application.

A: absolutely no pretreatment solution adhered to the cotton swab after 10 back and forth rubbing repetitions, and no set-off was observed.

B: adhesion of the pretreatment solution to the cotton swab was observed after 5 back and forth rubbing repetitions, but no set-off was observed.

C: adhesion of the pretreatment solution to the cotton swab was observed after 1 back and forth rubbing repetition, but no set-off was observed.

D: adhesion of the pretreatment solution to the cotton swab and set-off were both observed.

<Evaluation of Tack Properties>

A substrate to which the pretreatment solution containing the added dye had been applied was produced at the coating speed shown in Table A3, a separate recording medium (OK Top Coat+paper) was overlaid on top of the coated recording medium, a weight of 200 g was applied from above, and the resulting structure was left to stand for 24 hours under hot and moist conditions of 35° C. and 80%.

Subsequently, the overlaid recording medium (OK Top Coat+paper) was removed, and the degree of set-off of the pretreatment solution was confirmed. Further, following this standing period under hot and moist conditions, the surface of the recording medium to which the pretreatment solution containing the added dye had been applied was rubbed 10 times back and forth with a cotton swab, and the result of this rubbing, together with the set-off result, were used to evaluate the tack properties of the recording medium.

The evaluation criteria were as follows, with a grade of C or higher indicating a favorable level for practical application.

A: absolutely no pretreatment solution adhered to the cotton swab after 10 back and forth rubbing repetitions, and no set-off was observed.

B: adhesion of the pretreatment solution to the cotton swab was observed after 5 back and forth rubbing repetitions, but no set-off was observed.

C: adhesion of the pretreatment solution to the cotton swab was observed after 1 back and forth rubbing repetition, but no set-off was observed.

D: adhesion of the pretreatment solution to the cotton swab and set-off were both observed.

<Evaluation of Edge Coating Irregularities>

Recording media to which the pretreatment solution containing the added dye had been applied were produced at various different coating speeds. For each obtained recording medium, the degree of edge coating irregularities was inspected visually to evaluate the film thickness uniformity of the edges of the coated portion.

The evaluation criteria were as follows, with a grade of C or higher indicating a favorable level for practical application.

A: edge coating irregularities were not observed in any of the coated products produced at the various speeds.

B: edge coating irregularities were not observed at 50 m/min or slower, but were observed at 75 m/min.

C: edge coating irregularities were not observed at 30 m/min, but were observed at 50 m/min or greater.

D: edge coating irregularities were observed in all of the coated products produced at the various speeds.

I-4. Production and Evaluation of Inkjet Ink Printed Matter

Examples 28A to 65A, and Comparative Examples 3A and 4A

Using the method described below, a recording medium to which the pretreatment solution had been applied was produced, inkjet printing was then performed using inkjet inks to produce printed matter, and various evaluations of the printed matter were then performed.

<Production Examples for Recording Media to which a Pretreatment Solution had been Applied>

For each of the prepared pretreatment solutions 1A to 25A, a print tester K Lox Proofer (manufactured by Matsuo Sangyo Co., Ltd.) was used to apply the solution uniformly to a recording medium "OK Top Coat+paper" (manufactured by Oji Holdings Corporation) at the coating speed shown below in Table A5. At this time, ceramic rollers having different numbers of ridges were used, and if necessary a plurality of application repetitions were performed, so as to achieve a wet coating amount that was within ±0.1 g/m$^2$ of the pretreatment solution coating amount shown below in Table A5.

After application of the pretreatment solution in the manner described above, the recording medium was immediately secured on a conveyor capable of transporting the recording medium. Subsequently, the conveyor was operated at a predetermined speed shown in Table A5, and the recording medium was passed through a box, positioned within the transport path, containing a mechanism for generating 100° C. hot air inside the box, thereby drying the pretreatment solution and obtaining a recording medium having an applied pretreatment solution. The time for which the recording medium on the conveyor was exposed to the hot air inside the box was as follows.

In the case of a transport speed of 75 m/minute: 0.8 seconds

In the case of a transport speed of 50 m/minute: 1.2 seconds

<Inkjet Ink Printed Matter Production Examples>

An inkjet head KJ4B-QA (manufactured by Kyocera Corporation) was installed above a conveyor capable of transporting recording media, and the inkjet head was filled with inkjet inks. The design resolution of the above inkjet head was 600 dpi and the maximum drive frequency was 30 kHz, and when printing was performed at the maximum drive frequency and at a printing speed of 75 in/minute, the recording resolution in the transport direction of the recording medium was 600 dpi.

Subsequently, the previously produced recording medium to which a pretreatment solution had been applied was secured to the conveyor, the conveyor was driven at the speed shown in Table A5, and as the recording medium passed beneath the installation position for the inkjet head, the inkjet inks were discharged in CMYK order using a drop volume of 12 µL, thus printing a sample No. 5 (bicycle image) from the high-precision color digital standard image data (JSA-00001 prescribed in ISO/JIS-SCID JIS X 9201).

Following printing, the recording medium to which the ink had been applied was secured to a conveyor capable of transporting the recording medium. Subsequently, the conveyor was operated at a predetermined speed shown in Table A5, and the recording medium was passed through a box, positioned within the transport path, containing a mechanism for generating 100° C. hot air inside the box, thereby drying the inks and completing production of inkjet ink printed matter.

Production of the printed matter was performed in accordance with the above method under the two sets of printing conditions shown below in Table A4.

TABLE A4

| Printing conditions No. | Conveyor transport speed (m/minute) | Inkjet head drive frequency (kHz) |
|---|---|---|
| A | 50 | 20 |
| B | 75 | 30 |

The evaluation results for the inkjet ink printed matter produced in the manner described above are shown in Table A5. The combinations of pretreatment solutions and inkjet inks (ink sets) used in producing the printed matter were as shown in Table A5. In Table A5, Examples 28A to 65A, and Comparative Examples 3A and 4A are abbreviated as Examples 28 to 65, and Comparative Examples 3 and 4 respectively. Similarly, the pretreatment solutions 1A to 25A are abbreviated as pretreatment solutions 1 to 25, and the inkjet inks 1A to 12A are abbreviated as inkjet inks 1 to 12.

C: no bleeding was visible with the naked eye, and when viewed under a microscope, dots up to 2C (CM) remained independent, but the Y and K showed slight bleeding to an oval shape.

TABLE A5

| Example/Comparative Example | Ink set Pretreatment solution | Ink set CMYK inkjet inks | Transport speed m/min (coating/printing/drying) | Pretreatment solution coating amount g/m2 | Evaluation results Bleeding | Ink drying properties | Cracking | Solid filling | Water resistance | Density | Discharge stability |
|---|---|---|---|---|---|---|---|---|---|---|---|
| Example 28 | 1 | 10 | 50 | 4 | A | A | A | A | A | A | A |
| Example 29 | 2 | 10 | 50 | 4 | A | A | A | A | A | A | A |
| Example 30 | 3 | 10 | 50 | 4 | A | A | A | A | A | A | A |
| Example 31 | 4 | 10 | 50 | 4 | A | A | A | A | A | A | A |
| Example 32 | 5 | 10 | 50 | 4 | A | A | A | A | A | A | A |
| Example 33 | 6 | 10 | 50 | 4 | A | A | A | A | A | A | A |
| Example 34 | 7 | 10 | 50 | 4 | A | A | A | A | A | A | A |
| Example 35 | 8 | 10 | 50 | 4 | A | A | A | A | A | A | A |
| Example 36 | 9 | 10 | 50 | 4 | A | A | A | A | A | A | A |
| Example 37 | 10 | 10 | 50 | 4 | A | A | A | A | A | A | A |
| Example 38 | 11 | 10 | 50 | 4 | B | A | A | A | A | A | A |
| Example 39 | 12 | 10 | 50 | 4 | A | A | A | A | A | A | A |
| Example 40 | 13 | 10 | 50 | 4 | A | A | A | A | A | A | A |
| Example 41 | 14 | 10 | 50 | 4 | A | A | A | A | C | A | A |
| Example 42 | 15 | 10 | 50 | 4 | A | A | A | A | C | A | A |
| Example 43 | 16 | 10 | 50 | 4 | B | A | A | A | A | A | A |
| Example 44 | 17 | 10 | 50 | 4 | A | A | A | A | A | A | A |
| Example 45 | 18 | 10 | 50 | 4 | A | A | A | A | A | A | A |
| Example 46 | 19 | 10 | 50 | 4 | A | A | A | A | A | A | A |
| Example 47 | 20 | 10 | 50 | 4 | A | A | A | B | A | A | A |
| Example 48 | 21 | 10 | 50 | 4 | A | A | A | A | A | A | A |
| Example 49 | 22 | 10 | 50 | 4 | A | A | A | A | A | A | A |
| Example 50 | 23 | 10 | 50 | 4 | A | A | C | A | A | A | A |
| Example 51 | 18 | 1 | 50 | 4 | A | A | A | A | A | A | C |
| Example 52 | 18 | 2 | 50 | 4 | A | C | A | A | A | A | A |
| Example 53 | 18 | 3 | 50 | 4 | A | C | A | A | A | A | A |
| Example 54 | 18 | 4 | 50 | 4 | A | C | A | A | A | A | A |
| Example 55 | 18 | 5 | 50 | 4 | A | A | A | A | A | C | A |
| Example 56 | 18 | 6 | 50 | 4 | A | A | A | A | A | A | C |
| Example 57 | 18 | 7 | 50 | 4 | A | A | A | A | A | A | C |
| Example 58 | 18 | 8 | 50 | 4 | A | A | A | A | A | C | A |
| Example 59 | 18 | 9 | 50 | 4 | B | A | A | A | A | A | A |
| Example 60 | 18 | 11 | 50 | 4 | B | C | A | A | A | C | C |
| Example 61 | 18 | 12 | 50 | 4 | A | A | A | A | A | A | C |
| Example 62 | 18 | 10 | 50 | 0.5 | B | A | A | A | A | A | A |
| Example 63 | 18 | 10 | 50 | 35 | A | B | C | A | A | A | A |
| Example 64 | 18 | 10 | 75 | 4 | A | A | A | A | A | A | A |
| Example 65 | 4 | 10 | 75 | 4 | B | A | A | A | A | A | A |
| Comparative Example 3 | 24 | 1 | 50 | 4 | D | A | A | A | A | A | A |
| Comparative Example 4 | 25 | 1 | 50 | 4 | D | A | A | A | A | A | A |

Details relating to the various evaluations shown in Table A5 are described below.

<Evaluation of Bleeding>

The image quality of the 4C (CMYK) printed portion (clock image) of the inkjet ink printed matter was inspected visually, and the dot shape was inspected under a microscope at a magnification of ×200 to evaluate the level of bleeding.

The evaluation criteria were as follows, with a grade of C or higher indicating a favorable level for practical application.

A: no bleeding was visible with the naked eye, and even under a microscope, the dots remained independent and no bleeding was observed.

B: no bleeding was visible with the naked eye, and when viewed under a microscope, dots up to 3C (CMY) remained independent, but the uppermost K showed slight bleeding to an oval shape.

D: bleeding was visible with the naked eye, and in dots of the 4C printed portion, the M, Y and K were unable to retain their circular shape, with color mixing occurring.

<Evaluation of Ink Drying Properties>

A separate recording medium (OK Top Coat+paper) was overlaid on top of the inkjet ink printed matter, a weight of 200 g was applied from above, and the resulting structure was left to stand at 25° C. for 24 hours.

Subsequently, the overlaid recording medium (OK Top Coat+paper) was removed, and the degree of ink set-off was confirmed. Further, the 4C (CMYK) printed portion of a freshly produced inkjet ink printed matter (the clock image portion that exists within the printed matter of the high-precision color digital standard image data (sample No. 5)) was rubbed 10 times back and forth with a cotton swab, and the result of this rubbing, together with the set-off result, were used to evaluate the drying properties of the inkjet ink.

The evaluation criteria were as follows, with a grade of C or higher indicating a favorable level for practical application.

A: absolutely no ink had adhered to the cotton swab after 10 back and forth rubbing repetitions, and no set-off was observed.

B: adhesion of the ink to the cotton swab was observed after 5 back and forth rubbing repetitions, but no set-off was observed.

C: adhesion of the ink to the cotton swab was observed after 1 back and forth rubbing repetition, but no set-off was observed.

D: adhesion of the ink to the cotton swab and set-off were both observed.

<Evaluation of Cracking>

Coating film cracking of the 4C (CMYK) printed portion of an inkjet ink printed matter (the clock image portion that exists within the printed matter of the high-precision color digital standard image data (sample No. 5)) was inspected visually. In addition, the existence of very fine cracking was evaluated by inspection of the image under a microscope at a magnification of ×200.

The evaluation criteria were as follows, with a grade of C or higher indicating a favorable level for practical application.

A: no cracking was visible with the naked eye, and even under a microscope, no cracking was observed.

B: no cracking was visible with the naked eye, but when viewed under a microscope, 1 or 2 fine cracks were observed.

C: no cracking was visible with the naked eye, but when viewed under a microscope, 3 to 5 fine cracks were observed.

D: large cracking visible with the naked eye was observed.

<Evaluation of Solid Filling>

Using the apparatus used in the production of the above inkjet ink printed matter, the cyan (C), magenta (M), yellow (Y) and black (K) inks were used individually, and each ink was discharged onto a recording medium (OK Top Coat+ paper" (manufactured by Oji Holdings Corporation)) using a drop volume of 12 μL to form a solid printed matter.

The solid printed matters of each color produced above were inspected visually and under a microscope to determine that no locations existed where the filling was inadequate and the recording medium was exposed, thereby evaluating the solid filling properties.

The evaluation criteria were as follows, with a grade of C or higher indicating a favorable level for practical application. The evaluation was performed for each of the CMYK colors, and the lowest evaluation result was recorded in Table A5.

A: the solid portion was completely filled when viewed with the naked eye or under a microscope.

B: when viewed under a microscope, lighter color portions were observed, but filling appeared satisfactory when viewed with the naked eye.

C: when viewed under a microscope, portions where the substrate was visible were observed, but filling appeared satisfactory when viewed with the naked eye.

D: density irregularities were noticeable with the naked eye, or the recording medium was exposed.

<Evaluation of Water Resistance>

The aforementioned solid printed matters of each color were rubbed back and forth 10 times with a cotton swab that had been soaked in water to evaluate the water resistance of the printed matters. The evaluation criteria were as follows, with a grade of C or higher indicating a favorable level for practical application. The evaluation was performed for each of the CMYK colors, and the lowest evaluation result was recorded in Table A5.

A: absolutely no ink had adhered to the cotton swab after 10 back and forth rubbing repetitions.

B: absolutely no ink had adhered to the cotton swab after 7 back and forth rubbing repetitions, but adhesion of the ink to the cotton swab was observed within 10 back and forth rubbing repetitions.

C: absolutely no ink had adhered to the cotton swab after 5 back and forth rubbing repetitions, but adhesion of the ink to the cotton swab was observed within 7 back and forth rubbing repetitions.

D: adhesion of the ink to the cotton swab was observed within 5 back and forth rubbing repetitions.

<Evaluation of Density>

The OD value of the aforementioned solid printed matters of each color were measured under Status E in the CIE standard colorimetric system using a spectroscopic colorimeter X-RITE 528, a D50 light source and a viewing angle of 2°. In each of the magenta, yellow and cyan color regions, an evaluation as to whether or not the density was high was made by comparison with the Japan Color 2011 density.

The evaluation criteria were as follows, with a grade of C or higher indicating a favorable level for practical application.

A: in all of the magenta, yellow and cyan regions, the density was at least 0.1 higher than the Japan Color 2011 density.

B: in one region among magenta, yellow and cyan, the density was 0 to 0.1 higher than the Japan Color 2011 density, whereas in the other two regions, the density was at least 0.1 higher than the Japan Color 2011 density.

C: in two regions among magenta, yellow and cyan, the density was 0 to 0.1 higher than the Japan Color 2011 density, whereas in the other one region, the density was at least 0.1 higher than the Japan Color 2011 density.

D: in all of the magenta, yellow and cyan regions, the density was lower than the Japan Color 2011 density.

<Evaluation of Discharge Stability>

An inkjet discharge apparatus fitted with an inkjet head KJ4B-QA (manufactured by Kyocera Corporation) was prepared, and a black inkjet ink was loaded into the apparatus. Following confirmation of no missing nozzles, discharge was performed continuously for two hours under conditions including a drop volume of 5 μL and a drive frequency of 30 kHz, and the discharge stability was then evaluated by printing a nozzle check pattern and counting the number of missing nozzles.

The evaluation criteria were as follows, with a grade of C or higher indicating a favorable level for practical application.

A: in the nozzle check pattern printed 2 hours after starting printing, there were no missing nozzles.

B: in the nozzle check pattern printed 2 hours after starting printing, there were 1 or 2 missing nozzles.

C: in the nozzle check pattern printed 2 hours after starting printing, there were 3 or 4 missing nozzles.

D: in the nozzle check pattern printed 2 hours after starting printing, there were 5 or more missing nozzles.

II-1. Pretreatment Solution B

<Pretreatment Solution 1B Production Example>

The materials described below were stirred and mixed for one hour, and the mixture was then heated to 60° C. and mixed for a further one hour. Subsequently, the mixture was filtered through a membrane filter having a pore size of 1 μm to obtain a pretreatment solution 1B.

| | |
|---|---:|
| Calcium chloride dihydrate (manufactured by Tokuyama Corporation) | 5 parts |
| Triethanolamine (TEA, a tertiary amine, molecular weight: 149) | 0.5 parts |
| PVA105 (a polyvinyl alcohol manufactured by Kuraray Co., Ltd., degree of saponification: 98 to 99% (fully saponified), degree of polymerization: 500) | 5 parts |
| 2-propanol | 4 parts |
| 3-methoxybutanol | 4 parts |
| Surfynol 465 (an acetylene-based surfactant, manufactured by Air Products and Chemicals, Inc.) | 0.4 parts |
| PROXEL GXL (a preservative, a 1,2-benzisothiazol-3-one solution, manufactured by Arch Chemicals, Inc.) | 0.05 parts |
| Ion-exchanged water | 81.05 parts |

<Pretreatment Solutions 2B to 63B>

Using the materials shown below in Table B1 to Table B3, the same method as that described for the pretreatment solution 1B was used to obtain pretreatment solutions 2B to 63B.

TABLE B1

| | | Pretreatment solution | | | | | | | | | | | | | | | | | | | |
|---|---|---|---|---|---|---|---|---|---|---|---|---|---|---|---|---|---|---|---|---|---|
| | | 1B | 2B | 3B | 4B | 5B | 6B | 7B | 8B | 9B | 10B | 11B | 12B | 13B | 14B | 15B | 16B | 17B | 18B | 19B | 20B |
| <1> Inorganic salt | CaCl2•2H2O | 5 | 3 | 10 | 25 | 50 | 60 | | | | | | | | 6 | 10 | 10 | 10 | 10 | 10 | 10 |
| | MgCl2•6H2O | | | | | | | | | | | | | | | | | | | | |
| | MgSO4 | | | | | | | | | | | | | | | | | | | | |
| | Ca(NO3)2 | | | | | | | | | | | | | | | | | | | | |
| Organic salt | NaCl | | | | | | | 20 | | | | | | | | | | | | | |
| | (CH3COO)2Ca•H2O | | | | | | | | 20 | | | | | | | | | | | | |
| | CH3COONa•3H2O | | | | | | | | | 20 | | | | | | | | | | | |
| | (CH3CH(OH)COO)2Ca•5H2O | | | | | | | | | | 20 | 20 | 20 | | | | | | | | |
| <2> Molecular weight 500 or lower | TEA | 0.5 | 0.5 | 0.5 | 0.5 | 0.5 | 0.5 | 0.5 | 0.5 | 0.5 | 0.5 | 0.5 | 0.5 | | 0.5 | 0.1 | 0.2 | 2.5 | 3.5 | 5 | 10 |
| | DMAE | | | | | | | | | | | | | | | | | | | | |
| | EPOMIN SP-003 | | | | | | | | | | | | | | 6 | | | | | | |
| Molecular weight more than 500 | EPOMIN SP-006 | | | | | | | | | | | | | | | | | | | | |
| | ALMATEX H700 | | | | | | | | | | | | | 10 | | | | | | | |
| <3> Fully saponified PVA | PVA103 | | | | | | | | | | | | | | | | | | | | |
| Partially saponified PVA | PVA105 | 5 | 5 | 5 | 5 | 5 | 5 | 5 | 5 | 5 | 5 | 5 | 5 | 5 | 5 | 5 | 5 | 5 | 5 | 5 | 5 |
| | PVA220 | | | | | | | | | | | | | | | | | | | | |
| Other | HYDRAN CP-7020 | | | | | | | | | | | | | | | | | | | | |
| | Joncryl 1674 | | | | | | | | | | | | | | | | | | | | |
| <4> Monohydric alcohol | iPrOH | 4 | 4 | 4 | 4 | 4 | 4 | 4 | 4 | 4 | 4 | 4 | 4 | 4 | 4 | 4 | 4 | 4 | 4 | 4 | 4 |
| | MB | 4 | 4 | 4 | 4 | 4 | 4 | 4 | 4 | 4 | 4 | 4 | 4 | 4 | 4 | 4 | 4 | 4 | 4 | 4 | 4 |
| Glycol | 1,2-PD | | | | | | | | | | | | | | | | | | | | |
| | 1,3-BuD | | | | | | | | | | | | | | | | | | | | |
| | 1,2-PenD | | | | | | | | | | | | | | | | | | | | |
| | 1,2-HexD | | | | | | | | | | | | | | | | | | | | |
| Other | EDG | | | | | | | | | | | | | | | | | | | | |
| <5> Acetylene-based | Surfynol 465 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| | Surfynol 440 | | | | | | | | | | | | | | | | | | | | |
| | Surfynol 104 | | | | | | | | | | | | | | | | | | | | |
| | Dynol 607 | | | | | | | | | | | | | | | | | | | | |
| Siloxane-based | TEGO Wet 280 | | | | | | | | | | | | | | | | | | | | |
| | KF-351A | | | | | | | | | | | | | | | | | | | | |
| Other | Zonyl FS-300 | | | | | | | | | | | | | | | | | | | | |
| <6> | PROXEL GXL | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| | Water | 81.05 | 83.05 | 76.05 | 61.05 | 36.05 | 26.05 | 66.05 | 66.05 | 66.05 | 66.05 | 66.05 | 66.05 | 76.05 | 74.05 | 76.45 | 76.35 | 74.05 | 73.05 | 71.55 | 66.55 |
| | pH | 8.5 | 8.5 | 8.4 | 8.4 | 8.2 | 8.8 | 8.1 | 8.0 | 8.0 | 9.0 | 7.5 | 7.2 | 8.8 | 7.8 | 7.0 | 7.0 | 9.3 | 9.4 | 9.8 | 10.3 |
| | Metal ion content (%) | 1.4 | 0.8 | 2.7 | 6.8 | 13.6 | 16.3 | 2.4 | 4.0 | 4.9 | 3.8 | 4.5 | 3.4 | 1.3 | 2.8 | 2.7 | 2.7 | 2.7 | 2.7 | 2.7 | 2.7 |

TABLE B2

| | | Pretreatment solution | | | | | | | | | | | | | | | | | | | | | | |
|---|---|---|---|---|---|---|---|---|---|---|---|---|---|---|---|---|---|---|---|---|---|---|---|---|
| | | 21B | 22B | 23B | 24B | 25B | 26B | 27B | 28B | 29B | 30B | 31B | 32B | 33B | 34B | 35B | 36B | 37B | 38B | 39B | 40B | 41B | 42B | 43B |
| <1> Inorganic salt | CaCl2·2H2O | 10 | 10 | 10 | 10 | 10 | 10 | 10 | 10 | 10 | 5 | 20 | 10 | 10 | 10 | 10 | 10 | 10 | 10 | 20 | 20 | 20 | 20 | 20 |
| | MgCl2·6H2O | | | | | | | | | | | | | | | | | | | | | | | |
| | MgSO4 | | | | | | | | | | | | | | | | | | | | | | | |
| | Ca(NO3)2 | | | | | | | | | | | | | | | | | | | | | | | |
| | NaCl | | | | | | | | | | | | | | | | | | | | | | | |
| Organic salt | (CH3COO)2Ca·H2O | | | | | | | | | | | | | | | | | | | | | | | |
| | CH3COONa·3H2O | | | | | | | | | | | | | | | | | | | | | | | |
| | (CH3CH(OH)COO)2Ca·5H2O | | | | | | | | | | | | | | | | | | | | | | | |
| <2> Molecular weight 500 or lower | TEA | 0.5 | | | | | | | | | | | | | | | | | | | | | | |
| | DMAE | | 0.5 | | | | | | | | | | | | | | | | | | | | | |
| | EPOMIN SP-003 | | | 0.5 | | | | | | | | | | | | | | | | | | | | |
| Molecular weight more than 500 | EPOMIN SP-006 | | | | 0.5 | | | | | | | | | | | | | | | | | | | |
| | ALMATEX H700 | | | | | 3 | 5 | 10 | | | | | | | | | | | | | | | | |
| <3> Fully saponified PVA | PVA103 | | | | | | | | 5 | 10 | 50 | | | | | | | | | | | | | |
| Partially saponified PVA | PVA105 | 5 | 5 | 5 | 5 | 5 | 5 | 5 | | | | | 5 | 5 | 5 | 5 | 5 | 5 | 5 | 5 | 5 | 5 | 5 | 5 |
| | PVA220 | | | | | | | | | | | 5 | | | | | | | | | | | | |
| Other | HYDRAN CP-7020 | | | | | | | | | | | | | | | | | | | | | | | |
| | Joncryl 1674 | | | | | | | | | | | | | | | | | | | | | | | |
| <4> Monohydric alcohol | iPrOH | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| | MB | 4 | 4 | 4 | 4 | 4 | 4 | 4 | 4 | 4 | 4 | 4 | 4 | 4 | 4 | 4 | 4 | 4 | 4 | 4 | 4 | 2 | 4 | 4 |
| Glycol | 1,2-PD | | | | | | | | | | | | | | | | | | | 15 | 10 | 10 | | |
| | 1,3-BuD | | | | | | | | | | | | | | | | | | | 10 | 10 | 4 | | |
| | 1,2-PenD | | | | | | | | | | | | | | | | | | | | | | 4 | |
| | 1,2-HexD | | | | | | | | | | | | | | | | | | | | | | | 0.4 |
| | EDG | | | | | | | | | | | | | | | | | | | | | | | |
| <5> Acetylene-based | Surfynol 465 | 0.4 | 0.4 | 0.4 | 0.4 | 0.4 | 0.4 | 0.4 | 0.4 | 0.4 | 0.4 | 0.4 | | | | | | | | 0.4 | 0.4 | 0.4 | 0.4 | 0.4 |
| | Surfynol 440 | | | | | | | | | | | | 0.2 | | | | | | | | | | | |
| | Surfynol 104 | | | | | | | | | | | | | 0.2 | | | | | | | | | | |
| | Dynol 607 | | | | | | | | | | | | | | 0.2 | | | | | | | | | |
| Siloxane-based | TEGO Wet 280 | | | | | | | | | | | | | | | 0.2 | | | | | | | | |
| | KF-351A | | | | | | | | | | | | | | | | 0.2 | | | | | | | |
| Other | Zonyl FS-300 | | | | | | | | | | | | | | | | | 0.2 | | | | | | |
| | PROXEL GXL | | | | | | | | | | | | | | | | | | 0.2 | | | | | |
| <6> | PROXEL GXL | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| | Water | 76.05 | 76.05 | 76.05 | 76.05 | 73.55 | 71.55 | 66.55 | 76.05 | 71.05 | 36.05 | 66.05 | 76.65 | 76.65 | 76.65 | 76.65 | 76.65 | 76.65 | 76.65 | 45.05 | 50.05 | 54.05 | 62.05 | 65.65 |
| | pH | 8.6 | 8.2 | 7.6 | 6.7 | 6.8 | 7.0 | 7.0 | 8.4 | 8.2 | 8.0 | 8.3 | 8.5 | 8.5 | 8.5 | 8.5 | 8.4 | 8.3 | 8.1 | 8.0 | 8.2 | 8.4 | 8.5 | 8.6 |
| | Metal ion content (%) | 2.7 | 2.7 | 2.7 | 2.7 | 2.7 | 2.7 | 2.7 | 2.7 | 2.7 | 1.4 | 5.4 | 2.7 | 2.7 | 2.7 | 2.7 | 2.7 | 2.7 | 2.7 | 2.4 | 2.4 | 2.4 | 2.4 | 2.4 |

TABLE B3

| | | 44B | 45B | 46B | 47B | 48B | 49B | 50B | 51B | 52B | 53B | 54B | 55B | 56B | 57B | 58B | 59B | 60B | 61B | 62B | 63B |
|---|---|---|---|---|---|---|---|---|---|---|---|---|---|---|---|---|---|---|---|---|---|
| <1> Inorganic salt | CaCl2·2H2O | | | | | | | | | | | | | | | | | | | | |
| | MgCl2·6H2O | 20 | 20 | 20 | | 10 | 7 | 10 | 10 | 10 | 10 | 10 | 10 | 10 | 10 | 10 | 10 | 3 | 10 | 10 | |
| | MgSO4 | | | | | | | | | | | | | | | | | | | | |
| | Ca(NO3)2 | | | | 20 | | | | | | | | | | | | | | | | |
| | NaCl | | | | | | | | | | | | | | | | | | | | |
| Organic salt | (CH3COO)2Ca·H2O | | | | | | | | | | | | | | | | | | | | |
| | CH3COONa·3H2O | | | | | | | | | | | | | | | | | | | | |
| | (CH3CH(OH)COO)2Ca·5H2O | | | | | | | | | | | | | | | | | | | | |
| <2> Molecular weight 500 or lower | TEA | 0.5 | 0.5 | 0.5 | 0.5 | 0.5 | 0.5 | 0.5 | | 0.5 | 0.5 | 0.5 | 0.5 | 0.5 | 0.5 | 0.5 | 0.5 | 0.5 | 0.5 | | 0.5 |
| | DMAE | | | | | | | | | | | | | | | | | | | | |
| | EPOMIN SP-003 | | | | | | | | | | | | | | | | | | | | |
| | EPOMIN SP-006 | | | | | | | | | | | | | | | | | | | | |
| Molecular weight more than 500 | ALMATEX H700 | | | | | | | | | | | | | | | | | | | | |
| | PVA103 | | | | | | | 10 | | | 10 | | | | | | | | | | |
| <3> Fully saponified PVA | | | | | | | | | | | | | | | | | | | | | 10 |
| Partially saponified PVA | PVA105 | 5 | 5 | 5 | 5 | 5 | 5 | | 5 | 10 | | 10 | 10 | 10 | 10 | 10 | | | | 5 | |
| | PVA220 | | | | | | | | | | | | | | | | | | | | |
| Other | HYDRAN CP-7020 | | | | | | | | | | | | | | | | 12.5 | | 5 | | |
| | Joncryl 1674 | | | | | | | | | | | | | | | | | 75 | | | |
| <4> Monohydric alcohol | iPrOH | 4 | 4 | 4 | 4 | 4 | 4 | 4 | 4 | 4 | 4 | | | | 4 | 16 | 16 | | 4 | | 4 |
| | MB | 4 | 2 | | | 4 | 4 | 4 | | | | | | 4 | | | | | 4 | | |
| Glycol | 1,2-PD | 4 | 6 | 6 | 4 | | | | 4 | | | | | | | | | | | | |
| | 1,3-BuD | | | | 4 | | | | | | | | | | | | | | | | |
| | 1,2-PenD | | | | | | | | | | | 20 | | | | | | | | | |
| | 1,2-HexD | | | | | | | | | 4 | 4 | | 4 | | | 4 | | | | | |
| Other | EDG | | | | | | | | | | | | | | | | | 10 | | | |
| <5> Acetylene-based | Surfynol 465 | 0.4 | 0.4 | 0.4 | 0.4 | | | | 0.4 | 0.4 | 0.4 | 0.4 | 0.4 | 0.4 | 0.4 | 0.4 | 0.4 | | 0.4 | 0.4 | 0.4 |
| | Surfynol 440 | | | | | 0.2 | | | | | | | | | | | | | 0.2 | | |
| | Surfynol 104 | | | | | | 0.5 | | | | | | | | | | | 0.4 | 0.2 | | |
| | Dynol 607 | | | | | | | | | | | | | | | | | | | | |
| Siloxane-based | TEGO Wet 280 | | | | | | | | | | | | | | | | | | | | |
| | KF-351A | | | | | | | 0.05 | | | | | | | | | | | | | |
| Other | Zonyl FS-300 | | | | | | | | | | | | | | | | | | | | |
| <6> | PROXEL GXL | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| | Water | 62.05 | 62.05 | 64.05 | 62.05 | 76.25 | 78.95 | 71.40 | 71.05 | 71.05 | 71.05 | 59.05 | 75.05 | 75.05 | 75.05 | 59.05 | 60.55 | 11.05 | 75.65 | 80.55 | 85.05 |
| | pH | 8.6 | 8.5 | 8.4 | 8.6 | 8.5 | 8.5 | 8.3 | 8.6 | 8.4 | 8.5 | 8.3 | 8.4 | 8.5 | 8.4 | 8.5 | 8.9 | 8.0 | 9.2 | 5.0 | 10.6 |
| | Metal ion content (%) | 2.4 | 2.4 | 2.4 | 2.4 | 2.7 | 1.9 | 2.7 | 2.7 | 2.7 | 2.7 | 2.7 | 2.7 | 2.7 | 2.7 | 2.7 | 2.7 | 0.8 | 2.7 | 2.7 | 0.0 |

The materials shown in Table B1 to Table B3 are as follows.

<1> Metal Salts
$CaCl_2.2H_2O$: calcium chloride dihydrate
$MgCl_2.6H_2O$: magnesium chloride hexahydrate
$MgSO_4$: magnesium sulfate
$Ca(NO_3)_2$: calcium nitrate
NaCl: sodium chloride
$(CH_3COO)_2Ca.H_2O$: calcium acetate monohydrate
$CH_3COONa.3H_2O$: sodium acetate trihydrate
$(CH_3CH(OH)COO)_2Ca.5H_2O$: DL-calcium lactate pentahydrate <2> Organic Amines
DMAE: dimethylaminoethanol (a tertiary amine, molecular weight: 89)
EPOMIN SP-003: a polyethyleneimine, manufactured by Nippon Shokubai Co., Ltd. (a secondary amine, molecular weight: 300)
EPOMIN SP-006: a polyethyleneimine, manufactured by Nippon Shokubai Co., Ltd. (a secondary amine, molecular weight: 600)
ALMATEX H700: a water-soluble polyamine manufactured by Mitsui Chemicals, Inc. (molecular weight: 700)

<3> Binder Resins
PVA103: a polyvinyl alcohol manufactured by Kuraray Co., Ltd., degree of saponification: 98 to 99% (fully saponified), degree of polymerization: 300, number average molecular weight: 13,200
PVA220: a polyvinyl alcohol manufactured by Kuraray Co., Ltd., degree of saponification: 87 to 89% (partially saponified), degree of polymerization: 2,000, number average molecular weight: 88,000
HYDRAN CP-7020: a cationic polyurethane (solid fraction: 40%), manufactured by DIC Corporation
Joncryl 1674: an acrylic emulsion (anionic, solid fraction: 45%), manufactured by BASF Corporation <4> Organic Solvents
iPrOH: 2-propanol (boiling point: 82° C., static surface tension: 21 mN/m)
MB: 3-methoxybutanol (boiling point: 161° C., static surface tension: 29 mN/m)
1,2-PD: 1,2-propanediol (boiling point: 188° C., static surface tension: 35 mN/m)
1,3-BuD: 1,3-butanediol (boiling point: 207° C., static surface tension: 37 mN/m)
1,2-PenD: 1,2-pentanediol (boiling point: 210° C., static surface tension: 28 mN/m)
1,2-HexD: 1,2-hexanediol (boiling point: 223° C., static surface tension: 26 mN/m)
EDG: diethylene glycol monoethyl ether (boiling point: 196° C., static surface tension: 28 mN/m)

<5> Surfactants
Surfynol 440: an acetylene-based surfactant, manufactured by Air Products and Chemicals, Inc.
Surfynol 104: an acetylene-based surfactant, manufactured by Air Products and Chemicals, Inc.
Dynol 607: an acetylene-based surfactant, manufactured by Air Products and Chemicals, Inc.
TEGO Wet 280: a siloxane-based surfactant, manufactured by Evonik Degussa GmbH
KF-351A: a siloxane-based surfactant, manufactured by Shin-Etsu Silicones Co., Ltd.
Zonyl FS-300: a fluorine-based surfactant, manufactured by E. I. du Pont de Nemours and Company <6> Additive (Preservative)
PROXEL GXL: a preservative, a 1,2-benzisothiazol-3-one solution, manufactured by Arch Chemicals, Inc.

II-2. Inkjet Inks B
(1) Pigment Dispersion Production Examples
First, pigment dispersion resins were prepared in the manner described below.

<Pigment Dispersion Resin 1>
A reaction container fitted with a gas inlet tube, a thermometer, a condenser and a stirrer was charged with 93.4 parts of butanol, and the container was flushed with nitrogen gas. The contents of the reaction container were heated to 110° C., and a mixture containing 40 parts of styrene, 30 parts of acrylic acid and 30 parts of behenyl acrylate as polymerizable monomers and 6 parts of a polymerization initiator V-601 (manufactured by Wako Pure Chemical Industries, Ltd.) was added dropwise to the container over a period of two hours to achieve a polymerization reaction.

Following completion of the dropwise addition of the above mixture, reaction was continued at 110° C. for a further three hours, an additional 0.6 parts of V-601 (manufactured by Wako Pure Chemical Industries, Ltd.) was then added, and the reaction was continued at 110° C. for a further one hour, thus obtaining a solution of a dispersion resin 1. Following cooling to room temperature, 37.1 parts of dimethylaminoethanol was added to neutralize the solution, and 100 parts of water was added to generate an aqueous solution. Subsequently, the aqueous solution was heated to at least 100° C., and the butanol was removed by azeotropic distillation with the water to adjust the solid fraction to 30%. This yielded an aqueous solution of a pigment dispersion resin 1 with a solid fraction of 30%.

Measurement of the pH of the aqueous solution (solid fraction: 30%) of the pigment dispersion resin 1 using a desktop pH meter F-72 manufactured by Horiba, Ltd. revealed a pH of 9.7. Further, measurement of the weight average molecular weight of the pigment dispersion resin obtained above using an HLC-8120GPC manufactured by Tosoh Corporation yielded a result of 22,500.

<Pigment Dispersion Resin 2>
With the exception of using 50 parts of acrylic acid and 50 parts of lauryl methacrylate as the polymerizable monomers, the same method as that described for the pigment dispersion resin 1 was used to obtain an aqueous solution of a pigment dispersion resin 2 with a solid fraction of 30%. The pH of the aqueous solution (solid fraction: 30%) of the pigment dispersion resin 2 was 8.1, and the weight average molecular weight of the pigment dispersion resin 2 was 15,000.

Next, using the prepared pigment dispersion resins, pigment dispersions were produced in the manner described below.

<Pigment Dispersions 1>
Twenty parts of a pigment, 20 parts of the aqueous solution (solid fraction: 30%) of the pigment dispersion resin 1 and 60 parts of water were subjected to preliminary dispersion using a Disper. Subsequently, a Dyno-Mill with a capacity of 0.6 L filled with 1,800 g of zirconia beads of diameter 0.5 mm was used to perform the main dispersion over a period of two hours, thus obtaining a pigment dispersion 1.

The pigments used in preparing the various pigment dispersions (the CMYK inkjet inks described below) were as follows.
Cyan: LIONOL BLUE 7358G, manufactured by Toyo Color Co., Ltd. (C.I. Pigment Blue 15:3)
Magenta: Inkjet Magenta E5B02, manufactured by Clariant AG (C.I. Pigment Violet 19)
Yellow: LIONOL YELLOW TT-1405G, manufactured by Toyo Color Co., Ltd. (C.I. Pigment Yellow 14)

Black: PrinteX 85, manufactured by Orion Engineered Carbons S.A. (Carbon black)

<Pigment Dispersions 2>

With the exceptions of using the aqueous solution (solid fraction: 30%) of the pigment dispersion resin 2 as the pigment dispersion resin, and using FASTOGEN SUPER MAGENTA RG (C.I. Pigment Red 122) manufactured by DIC Corporation as the magenta pigment, the same method as that described for the pigment dispersion 1 was used to obtain pigment dispersions 2.

(2) Water-Soluble Resin Varnish Production Example

A reaction container fitted with a gas inlet tube, a thermometer, a condenser and a stirrer was charged with 20 parts of Joncryl 819 (an acrylic resin manufactured by BASF Corporation, weight average molecular weight: 14,500, acid value: 75 mgKOH/g), 2.38 parts of dimethylaminoethanol and 77.62 parts of water, thus forming an aqueous solution. One gram of this mixed solution was sampled, and dried by heating at 180° C. for 20 minutes to measure the solid fraction concentration. Based on the obtained solid fraction concentration, sufficient water was added to the solution to prepare a water-soluble resin varnish having a non-volatile fraction of 20%, thus obtaining a water-soluble resin varnish having a solid fraction concentration of 20%.

(3) Inkjet ink Production Examples

Using the prepared pigment dispersions and the water-soluble resin varnish, a set of CMYK inkjet inks was produced in the manner described below.

<CMYK Inkjet Inks 1B>

The materials listed below were added sequentially to a mixing container while stirring was performed using a Disper, and the mixture was stirred thoroughly until a uniform mixture was obtained. Subsequently, sufficient triethanolamine was added to adjust the pH to 8.5, and the mixture was then filtered through a membrane filter with a pore size of 1 μm. By using each of the four CMYK colors as the pigment dispersion 1, CMYK inkjet inks 1B were obtained.

| | |
|---|---|
| Pigment dispersion 1 | 30 parts |
| Joncryl 538 | 13 parts |
| (an acrylic resin emulsion manufactured by BASF Corporation, solid fraction: 46%) | |
| 1,2-pentanediol | 10 parts |
| Diethylene glycol monoethyl ether | 10 parts |
| Propylene glycol monomethyl ether | 5 parts |
| Surfynol 465 | 0.2 parts |
| PROXEL GXL | 0.05 parts |
| Ion-exchanged water | 31.75 parts |

<Inkjet Inks 2B to 13B>

With the exceptions of using the materials shown in Table B4, and adjusting the pH using triethanolamine or hydrochloric acid, the same method as that described for the inkjet inks 1B was used to obtain inkjet inks 2B to 13B. Table B4 does not include the triethanolamine or hydrochloric acid used for pH adjustment.

TABLE B4

| | | | CMYK inkjet inks | | | | | | | | | | | |
|---|---|---|---|---|---|---|---|---|---|---|---|---|---|---|
| | | | 1B | 2B | 3B | 4B | 5B | 6B | 7B | 8B | 9B | 10B | 11B | 12B | 13B |
| <a1> | | Pigment dispersion 1 | 30 | 30 | 30 | | | | 30 | | | 10 | 30 | 30 | 40 |
| | | Pigment dispersion 2 | | | | 30 | | | | 30 | | | | | |
| <a2> | | CaboJet | | | | | 20 | 30 | | | 30 | | | | |
| <b> | | Joncryl 538 | 13 | 13 | 13 | | 13 | | | | 13 | 13 | | | |
| | | Water-soluble resin varnish | | | | 30 | | 30 | 30 | | | | | 16 | |
| | | Emulsion | | | | | | | | | | | 13 | | 15 |
| <c> | Alkyl polyol-based | 1,2-PG (boiling point 188° C.) | | | | | | 25 | | | 15 | | | | |
| | | 1,2-BuD (boiling point 194° C.) | | | | 10 | | | | | | | | | |
| | | 1,2-PenD (boiling point 210° C.) | 10 | 10 | 10 | | | | | | | 10 | 10 | | |
| | | 1,5-PenD (boiling point 214° C.) | | | | | 5 | | | | | | | | |
| | | 1,2-HexD (boiling point 223° C.) | | | | 10 | | | 5 | 25 | | | | | |
| | | DEG (boiling point 244° C.) | | | | | | | | | | | | 15 | |
| | | TEG (boiling point 288° C.) | | | | | | | 10 | | | 5 | | | |
| | | Glycerol (boiling point 290° C.) | | | | | | 5 | 20 | | | | | | 5 |
| | Glycol ether-based | EDG (boiling point 196° C.) | 10 | 10 | 10 | | | | | | | | 10 | 10 | 10 |
| | | iPDG (boiling point 207° C.) | | | | | | | | | | 10 | | | |
| | | BDG (boiling point 230° C.) | | | | | 5 | 10 | | | | | | | |
| | | MFG (boiling point 121° C.) | 5 | 5 | 5 | | | | | | | | | | |
| <d> | Acetylene-based | Surfynol 465 | 0.2 | 0.2 | 0.2 | 0.4 | | 0.2 | 0.2 | | 0.2 | 0.2 | 0.2 | 0.5 | 0.5 |
| | Siloxane-based | TEGO Wet 280 | | | | 0.1 | 0.1 | | | 0.1 | | | | 0.5 | 0.5 |
| <e> | | PROXEL GXL | 0.05 | 0.05 | 0.05 | 0.05 | 0.05 | 0.05 | 0.05 | 0.05 | 0.05 | 0.05 | 0.05 | 0.05 | 0.05 |
| | | Water | 31.75 | 31.75 | 31.75 | 19.45 | 56.85 | 29.75 | 4.75 | 14.85 | 31.75 | 61.75 | 36.75 | 27.95 | 28.95 |
| | | pH | 8.5 | 6.0 | 11.2 | 8.5 | 8.5 | 8.5 | 8.5 | 8.5 | 8.5 | 8.5 | 8.5 | 8.5 | 8.5 |

<a1> pigment dispersions,
<a2> pigment self-dispersion
<b> binder resins,
<c> organic solvents,
<d> surfactants,
<e> preservative Those materials shown in Table B4 that were not shown in Tables B1 to B3 are as follows.

CaboJet:

Cyan: CaboJet 250C (an aqueous dispersion of self-dispersing carbon black, manufactured by Cabot Corporation, solid fraction: 10%)

Magenta: CaboJet 265M (an aqueous dispersion of self-dispersing cyan pigment, manufactured by Cabot Corporation, solid fraction: 10%)

Yellow: CaboJet 270 (an aqueous dispersion of self-dispersing magenta pigment, manufactured by Cabot Corporation, solid fraction: 10%)

Black: CaboJet 200 (an aqueous dispersion of self-dispersing yellow pigment, manufactured by Cabot Corporation, solid fraction: 20%)

1,2-PG: 1,2-propanediol
1,2-BuD: 1,2-butanediol
1,2-PenD: 1,2-pentanediol
1,5-PenD: 1,5-pentanediol
iPDG: diethylene glycol monoisopropyl ether
BDG: diethylene glycol monobutyl ether
MFG: propylene glycol monomethyl ether
DEG: diethylene glycol
TEG: triethylene glycol II-3. Evaluation of Pretreatment Solutions and Inkjet Printed Matter Examples 1B to 71B, Comparative Examples 1B to 4B (1) Evaluation of Inkjet Printed Matter
<Production Examples for Recording Media to which a Pretreatment Solution had been Applied>

Each of the pretreatment solutions prepared above was applied uniformly to a recording medium "OK Top Coat+ paper" (manufactured by Oji Holdings Corporation) using a print tester Esiproof (manufactured by Matsuo Sangyo Co., Ltd.). At this time, a ceramic roller having 140 ridges/inch was used, and the coating speed was altered so as to achieve a wet coating amount that was 6.0±0.3 g/m². The recording medium (OK Top Coat+paper) to which the pretreatment solution had been applied was dried for 3 minutes in a 50° C. air oven, thus completing production of a recording medium coated with the pretreatment solution.

<Inkjet Ink Printed Matter Production Examples>
(Production of Printed Matter for Bleeding Evaluation)

An inkjet head KJ4B-QA (manufactured by Kyocera Corporation) was installed above a conveyor capable of transporting recording media, and the inkjet head was filled with inkjet inks. The design resolution of the above inkjet head was 600 dpi and the maximum drive frequency was 30 kHz, and when printing was performed at the maximum drive frequency and at a printing speed of 75 m/minute, the recording resolution in the transport direction of the recording medium was 600 dpi.

Subsequently, the recording medium coated with the pretreatment solution was secured to the conveyor, the conveyor was driven at a constant speed, and as the recording medium passed beneath the installation position for the inkjet head, the inkjet inks were discharged in CMYK order using a drop volume of 12 µL, thus printing a sample No. 5 (bicycle image) from the high-precision color digital standard image data (JSA-00001 prescribed in ISO/JIS-SCID JIS X 9201).

Following printing, the printed matter was transported into a 50° C. air oven within 10 seconds of completing printing, and was dried for 3 minutes, thus producing printed matter for evaluating bleeding. Production of the printed matter was performed under the three sets of printing conditions shown below in Table B5, with printed matter being obtained for various values for the recording resolution in the recording medium transport direction and the printing speed.

TABLE B5

| Printing conditions No. | Conveyor transport speed (m/minute) | Inkjet head drive frequency (kHz) | Recording resolution in recording medium transport direction (dpi) |
|---|---|---|---|
| A | 30 | 12 | 600 |
| B | 75 | 30 | 600 |
| C | 37.5 | 30 | 1200 |

(Production of Solid Printed Matter)

In order to evaluate color irregularities, waviness and curling, density, water resistance, and drying properties, solid printed matter was produced in the manner described below.

First, in a similar manner to that described above for the printed matter for evaluating bleeding, a recording medium coated with the pretreatment solution was secured to a conveyor, the conveyor was driven at a constant speed, and as the recording medium passed beneath the installation position for the inkjet head, each of the CMYK inkjet inks was discharged using a drop volume of 12 µL to perform solid printing with a print ratio of 100% in each color.

Following printing, the printed matter was transported into a 50° C. air oven within 10 seconds of completing printing, and was dried for 3 minutes, thus producing solid printed matter. Production of the solid printed matter was performed under the three sets of printing conditions shown above in Table B5, with printed matter being obtained for various values for the recording resolution in the recording medium transport direction and the printing speed.

The combinations of pretreatment solutions and inkjet inks (ink sets) used in producing the printed matter for performing each of the above evaluations were as shown in Tables B6 and B7.

<Evaluations of Printed Matter for Bleeding Evaluation and Solid Printed Matter>

The printed matter for evaluating bleeding and the solid printed matter, produced as described above under various conveyor operating conditions, were subjected to various evaluations. The results of those evaluations are shown in Tables B6 and B7.

(2) Evaluation of Pretreatment Solutions

When evaluating coating irregularities for the prepared pretreatment solutions, in order to enhance the visibility, 0.1 g of Kayafect Red P Liquid (manufactured by Nippon Kayaku Co., Ltd.) was added to 10 g samples of each of the pretreatment solutions, and thorough mixing was performed to dissolve the dye.

Each of these pretreatment solutions containing the added dye was applied uniformly to a recording medium "OK Top Coat+paper" (manufactured by Oji Holdings Corporation) using a print tester Esiproof (manufactured by Matsuo Sangyo Co., Ltd.). At this time, a ceramic roller having 140 ridges/inch was used, and the coating speed was altered so as to achieve a wet coating amount that was 6.0±0.3 g/m².

The recording medium (OK Top Coat+paper) to which the pretreatment solution containing the added dye had been applied was dried for 3 minutes in a 50° C. air oven, thus obtaining a recording medium coated with the pretreatment solution containing the added dye. The recording medium obtained in this manner was used for evaluating coating irregularities. The results are shown in Tables B6 and B7.

In Tables B6 and B7, Examples 1B to 71B, and Comparative Examples 1B to 4B are abbreviated as Examples 1 to 71, and Comparative Examples 1 to 4 respectively. Similarly, the pretreatment solutions 1B to 63B are abbreviated as pretreatment solutions 1 to 63. Further, the CMYK inkjet inks 1B to 13B are abbreviated as inks 1 to 13.

TABLE B6

| Example/Comparative Example | Ink set - Pretreatment solution | Ink set - CMYK inks | pH difference | Printed matter for bleeding evaluation Bleeding | Solid printed matter - Color irregularities | Solid printed matter - Waviness and curling | Solid printed matter - Density | Solid printed matter - Water resistance | Solid printed matter - Drying properties | Pretreatment solution Coating irregularities | Ink Discharge stability |
|---|---|---|---|---|---|---|---|---|---|---|---|
| Example 1  | 1  | 1 | 0   | A | A | A | A | A | A | A | A |
| Example 2  | 2  | 1 | 0   | C | C | A | A | A | A | A | A |
| Example 3  | 3  | 1 | 0.1 | A | A | A | A | A | A | A | A |
| Example 4  | 4  | 1 | 0.1 | A | A | A | A | A | A | A | A |
| Example 5  | 5  | 1 | 0.3 | B | B | A | A | A | A | A | A |
| Example 6  | 6  | 1 | 0.3 | C | C | A | A | A | A | A | A |
| Example 7  | 7  | 1 | 0.4 | B | B | A | A | A | A | A | A |
| Example 8  | 8  | 1 | 0.5 | C | C | A | A | A | A | A | A |
| Example 9  | 9  | 1 | 0.5 | B | B | A | A | A | A | A | A |
| Example 10 | 10 | 1 | 0.5 | C | C | A | A | A | A | A | A |
| Example 11 | 11 | 1 | 1   | B | B | A | A | A | A | A | A |
| Example 12 | 12 | 1 | 1.3 | C | C | A | A | A | A | A | A |
| Example 13 | 13 | 1 | 0.3 | B | B | A | A | A | A | A | A |
| Example 14 | 14 | 1 | 0.7 | C | C | A | A | A | A | A | A |
| Example 15 | 15 | 1 | 1.5 | A | B | A | A | A | A | B | A |
| Example 16 | 16 | 1 | 1.5 | A | A | A | A | A | A | A | A |
| Example 17 | 17 | 1 | 0.8 | A | A | A | A | A | A | A | A |
| Example 18 | 18 | 1 | 0.9 | A | A | A | A | A | A | A | A |
| Example 19 | 19 | 1 | 1.3 | A | A | A | A | A | A | A | A |
| Example 20 | 20 | 1 | 1.8 | A | B | A | A | A | A | B | A |
| Example 21 | 21 | 1 | 0.1 | A | A | A | A | A | A | A | A |
| Example 22 | 22 | 1 | 0.3 | A | A | A | A | A | A | A | A |
| Example 23 | 23 | 1 | 0.9 | A | B | A | A | A | A | B | A |
| Example 24 | 24 | 1 | 1.8 | A | B | A | A | A | A | B | A |
| Example 25 | 25 | 1 | 1.7 | A | B | A | A | A | A | B | A |
| Example 26 | 26 | 1 | 1.5 | A | C | A | A | A | A | C | A |
| Example 27 | 27 | 1 | 1.5 | A | C | A | A | A | A | C | A |
| Example 28 | 28 | 1 | 0.1 | A | A | A | A | A | A | A | A |
| Example 29 | 29 | 1 | 0.3 | A | A | A | A | A | A | A | A |
| Example 30 | 30 | 1 | 0.5 | A | A | C | A | A | A | A | A |
| Example 31 | 31 | 1 | 0.2 | A | A | C | A | A | A | A | A |
| Example 32 | 32 | 1 | 0   | A | B | A | A | A | A | B | A |
| Example 33 | 33 | 1 | 0   | A | A | A | A | A | A | A | A |
| Example 34 | 34 | 1 | 0   | A | A | A | A | A | A | A | A |
| Example 35 | 35 | 1 | 0   | A | A | A | A | A | A | A | A |
| Example 36 | 36 | 1 | 0.1 | A | A | A | A | A | A | A | A |
| Example 37 | 37 | 1 | 0.2 | A | B | A | A | A | A | B | A |
| Example 38 | 38 | 1 | 0.4 | A | B | A | A | A | A | B | A |

TABLE B7

| Example/Comparative Example | Ink set - Pretreatment solution | Ink set - CMYK inks | pH difference | Printed matter for bleeding evaluation Bleeding | Solid printed matter - Color irregularities | Solid printed matter - Waviness and curling | Solid printed matter - Density | Solid printed matter - Water resistance | Solid printed matter - Drying properties | Pretreatment solution Coating irregularities | Ink Discharge stability |
|---|---|---|---|---|---|---|---|---|---|---|---|
| Example 39 | 39 | 1 | 0.5 | B | A | A | A | A | C | A | A |
| Example 40 | 40 | 1 | 0.3 | B | A | A | A | A | B | A | A |
| Example 41 | 41 | 1 | 0.1 | B | A | A | A | A | A | A | A |
| Example 42 | 42 | 1 | 0   | B | A | A | A | A | A | A | A |
| Example 43 | 43 | 1 | 0.1 | B | A | A | A | A | A | A | A |
| Example 44 | 44 | 1 | 0.1 | B | A | A | A | A | B | A | A |
| Example 45 | 45 | 1 | 0   | B | A | A | A | A | B | A | A |
| Example 46 | 46 | 1 | 0.1 | A | B | A | A | A | B | B | A |
| Example 47 | 47 | 1 | 0.1 | A | B | A | A | A | C | B | A |
| Example 48 | 48 | 1 | 0   | A | A | A | A | A | A | A | A |
| Example 49 | 49 | 1 | 0   | A | A | A | A | A | A | A | A |
| Example 50 | 50 | 1 | 0.2 | A | A | A | A | A | A | A | A |
| Example 51 | 51 | 1 | 0.1 | A | A | A | A | A | A | A | A |
| Example 52 | 52 | 1 | 0.1 | A | A | A | A | A | A | A | A |
| Example 53 | 53 | 1 | 0   | A | A | A | A | A | A | A | A |
| Example 54 | 54 | 1 | 0.2 | A | A | A | A | A | B | A | A |
| Example 55 | 55 | 1 | 0.1 | A | A | A | A | A | A | A | A |

TABLE B7-continued

| Example/ Comparative Example | Ink set | | | Printed matter for bleeding | Solid printed matter | | | | | | Pretreatment solution | Ink |
|---|---|---|---|---|---|---|---|---|---|---|---|---|
| | Pretreatment solution | CMYK inks | pH difference | evaluation Bleeding | Color irregularities | Waviness and curling | Density | Water resistance | Drying properties | | Coating irregularities | Discharge stability |
| Example 56 | 56 | 1 | 0 | A | A | A | A | A | B | | C | A |
| Example 57 | 57 | 1 | 0.1 | A | A | A | A | A | B | | A | A |
| Example 58 | 58 | 1 | 0 | A | A | A | A | A | A | | A | A |
| Example 59 | 59 | 1 | 0.4 | A | A | C | A | C | B | | A | A |
| Example 60 | 60 | 1 | 0.5 | C | C | C | A | C | B | | A | A |
| Example 61 | 61 | 1 | 0.7 | A | A | C | A | C | C | | A | A |
| Example 62 | 1 | 4 | 0 | A | A | A | C | A | A | | A | A |
| Example 63 | 1 | 5 | 0 | A | A | A | C | A | A | | A | A |
| Example 64 | 1 | 6 | 0 | A | A | A | C | A | B | | A | B |
| Example 65 | 1 | 7 | 0 | A | A | A | A | A | C | | A | B |
| Example 66 | 1 | 8 | 0 | A | A | A | C | A | A | | A | A |
| Example 67 | 1 | 9 | 0 | A | A | A | C | A | A | | A | A |
| Example 68 | 1 | 10 | 0 | A | A | A | A | A | B | | A | B |
| Example 69 | 1 | 11 | 0 | A | A | A | A | A | A | | A | B |
| Example 70 | 1 | 12 | 0 | A | A | A | A | A | B | | A | A |
| Example 71 | 1 | 13 | 0 | A | A | A | A | A | B | | A | C |
| Comparative Example 1 | 62 | 1 | 3.5 | D | D | A | C | A | A | | D | A |
| Comparative Example 2 | 63 | 1 | 2.1 | D | D | A | C | A | A | | D | A |
| Comparative Example 3 | 1 | 2 | 2.5 | D | D | A | C | A | A | | A | A |
| Comparative Example 4 | 1 | 3 | 2.7 | D | D | A | C | A | A | | A | A |

Details relating to the various evaluations shown in Tables B6 and B7 are described below.

<Evaluation of Bleeding>

The dot shape of the 4C (CMYK) printed portion of the printed matter for bleeding evaluation was inspected under a microscope at a magnification of 200x to evaluate the level of bleeding. The evaluation criteria were as follows, with a grade of C or higher indicating a favorable level for practical application.

A: for all three printing conditions shown in Table B5, the dots of the 4C printed portion remained independent and no bleeding was observed.

B: among the three printing conditions shown in Table B5, the dots of the 4C printed portion remained independent and no bleeding was observed for the printing conditions A, and either the printing conditions B or C, but bleeding was observed under the remaining printing conditions.

C: among the three printing conditions shown in Table B5, the dots of the 4C printed portion remained independent and no bleeding was observed for the printing conditions A, but bleeding was observed under the printing conditions B and C.

D: for all three printing conditions shown in Table B5, the dots of the 4C printed showed color mixing, and bleeding was observed.

<Evaluation of Color Irregularities>

The degree of color irregularities in the solid printed matter was inspected visually and evaluated. The evaluation criteria were as follows, with a grade of C or higher indicating a favorable level for practical application. The evaluation was performed for each of the CMYK colors, and the lowest evaluation result was recorded in Table B6 or B7.

A: for all three printing conditions shown in Table B5, no color irregularities were observed.

B: among the three printing conditions shown in Table B5, no color irregularities were observed for the printing conditions A, and either the printing conditions B or C, but color irregularities were observed under the remaining printing conditions.

C: among the three printing conditions shown in Table B5, no color irregularities were observed for the printing conditions A, but color irregularities were observed under the printing conditions B and C.

D: for all three printing conditions shown in Table B5, color irregularities were observed.

<Evaluation of Waviness and Curling>

An evaluation of waviness and curling was performed by visually inspecting the recording media from the solid printing for the occurrence of waviness of curling. The evaluation criteria were as follows, with a grade of C or higher indicating a favorable level for practical application. The evaluation was performed for each of the CMYK colors, and the lowest evaluation result was recorded in Table B6 or B7.

A: for all three printing conditions shown in Table B5, no waviness or curling was observed.

B: among the three printing conditions shown in Table B5, no waviness or curling was observed for the printing conditions A, and either the printing conditions B or C, but waviness or curling was observed under the remaining printing conditions.

C: among the three printing conditions shown in Table B5, no waviness or curling was observed for the printing conditions A, but waviness or curling was observed under the printing conditions B and C.

D: for all three printing conditions shown in Table B5, waviness or curling was observed.

<Evaluation of Printed Matter Density>

The Lab values in the CIE standard colorimetric system for the aforementioned solid printed matter printed using the magenta, yellow and cyan inks were measured using a spectroscopic colorimeter X-RITE 528, a D50 light source and a viewing angle of 2°. In each of the magenta, yellow and cyan color regions, a comparison was made with Japan Color 2007 and the European Color Standard FOGRA39, and an evaluation was made as to whether or not the chroma $C=\sqrt{(a^2+b^2)}$, which is a numerical representation of the degree of saturation, was high and positioned outside each of the color gamuts.

The evaluation criteria were as follows, with a grade of C or higher indicating a favorable level for practical application.

A: in all of the magenta, yellow and cyan regions, the chroma was higher than Japan Color 2007 and FOGRA39, and positioned outside each of the color gamuts.

B: in one region among magenta, yellow and cyan, the chroma was lower than Japan Color 2007 and FOGRA39, and was positioned within one color gamut.

C: in two regions among magenta, yellow and cyan, the chroma was lower than Japan Color 2007 and FOGRA39, and was positioned within two of the color gamuts.

D: in all of the magenta, yellow and cyan regions, the chroma was lower than Japan Color 2007 and FOGRA39, and was positioned within all three color gamuts.

<Water Resistance>

The solid printed matter items were rubbed back and forth 10 times with a cotton swab that had been soaked in water to evaluate the water resistance of the printed matter. The evaluation criteria were as follows, with a grade of C or higher indicating a favorable level for practical application. The evaluation was performed for each of the CMYK colors, and the lowest evaluation result was recorded in Table B6 or B7.

A: absolutely no ink had adhered to the cotton swab after 10 back and forth rubbing repetitions.

B: absolutely no ink had adhered to the cotton swab after 7 back and forth rubbing repetitions, but adhesion of the ink to the cotton swab was observed within 10 back and forth rubbing repetitions.

C: absolutely no ink had adhered to the cotton swab after 5 back and forth rubbing repetitions, but adhesion of the ink to the cotton swab was observed within 7 back and forth rubbing repetitions.

D: adhesion of the ink to the cotton swab was observed within 5 back and forth rubbing repetitions.

<Evaluation of Printed Matter Drying Properties>

The solid printed matter was rubbed back and forth 10 times with a cotton swab to evaluate the drying properties of the printed matter. The evaluation criteria were as follows, with a grade of C or higher indicating a favorable level for practical application. The evaluation was performed for each of the CMYK colors, and the lowest evaluation result was recorded in Table B6 or B7.

A: for all three printing conditions shown in Table B5, absolutely no ink adhered to the cotton swab.

B: among the three printing conditions shown in Table B5, absolutely no ink adhered to the cotton swab for the printing conditions A and B, but adhesion of the ink to the cotton swab was observed for the printing conditions C.

C: among the three printing conditions shown in Table B5, absolutely no ink adhered to the cotton swab for the printing conditions A, but adhesion of the ink to the cotton swab was observed for the printing conditions B and C.

D: for all three printing conditions shown in Table B5, adhesion of the ink to the cotton swab was observed.

<Evaluation of Pretreatment Solution Coating Irregularities>

Ten recording media coated with the pretreatment solution containing an added dye were produced continuously in accordance with the method described above, and the degree of color irregularities on each recording medium was inspected visually to evaluate the coatability of the pretreatment solution. The evaluation criteria were as follows, with a grade of C or higher indicating a favorable level for practical application.

A: absolutely no coating irregularities were observed in any of the 10 items.

B: coating irregularities were observed in 1 of the 10 items.

C: coating irregularities were observed in 2 of the 10 items.

D: coating irregularities were observed in at least 3 of the 10 items.

<Evaluation of Discharge Stability of Inkjet Inks>

The discharge stability of the inkjet inks was evaluated in the following manner.

An inkjet discharge apparatus fitted with an inkjet head KJ4B-QA or KJ4B-Z (manufactured by Kyocera Corporation) was prepared, and the inkjet inks were loaded into the apparatus. The design resolution of the inkjet head KJ4B-Z was 1,200 dpi and the maximum drive frequency was 64 kHz, and when printing was performed at the maximum drive frequency and at a printing speed of 80 m/minute, the recording resolution in the transport direction of the recording medium was 1,200 dpi.

Subsequently, discharge was performed continuously for two hours, under conditions including a drop volume of 5 μL and a drive frequency of 30 kHz for the inkjet head KJ4B-QA, or under conditions including a drop volume of 2 μL and a drive frequency of 64 kHz for the inkjet head KJ4B-Z, and the discharge stability was then evaluated by printing a nozzle check pattern and counting the number of missing nozzles. The evaluation criteria were as follows, with a grade of C or higher indicating a favorable level for practical application.

A: in the nozzle check pattern printed 2 hours after starting printing, there were no missing nozzles.

B: in the nozzle check pattern printed 2 hours after starting printing, there were 1 to 4 missing nozzles.

C: in the nozzle check pattern printed 2 hours after starting printing, there were 5 to 9 missing nozzles.

D: in the nozzle check pattern printed 2 hours after starting printing, there were 10 or more missing nozzles.

As is evident from the above examples, the pretreatment solution, the ink set and the method for producing printed matter according to the present invention enable images of high image quality to be obtained without being affected by the absorption properties of the recording medium, and can be used particularly favorably in inkjet printing at high speed and at a high recording resolution.

The invention claimed is:

1. A pretreatment solution which is used together with an aqueous inkjet ink that comprises at least a pigment, wherein
the pretreatment solution comprises an inorganic metal salt and/or an organic metal salt, and an organic solvent,
the inorganic metal salt and/or the organic metal salt exists in a dissolved state in the pretreatment solution, and
the organic solvent contains a compound having one or more hydroxyl groups in each molecule, and an amount of the organic solvent, based on a total weight of the pretreatment solution, is from 0.1 to 50% by weight.

2. The pretreatment solution according to claim 1, wherein the inorganic metal salt and/or the organic metal salt is a polyvalent metal salt, and an amount of polyvalent metal ions derived from the polyvalent metal salt, based on a total weight of the pretreatment solution, is at least 2% by weight but not more than 8% by weight, and based on a total weight of the pretreatment solution, an amount of an organic solvent having a boiling point of 180° C. or higher is not more than 15% by weight.

3. The pretreatment solution according to claim 2, wherein the polyvalent metal ions comprise at least one ion selected from the group consisting of $Ca^{2+}$, $Mg^{2+}$, $Zn^{2+}$, $Al^{3+}$, $Fe^{2+}$ and $Fe^{3+}$.

4. The pretreatment solution according to claim 1, further comprising a water-soluble binder resin.

5. The pretreatment solution according to claim 4, wherein the water-soluble binder resin comprises a nonionic water-soluble resin.

6. The pretreatment solution according to claim 4, wherein based on a total weight of the pretreatment solution, a weight ratio of an amount of the water-soluble binder resin relative to an amount of polyvalent metal ions derived from the inorganic metal salt and/or the organic metal salt is less than 20-fold.

7. The pretreatment solution according to claim 1, wherein the pretreatment solution has a viscosity at 25° C. that is higher than 9 mPa·s but not more than 30 mPa·s.

8. The pretreatment solution according to claim 1, wherein the pretreatment solution further comprises a surfactant, and has a surface tension at 25° C. of 20 to 45 mN/m.

9. The pretreatment solution according to claim 1, wherein the pretreatment solution further comprises an organic amine in a dissolved state, and a difference between a pH of the aqueous inkjet ink and a pH of the pretreatment solution is not more than 2.

10. The pretreatment solution according to claim 9, wherein the inorganic metal salt and/or the organic metal salt comprises a polyvalent metal salt, and an amount of polyvalent metal ions derived from the polyvalent metal salt, based on a total weight of the pretreatment solution, is at least 1% by weight but not more than 15% by weight.

11. The pretreatment solution according to claim 9, wherein an amount of the organic amine, based on a total weight of the pretreatment solution, is at least 0.15% by weight but not more than 3% by weight.

12. The pretreatment solution according to claim 9, wherein a weight average molecular weight of the organic amine is not more than 500, and the organic amine is a secondary amine and/or a tertiary amine.

13. The pretreatment solution according to claim 9, wherein based on a total weight of the pretreatment solution, an amount of an organic solvent having a boiling point of 200° C. or higher is not more than 20% by weight.

14. The pretreatment solution according to claim 9, wherein the pretreatment solution further comprises a water-soluble binder resin, and based on a total weight of the pretreatment solution, a weight ratio of an amount of the water-soluble binder resin relative to an amount of polyvalent metal ions derived from the inorganic metal salt and/or the organic metal salt is less than 50-fold.

15. The pretreatment solution according to claim 14, wherein the water-soluble binder resin comprises a nonionic water-soluble resin.

16. The pretreatment solution according to claim 14, wherein a number average molecular weight of the water-soluble binder resin is at least 3,000 but not more than 90,000.

17. An ink set comprising the pretreatment solution according to claim 1, and an aqueous inkjet ink, wherein the aqueous inkjet ink comprises a pigment, a water-soluble organic solvent and water, and the water-soluble organic solvent comprises two or more solvents selected from the group consisting of glycol ether-based solvents and alkyl polyol-based solvents having a boiling point at 1 atmosphere of at least 180° C. but not more than 280° C.

18. The ink set according to claim 17, wherein based on a total weight of the aqueous inkjet ink, an amount of a water-soluble organic solvent having a boiling point at 1 atmosphere of at least 240° C. is less than 10% by weight.

19. The ink set according to claim 17, wherein the aqueous inkjet ink further comprises a water-soluble resin as a binder resin.

20. The ink set according to claim 17, wherein the aqueous inkjet ink has at least a magenta ink, and the magenta ink comprises C.I. Pigment Violet 19 as a magenta pigment.

* * * * *